Dec. 7, 1954 P. LÉGLISE 2,696,286
APPARATUS FOR JUSTIFYING TYPEWRITTEN MATERIAL
Filed March 15, 1951 28 Sheets-Sheet 1
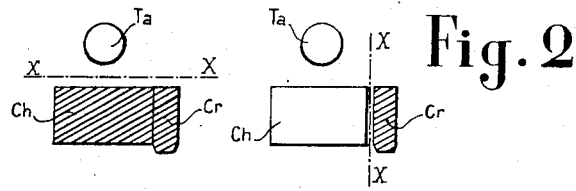
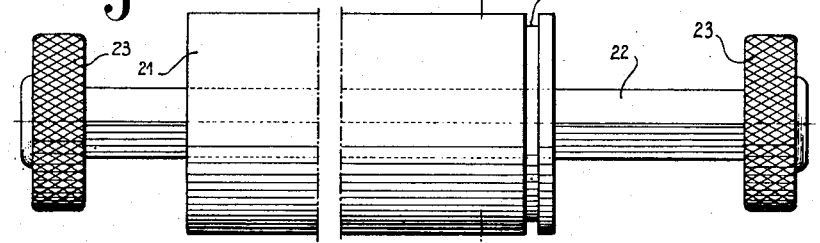
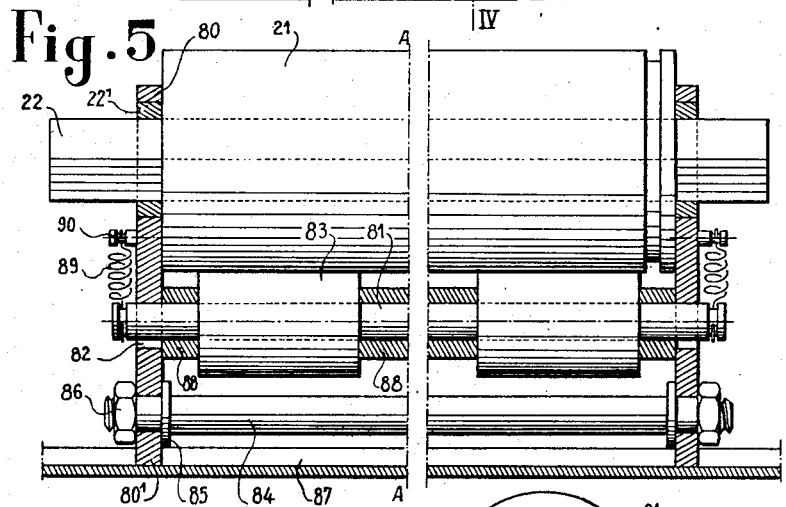
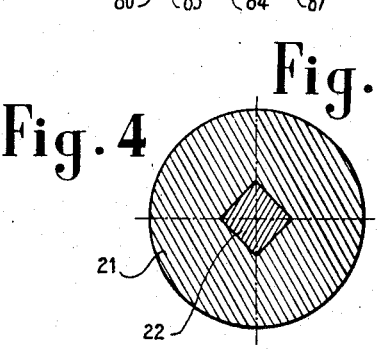
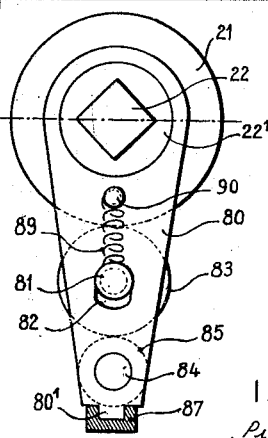
INVENTOR
Pierre Léglise
BY
H.C. Bierman
ATTORNEY Dec. 7, 1954            P. LÉGLISE            2,696,286

APPARATUS FOR JUSTIFYING TYPEWRITTEN MATERIAL

Filed March 15, 1951            28 Sheets-Sheet 2

INVENTOR
Pierre Léglise
BY
ATTORNEY

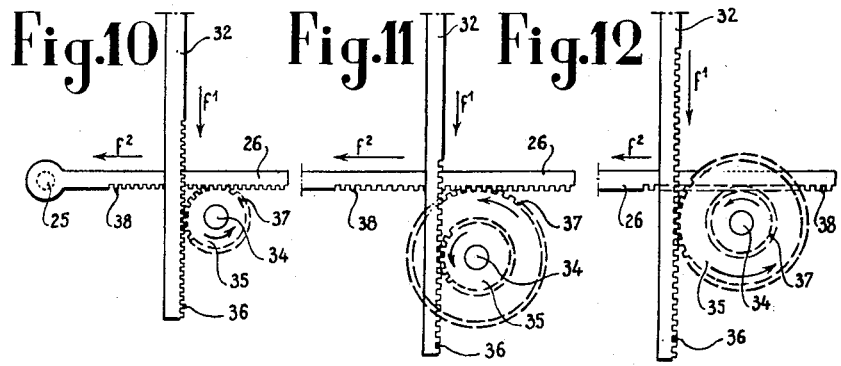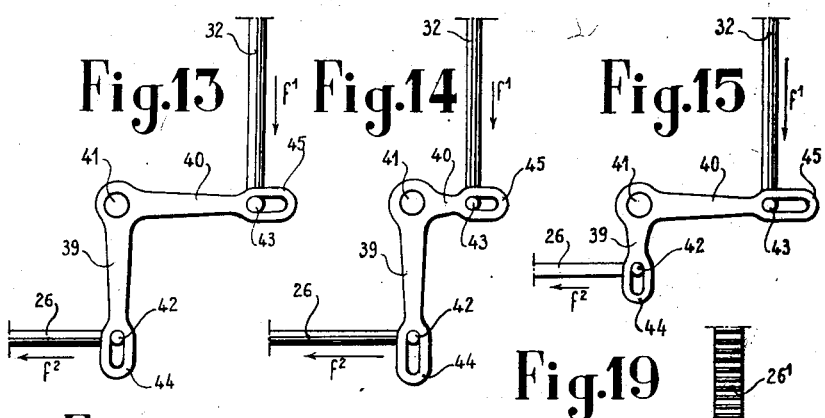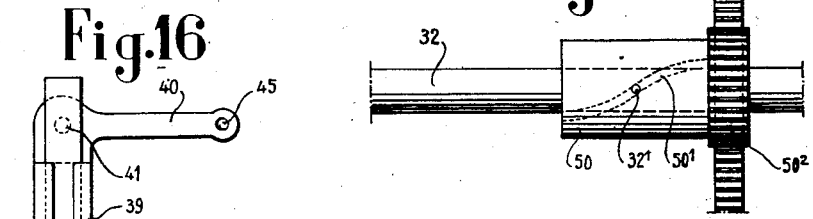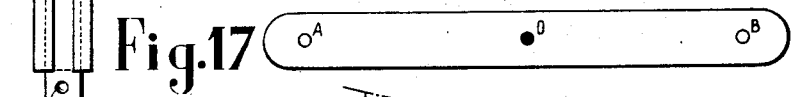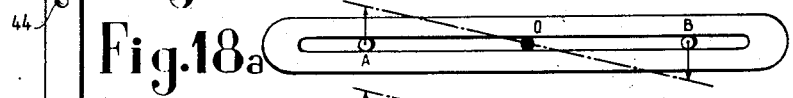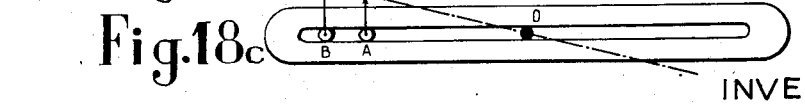

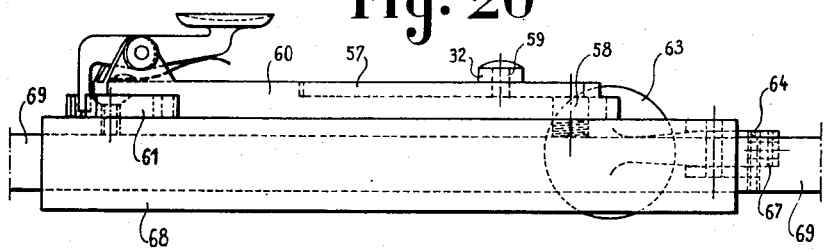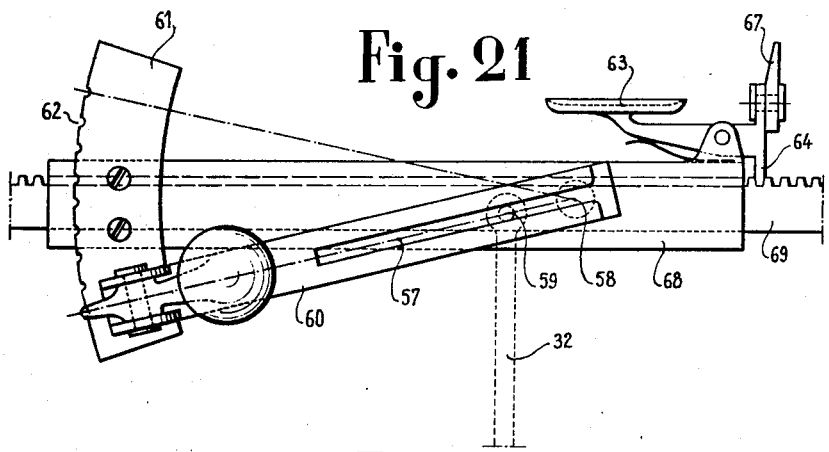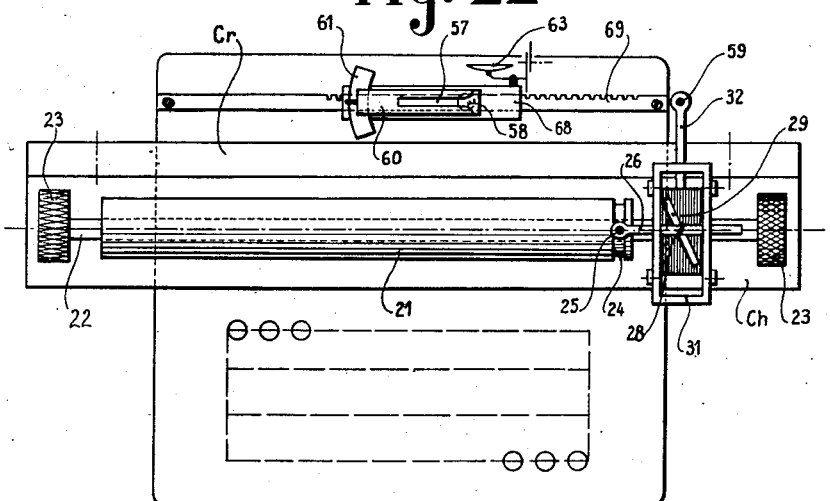

Dec. 7, 1954             P. LÉGLISE             2,696,286
APPARATUS FOR JUSTIFYING TYPEWRITTEN MATERIAL
Filed March 15, 1951             28 Sheets-Sheet 5
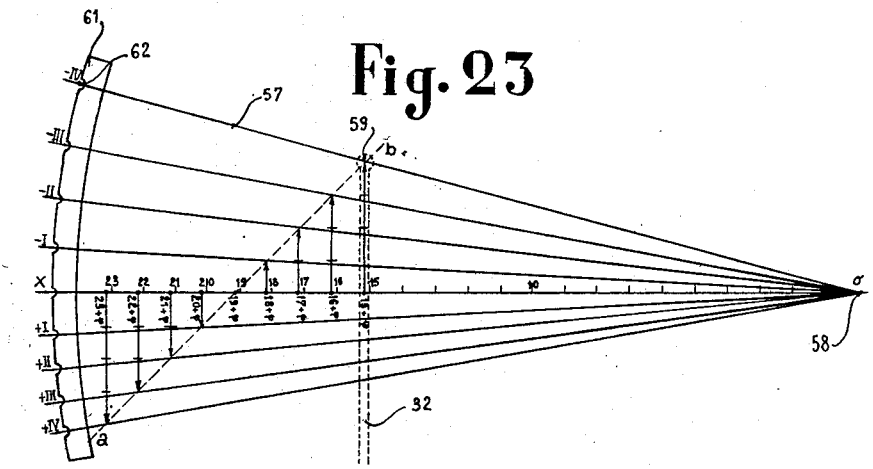
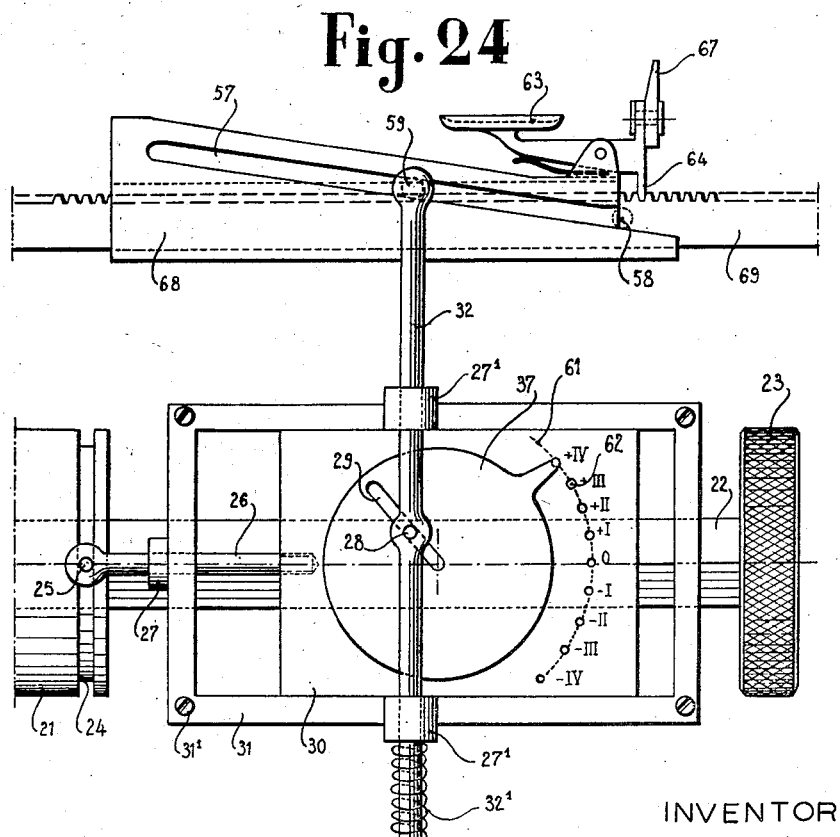
INVENTOR
Pierre Léglise
BY
ATTORNEY Dec. 7, 1954 P. LÉGLISE 2,696,286
APPARATUS FOR JUSTIFYING TYPEWRITTEN MATERIAL
Filed March 15, 1951 28 Sheets-Sheet 7
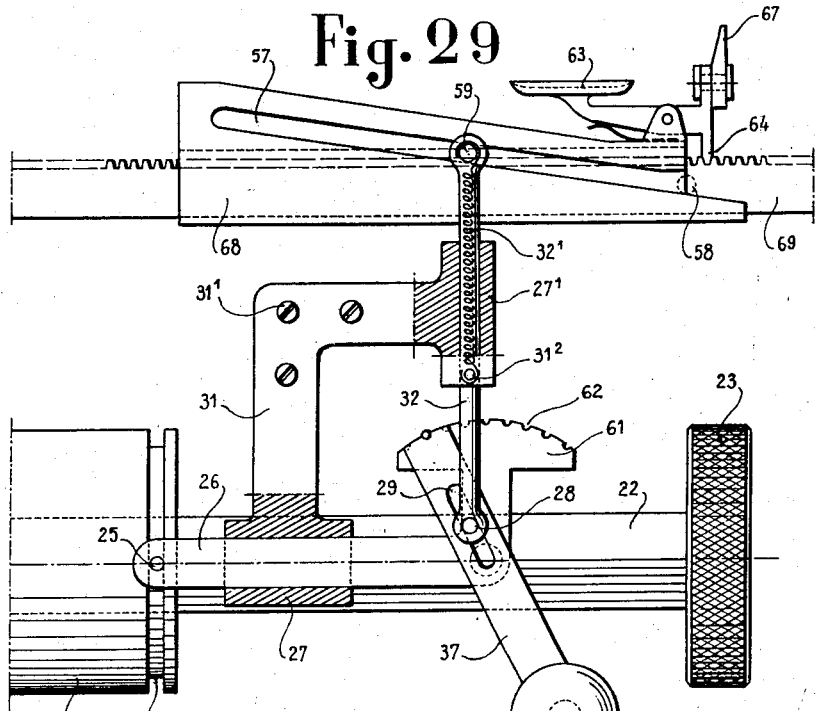
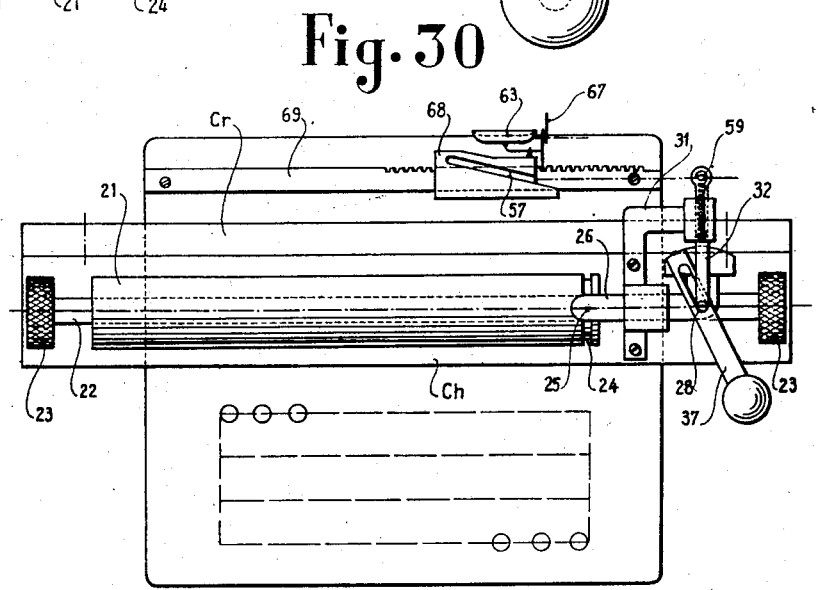
INVENTOR
Pierre Léglise
BY
ATTORNEY

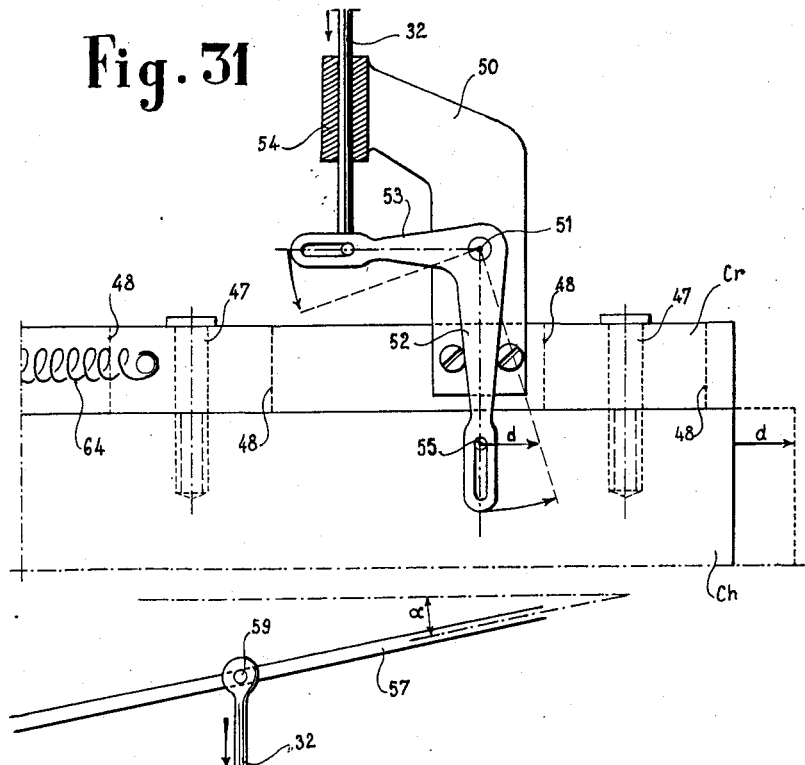
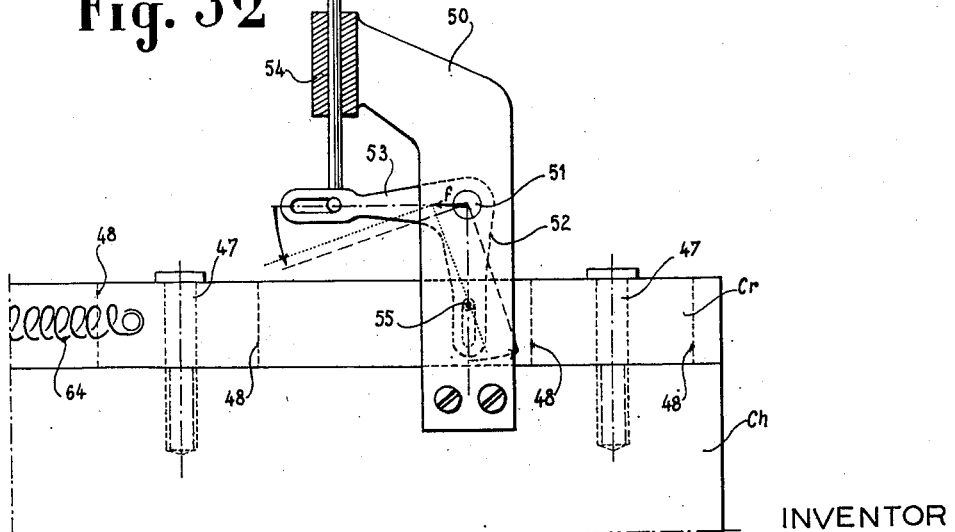

Dec. 7, 1954 P. LÉGLISE 2,696,286
APPARATUS FOR JUSTIFYING TYPEWRITTEN MATERIAL
Filed March 15, 1951 28 Sheets-Sheet 9

INVENTOR
Pierre Léglise
BY
ATTORNEY

Dec. 7, 1954   P. LÉGLISE   2,696,286
APPARATUS FOR JUSTIFYING TYPEWRITTEN MATERIAL
Filed March 15, 1951   28 Sheets-Sheet 10

INVENTOR
Pierre Léglise
BY
*signature*
ATTORNEY

Fig. 39

Dec. 7, 1954 P. LÉGLISE 2,696,286
APPARATUS FOR JUSTIFYING TYPEWRITTEN MATERIAL
Filed March 15, 1951 28 Sheets-Sheet 13

INVENTOR
Pierre Léglise
BY
ATTORNEY

Dec. 7, 1954  P. LÉGLISE  2,696,286
APPARATUS FOR JUSTIFYING TYPEWRITTEN MATERIAL
Filed March 15, 1951  28 Sheets-Sheet 14

INVENTOR
Pierre Léglise
BY
H.C. Bierman
ATTORNEY

Dec. 7, 1954  P. LÉGLISE  2,696,286
APPARATUS FOR JUSTIFYING TYPEWRITTEN MATERIAL
Filed March 15, 1951  28 Sheets-Sheet 15

INVENTOR
Pierre Léglise
BY
H.C. Bierman
ATTORNEY

Dec. 7, 1954  P. LÉGLISE  2,696,286
APPARATUS FOR JUSTIFYING TYPEWRITTEN MATERIAL
Filed March 15, 1951  28 Sheets-Sheet 16

INVENTOR
Pierre Léglise
BY
ATTORNEY

INVENTOR
Pierre Léglise
BY
HCBierman
ATTORNEY

Dec. 7, 1954 P. LÉGLISE 2,696,286
APPARATUS FOR JUSTIFYING TYPEWRITTEN MATERIAL
Filed March 15, 1951 28 Sheets-Sheet 18
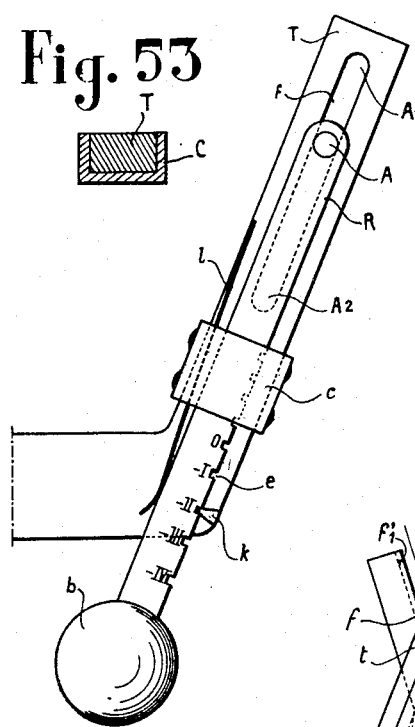
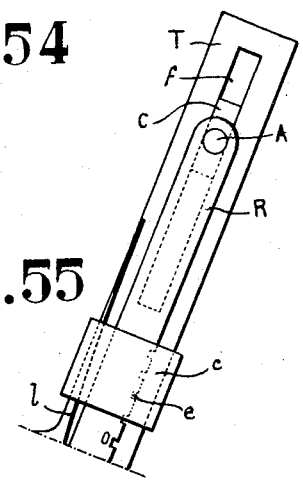
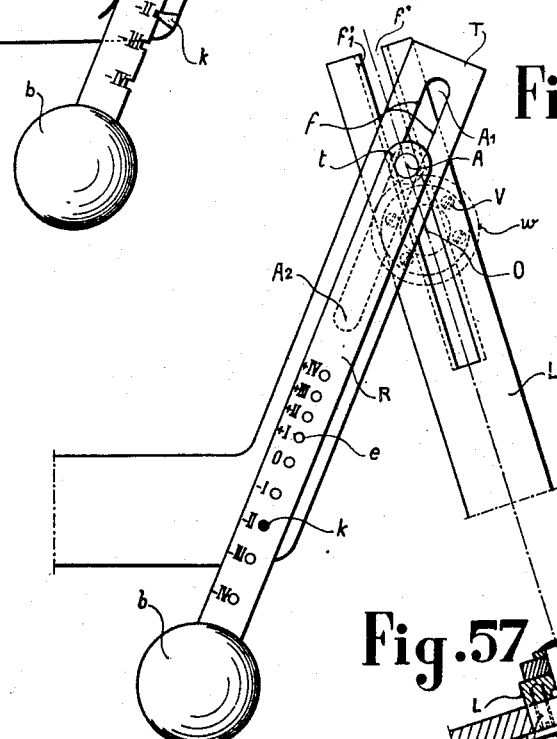
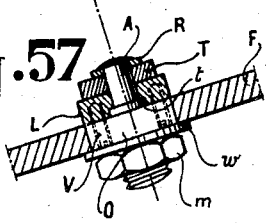
INVENTOR
Pierre Léglise
BY
ATTORNEY Dec. 7, 1954 P. LÉGLISE 2,696,286
APPARATUS FOR JUSTIFYING TYPEWRITTEN MATERIAL
Filed March 15, 1951 28 Sheets-Sheet 19
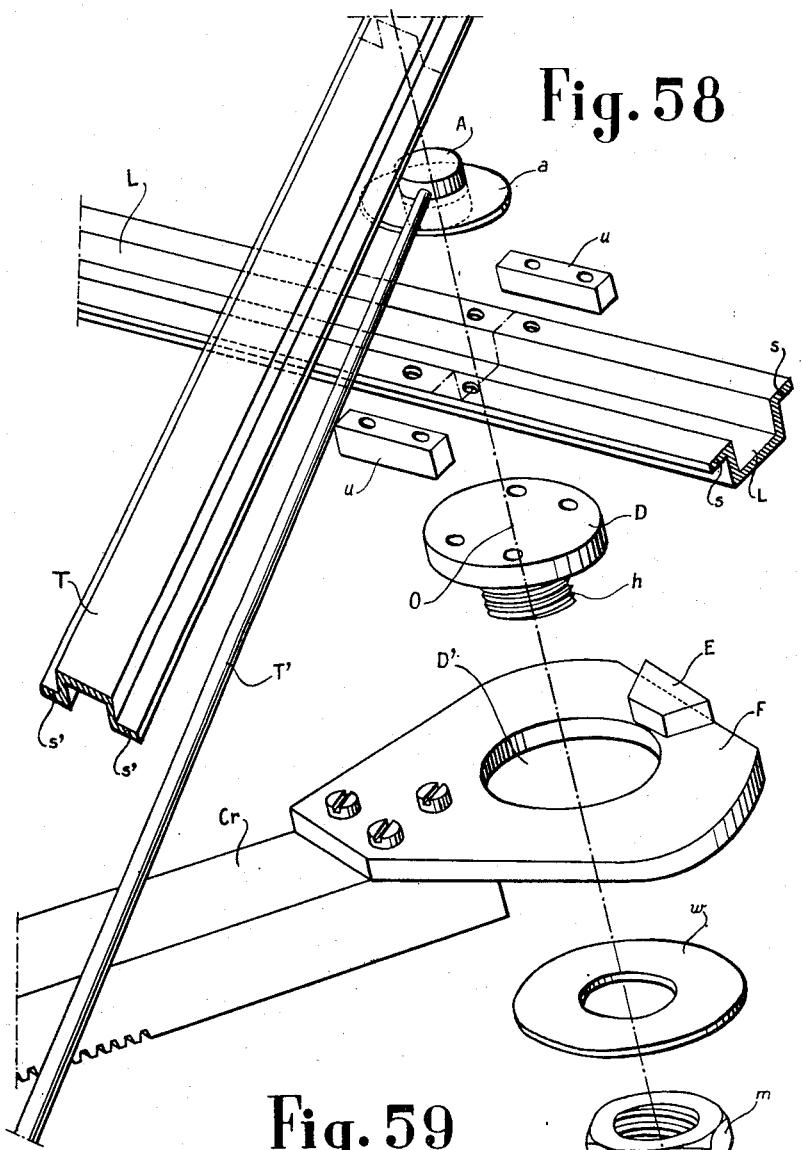
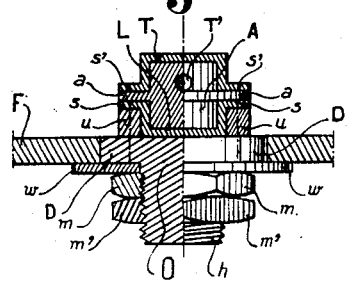
INVENTOR
Pierre Léglise
BY
ATTORNEY Dec. 7, 1954            P. LÉGLISE            2,696,286
APPARATUS FOR JUSTIFYING TYPEWRITTEN MATERIAL
Filed March 15, 1951                       28 Sheets-Sheet 20

INVENTOR
Pierre Léglise
BY
ATTORNEY

Dec. 7, 1954   P. LÉGLISE   2,696,286
APPARATUS FOR JUSTIFYING TYPEWRITTEN MATERIAL
Filed March 15, 1951   28 Sheets-Sheet 21
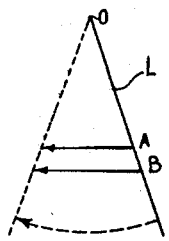
Fig.62
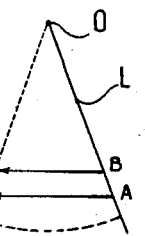
Fig.63
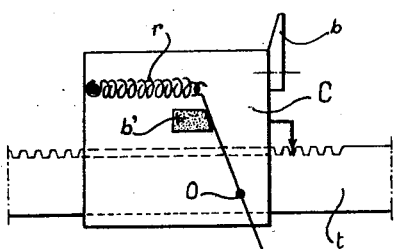
Fig. 64
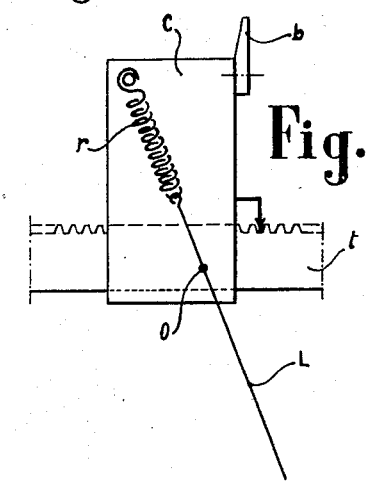
Fig. 65
Fig. 66
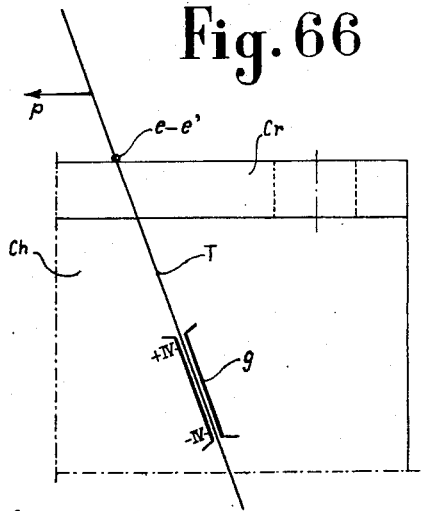
Fig.69  Fig.70
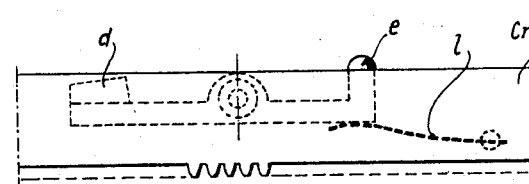
Fig.67
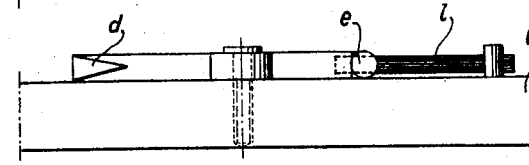
Fig.68
INVENTOR
Pierre Léglise
BY
H. C. Bierman
ATTORNEY Dec. 7, 1954 P. LÉGLISE 2,696,286
APPARATUS FOR JUSTIFYING TYPEWRITTEN MATERIAL
Filed March 15, 1951 28 Sheets-Sheet 22
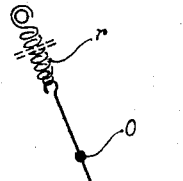
Fig. 71
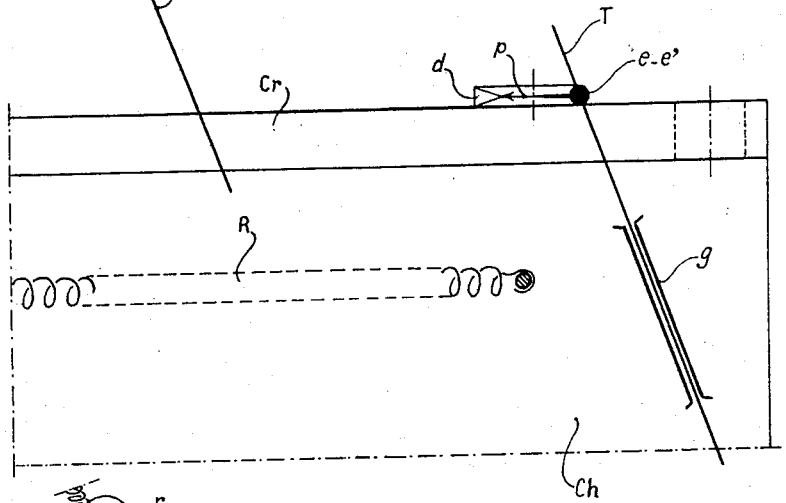
Fig. 72
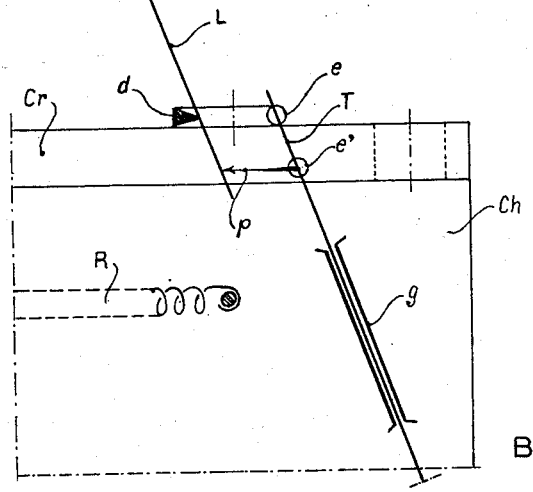
INVENTOR
Pierre Léglise
BY
ATTORNEY Dec. 7, 1954          P. LÉGLISE          2,696,286
APPARATUS FOR JUSTIFYING TYPEWRITTEN MATERIAL
Filed March 15, 1951          28 Sheets-Sheet 23
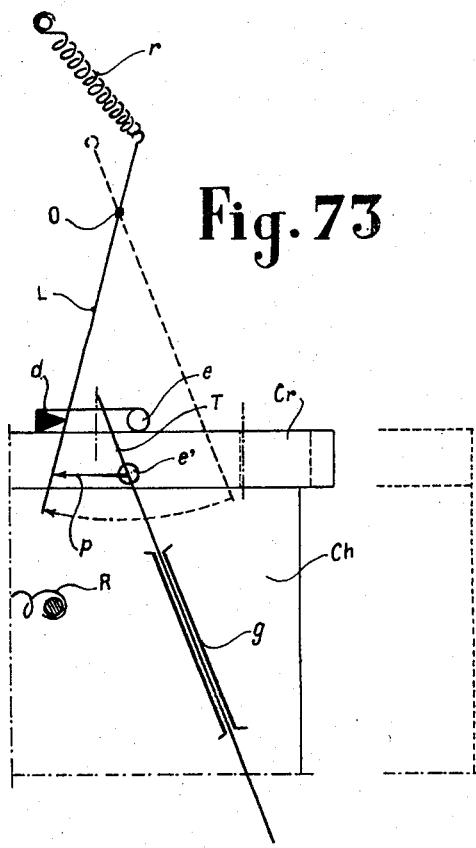
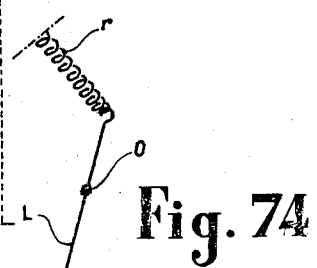
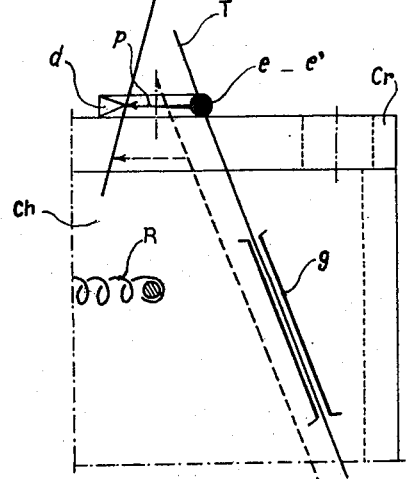
INVENTOR
Pierre Léglise
BY
ATTORNEY Dec. 7, 1954  P. LÉGLISE  2,696,286
APPARATUS FOR JUSTIFYING TYPEWRITTEN MATERIAL
Filed March 15, 1951  28 Sheets-Sheet 24

INVENTOR
Pierre Léglise
BY
H.C. Bierman
ATTORNEY

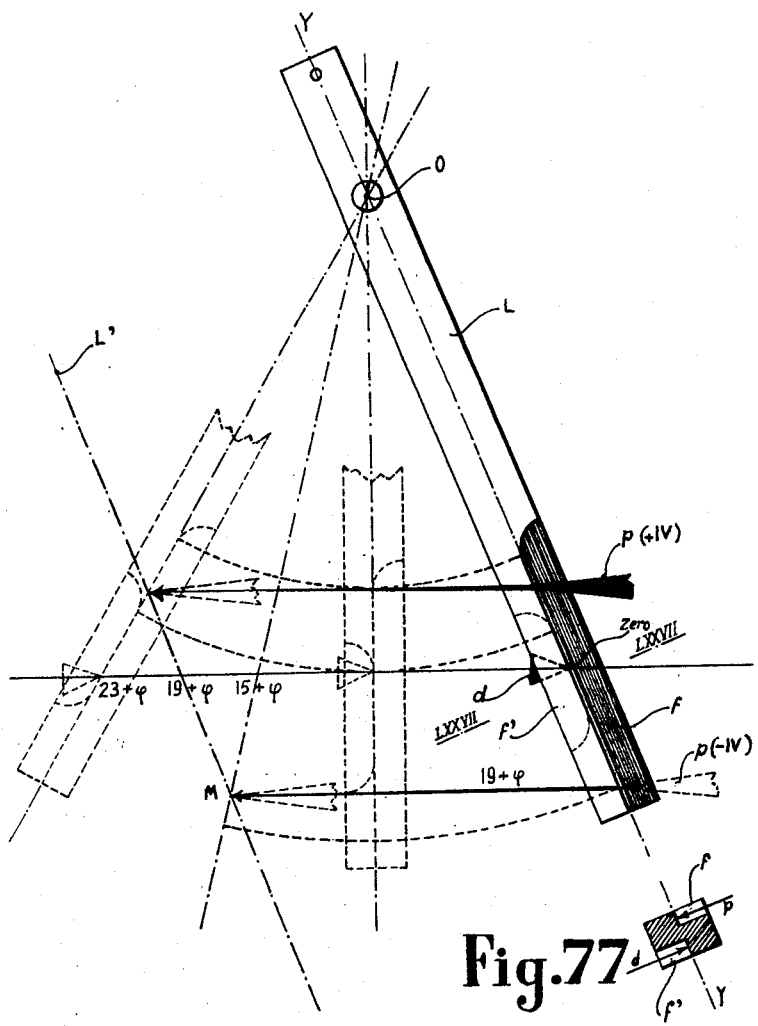

Dec. 7, 1954  P. LÉGLISE  2,696,286
APPARATUS FOR JUSTIFYING TYPEWRITTEN MATERIAL
Filed March 15, 1951  28 Sheets-Sheet 26
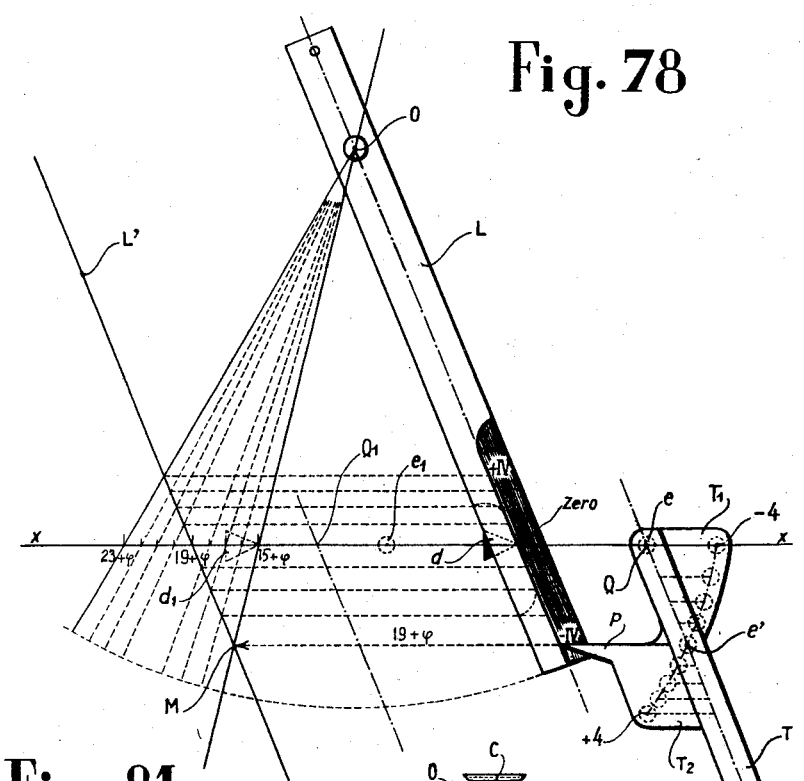
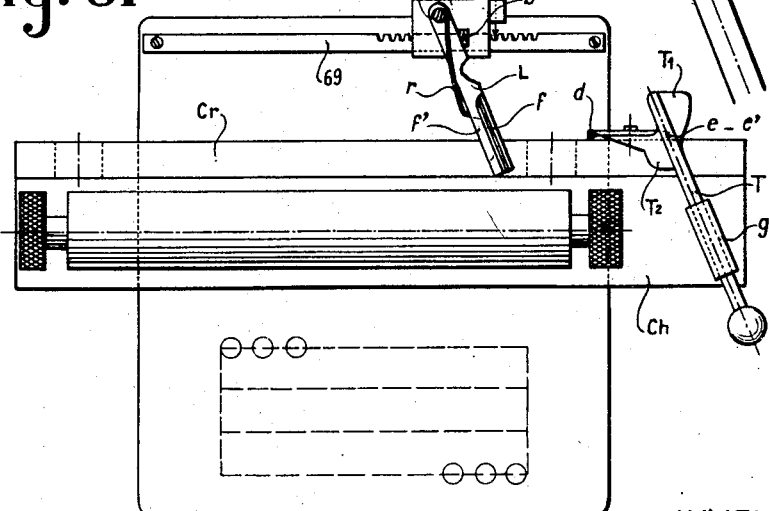
INVENTOR
Pierre Léglise
BY
ATTORNEY Dec. 7, 1954  P. LÉGLISE  2,696,286
APPARATUS FOR JUSTIFYING TYPEWRITTEN MATERIAL
Filed March 15, 1951  28 Sheets-Sheet 27

INVENTOR
Pierre Léglise
BY
ATTORNEY

United States Patent Office 2,696,286
Patented Dec. 7, 1954

2,696,286

APPARATUS FOR JUSTIFYING TYPEWRITTEN MATERIAL

Pierre Léglise, Paris, France

Application March 15, 1951, Serial No. 215,748

9 Claims. (Cl. 197—84)

The present invention relates to a process for the justification of typewritten material and typewriters for the application of this process.

In existing typewriters designed to permit justification, this operation is carried out in a first category of typewriters, by modifying only the spaces between the words; in a second category of typewriters, by modifying both the spaces between the words and the spaces between the characters. Whatever principle of justification is applied to these typewriters, the justification entails the typing of a preliminary copy, or copy of reckoning. According to the usual processes, this preliminary typing is indeed indispensable in order to visualise the structure of the lines to be justified, viz., the surplus or lack of characters on the right-hand side which it is necessary to absorb or spread out in the course of the final typing so that the text may be in the form of a perfect column.

The typewriters which carry out justification by modification of the spaces between the words can, in their turn, be classed into two groups: the group in which the typist modifies the spaces at will; and the group in which the spaces are automatically adjusted by the typewriter itself to an identical value for a given line.

The relatively simple typewriters of this first group comprise, for instance, two space-bars; the one producing a normal spacing corresponding to the width of one character, and the other a different spacing corresponding, for instance, to half-spacing. By judicious operation of the two space-bars, it is possible to extend or narrow within certain limits a line of a given length in order to bring it up or back to a different length, likewise given.

The right-hand margin having been drawn on the paper intended for the preliminary work, the typist stops the typing of the lines so as not to exceed: on the one hand, the limit of absorption permitted by the value of the word spacing which has been initially adopted, and, on the other hand, a reasonable limit of extension. She further needs to count, for each line, the number of characters too few or too many in relation to the margin, and to write down this number with regard to the line: for example —3 for a line three characters too short, and +4 for a line four characters too many.

In a line consisting of nine words and therefore eight spaces, in order to fill up a hollow of 3 characters (—3), she must then, for instance, use successively: for each of the first six spaces, the normal space-bar and the half-space bar, next, for the two last spaces, the normal space-bar alone. On the contrary, to absorb a surplus of 4 characters (+4), one should only employ the half-space bar for all the spaces. These operations demand concentrated attention; besides, there is no certainty that the spaces between words will all have the same value in the justified line.

In the much more complicated typewriters of the second group, a counting mechanism registers during the preliminary typing the number of spaces contained in the line to be justified. This typing is carried out on a piece of paper rolled on the platen on the left of the paper intended for the final copy, the typing of the justified line on the right-hand paper following immediately, in sequence and in time, that of the line which is not justified.

At the completion of the preliminary typing, the space-counting mechanism itself regulates (according to the value of the surpluses or hollows then registered by a convenient component part) the justifying mechanism proper which gives to these spaces in the course of the final typing, without any intervention of the typist, the reduced or increased value from which the justification results, the spaces then all being equal in contrast to the simple typewriters of the first group.

The problem of justification on the entire length of the lines comprises two independent variables: in the first place, the number of characters too few or too many in the line to be justified in relation to the fixed width for the column of text, and, in the second place, the number of words in the same line. Therefore, its solution is geenrally given in these typewriters by a camoid, a component part of a very special finish and whose automatic control is, moreover, relatively complicated, this part having, for example, to shift itself along its axis in relation to the first variable, and to turn automatically in relation to the second variable. Thus, the typewriters which operate according to this principle are delicate and of a difficult design.

The typewriters modifying both the spaces between the words and the spaces between the characters comprise: either mechanisms built in their structure at the time of assembly, or an easily removable accessory equipment. Both mechanism and equipment bring about the continuous widening or narrowing of lines to the desired degree, on the entire length of these lines. In these typewriters, besides certain initial adjustment in relation to the desired width of the column, the justifying mechanism must be set, for each line to be justified, to the positive or negative figure marked on the preliminary copy, after which, it is true, the continuous contraction or extension of this line is perfectly automatic during the course of the final typing. Again, the problem of justification on the entire length of the lines, as solved by these typewriters, is a problem with two variables, these said variables being this time: first, the fixed width for the column of text and, second, the number of characters too many or too few in each line to be justified.

Certain typewriters which have a built-in justifier mechanism and which apply the principle of continuous contraction or extension, only modify the density of the typing, however, on a certain central segment of the lines, a segment of constant length. This process has the disadvantage of restricting to a few determined values the widths likely to be given to the columns of text.

The necessity of a preliminary typing constitutes a major drawback in the known processes of justification. This typing must, moreover, be carried out with the same care as the final typing. If, in the execution of the preliminary typing, the typist makes a mistake which affects the length of the line, one of two things may occur: either she repeats the said mistake in the course of the final typing and the line is in this case incorrect although justified, or she does not repeat the mistake and the justification is not achieved. The preliminary copy must thus be read with care in order to take into account, during the reckoning of the surplus or lacking characters, the mistakes that the line considered may contain. The fact that the reckoning of characters may be automatic in certain justifying typewriters of the present day does not eliminate the necessity of this check-reading, the possible errors of the typing having to be compensated by a suitable shifting of the carriage before going on to the final typing on the paper placed on the right of the platen.

Altogether, these operations are extremely lengthy. Practice shows that the obtaining of a text justified by a typewriter requires, according to the process of justification used, from two to three and a half times more time than the ordinary typing of the same text. It is the loss of time entailed in the typing of a preliminary copy which prevents justification from becoming general in the province of typing, although the presentation of texts in the form of perfect columns constitutes, from the aesthetic point of view, an improvement the benefit of which no one will deny.

The present invention has first of all as its object, a process of justification in which justification is obtained at once, that is to say, without requiring the typing of a preliminary copy.

According to this process, the justification is achieved by the continuous contraction or extension of the typing in the latter part of the lines only, the length of this latter part (called in what follows the "terminal segment") being brought to a constant value, fixed by construction, such that the spreading-out or the narrowing of the characters necessary to the justification does not entail any unpleasing effects.

Practice shows that a play of eight characters, for instance 4 characters too many or 4 characters too few in relation to the margin, allows one to deal with all cases of the division of words into syllables likely to occur, even in languages other than Latin languages in which the division of words, by not employing a system of caesura similar to that ruling French typography, may result in bigger groupings of characters than syllables of Latin languages. Practice shows also that an extreme attention is required to detect the narrowings and widenings ranging about 10 per cent of the normal typing density, while narrowings and widenings of 20 per cent are easily acceptable to the eye. Under these conditions, a play of ±4 characters may be absorbed in a terminal segment of line whose length corresponds to 20 normal characters.

This being noted, from a practical point of view, the process involved in the present invention may be applied under satisfactory conditions by taking as the value of this terminal segment, a value expressed in number of key strikings, the number 20. It should be well understood, however, that the value chosen for the terminal segment may be just as well any other number without departing from the spirit and scope of the present invention.

To give an example, in the case of a line consisting of 60 characters (all spaces between two words having the same value as that of one character), the normal speed of typing may be maintained for two-thirds of the line, the supplementary time required for the justification only applying therefore to the last third of the line. Thus, the saving of time is considerable.

The inventor is aware that the process described may give results which are not as perfect as those achieved by the continuous narrowing or widening of the lines on their entire length. Differences in density are in fact likely to occur in the last parts of the lines, but, on the one hand, these differences are not all of the same nature since they consist sometimes in narrowings and sometimes in widenings (a variety which distracts the eye and avoids in any case a uniform change in density starting at a given vertical of the copy, a change which would, of itself, be disastrous), and, on the other hand, the cases of maximum contraction or extension take place only seldom and, even then, only in some languages.

As the time required to justify a text in accordance with the described process does not exceed by an average 50 per cent the time required for the routine typing of the same text, the saving of typing time with respect to the processes of justification applied in known typewriters is such that the drawback likely to result from the unevennesses of density (in most cases hardly noticeable and spread at random in the right-hand section of the work) appears absolutely negligible.

The number 20 mentioned above as likely to be adopted in practice for the value in normal characters of the length of the terminal segment of the line to be manipulated for the purpose of justification, just as the number 4 representing in number of characters the absorption play of text in either direction, are merely quoted as examples, as the inventor does not intend to restrict the scope and materializations of the invention to these numbers alone.

This number 20 is only advanced because it constitutes a judicious compromise between: firstly, the interest which the limitation of justifying operations to a terminal segment as short as possible entails from the point of view of typing time, and, secondly, from an aesthetic point of view, the interest entailed in the spreading-out of the variations of density in a terminal segment as long as possible to accommodate them without any unpleasing effect. A different length of the terminal segment and a different play of characters could be adopted for the justification; this latter could be achieved, for example, on a length of 30 normal characters with terminal segments ranging from 26 to 34 characters. In such a case, the local condensations and extensions of the typing would be at a maximum of 13½ per cent.

In addition to the time gained in typing a text, the end-of-line justification considerably simplifies the mechanisms involved in justification, because the problem of justification now comprises but one variable. An example illustrates in a striking manner the reduction in complexity of the mechanisms according to whether the justification is achieved by the manipulation of the lines on their entire length, or by that of their terminal segments only.

For instance, if one has to justify on column widths varying from 20 to 70 characters, with an absorption play of 4 characters in either direction, the first variable, the length of the line after justification, may assume 51 different values: 20, 21, 22 . . . 68, 69, 70; the second variable, the number of surplus or lacking characters in each line to be justified, may assume 9 different values. In a typewriter equipped with a total justifier, the mechanisms should be able to deal with 459 different cases, while with an end-of-line justifier, only 9 cases. For a typewriter with a terminal justifier, lines of 21, 22, 23 . . . 68, 69, 70 or 71 characters, to be justified respectively to 20, 21, 22 . . . 67, 68, 69, 70 characters, represent the same operative case.

The process above described may be applied in many varied ways, and numerous typewriters may be constructed for its practical application. To serve as examples and for this purpose only, certain of them will now be described. For the understanding of the descriptions of these typewriters in the exposé below, the terms "frame," "platen," "carriage" and "rack" applied to these typewriters have the following meanings: the frame is the body upon which the parts of the typewriter are mounted; the platen is the cylindrical part around which the paper is rolled; the carriage is that part which carries the platen and displaces itself character by character with each single striking of the keys or of the space-bar by the typist; the rack is the lengthwise part mounted on the carriage which a ratchet wheel keeps motionless, only freeing it at the time of each striking of a key or space-bar, its advance character by character being then provoked by the action of a return spring attached to the carriage. In the following examples, it is presumed that, in accordance with current practice, the rack is mounted on the carriage, the ratchet wheel being, in this case, necessarily mounted on the frame; but it should be understood that the invention is not confined to typewriters of this kind and that it embraces also any typewriter, designed for the application of the process described above, in which the rack might be mounted on the frame and the escape gear mounted on the carriage.

In the typewriters of the present day, the three elements defined above: platen, carriage and rack move lengthwise en bloc on the frame, character by character. In contrast, in a typewriter in which, according to the present invention, the justification is achieved by the continuous extension or contraction of the terminal part of each line only, whatever mechanism may be used to bring about this extension or contraction, the platen, instead of being systematically moved by a segment equal to one normal character at each touch of the keys, is moved in absolute value, during the justification-period, by a segment of a different length; greater in the case of lengthening, smaller in the case of contraction.

Following the present invention, such displacements of the platen are obtained by the splitting-up into two parts of the block of the three aforementioned elements, hitherto longitudinally integral, and by the linking-up of these two parts in a slidable manner one in relation to the other, one of these parts comprising one of the three aforementioned elements, and the other comprising the two other elements.

It should be noticed that in the accomplishment of this splitting-up two arrangements only are practicable and therefore to be taken into consideration, for, whatever splitting-up is adopted, the part containing the rack constitutes the reference-part of the system, since as the rack is held by the ratchet-wheel, it is always on this part that the other part shifts.

Thus, the carriage serving as intermediary between the rack and the platen, from the point of view of establishing the parts which slide relatively one upon the other, two combinations should be considered: that of the carriage with the rack and that of the carriage with the platen.

In the first of these combinations, the reference-part of the system is the carriage-plus-rack block, and the part moving in relation to this reference-part is the platen sliding on the carriage. When the carriage-plus-rack block moves forwards character by character at each striking of the keys, the platen moves forwards or backwards in relation to the carriage, during the justification-period, by the fraction of normal character necessary to the justification.

In the second of these combinations, the reference-part of the system is formed by the rack alone, and the relatively mobile part is the carriage-plus-platen block sliding on the rack. When the rack moves forwards character by character at each striking of the keys, the carriage-plus-platen block moves forwards or backwards in relation to it, during the justification-period, by the fraction of normal character necessary to the justification.

When the relative-slidings system is constituted by the platen on the one hand and the carriage-plus-rack block on the other hand, the platen being thus mobile in translation on the carriage which supports it, the typewriter so arranged may embody at least one of the following characteristics:

a. A sliding platen fitted at one of its ends with a circular groove engaging the piece controlling its lengthwise shiftings in relation to the carriage-plus-rack block;

b. A platen provided with driving means for the lengthwise moving of the feed and pressure rollers during the end-of-line typing;

c. A structure of such driving means of the feed and pressure rollers embodying two side-plates enframing the platen and these feed and pressure rollers; a cross-bar for connecting these two side-plates together; bearings integral with these side-plates and centered around the platen shaft; a mounting axle for the feed and pressure rollers; elongated openings for the passing of this axle through the side-plates, and return springs for applying the feed and pressure rollers against the platen.

Whether it is a question of a justifying typewriter with the system of platen sliding on the carriage-plus-rack block, or a typewriter with the system of carriage-plus-platen block sliding on the rack, this typewriter is fitted with an adjustable justifier which determines, consequent upon each striking on the keyboard and only during the typing of the terminal segment, the relative sliding required in its system of relatively sliding parts, the justification of each line thus being obtained automatically in the course of the typing of the terminal segment and without any intervention of the typist other than that required by the adjustment of the said justifier before this typing.

Many justifying typewriters with an end-of-line justifier of this kind may be constructed and the present invention embraces all these typewriters. By way of example and for this reason only, three main types of machines of this kind will now be described.

I. In the typewriters of the first of these types, or typewriters with a rectilinear guide and touching rod, the adjustable end-of-line justifier comprises: in the first place, a rectilinear guide mounted on the frame, a rod ending in a touching finger which, during the end-of-line justification-period, is engaged by the said guide, means for the transmission of the displacements of the touching rod to the part sliding on the reference-part and, in the second place, means for the adjustment of one of the aforementioned elements: rectilinear guide or transmission means, in accordance with each case of justification to be carried out. The construction of typewriters of this type thus gives rise to two important groups, these being: the group of typewriters in which the rectilinear guide is fitted with means of adjusting its inclination with respect to the touching rod, and the group of typewriters in which the rectilinear guide has a fixed inclination.

In all these typewriters, the rectilinear guide actuating the touching rod may itself be arranged in different ways, for example, with one of the following elements: a rail, groove, slot, or ramp, the tip of the touching rod having a structure corresponding to that of the guide. When the rectilinear guide actuating the touching rod is fitted with means of adjusting its inclination with respect to this rod, the transmission means of the displacements of the said rod to the shifting part are characterized by a constant ratio of the displacements they transmit to the displacements they receive and these same means may comprise one of the following elements: a ramp, rail, groove, or slot (this element being rectilinear and carried by a slider on a fixed inclination), a gear-train of constant ratio, a bell-crank whose lever-arm lengths are in constant ratio one to the other, a straight lever whose lever-arm lengths are in constant ratio one to the other, and a socket with helicoidal thread.

When the inclination of the rectilinear guide actuating the touching rod remains invariable, the transmission means of the displacements of the touching rod to the sliding part are fitted with means of adjusting the ratio of the displacements they transmit to the displacements they receive, and these same means may comprise one of the following elements: a ramp, rail, groove, slot (this element being rectilinear and of adjustable inclination on its support, the said support itself capable of being constructed in various ways and made up, for example, of a pivoting disc, a pivoting sector, a pivoting arm), a gear-train of variable ratio, a bell-crank whose lever-arm lengths are in adjustable ratio one to the other, and a straight lever whose lever-arm lengths are in adjustable ratio one to the other.

In the justifying typewriters with a platen sliding in relation to the carriage-plus-rack block of the first type in question, that is to say, with an end-of-line justifier comprising a rectilinear guide actuating a touching rod, the rectilinear guide may then:

a. Be fitted with means of adjusting its inclination on the frame, and the complementary part of the justifier: touching rod and transmission means, with a constant ratio of the displacements of this rod to the displacements of the platen, mounted on the carriage to control the relative shiftings of the said platen on the carriage-plus-rack block;

b. Be mounted on a fixed inclination on the frame, and the complementary part of the justifier: touching rod and transmission means, fitted with means for adjusting the ratio of the displacements of the said rod to the displacements of the platen, and mounted on the carriage to control the relative shiftings of the said platen on the carriage-plus-rack block.

In the justifying typewriters with carriage-plus-platen block shifting in relation to the rack of the same first type in question, the rectilinear guide of the end-of-line justifier may similarly:

a. Be mounted at an adjustable inclination on the frame while the complementary part of the justifier: touching rod and transmission means, with a constant ratio of the displacements of this rod to the displacements of the carriage-plus-platen block, is mounted on the carriage in order to control the relative shiftings of the said block on the rack; or on the rack in order to control the relative shiftings of the said block on the racks; or:

b. This rectilinear guide may be mounted at a fixed inclination on the frame with the touching rod carried by the rack and the transmission means, with an adjustable ratio of the displacements of this rod to the displacements of the carriage-plus-platen block, mounted, together with their adjusting means, on the carriage to control the relative shiftings of the said block on the rack, or the touching rod carried by the carriage and the transmission means, with an adjustable ratio of the displacements of this rod to the displacements of the carriage-plus platen block, mounted, together with their adjusting means, on the rack to control the relative shiftings of the said block on the rack.

II. In the justifying typewriters of the system in which the platen shifts on the carriage-plus-rack block, just as in the justifying typewriters of the system in which the carriage-plus-platen block shifts on the rack, of the second type mentioned above, the end-of-line justifier comprises a stop of position on the frame fixed for a given piece of work (this stop being called actuating-stop for sake of convenience); a justifying lever swivelling, during the justification-periods only, around an axle which is mobile because integral with one of the two parts of the relative-slidings system formed on the typewriter (system of carriage-plus-platen block shifting on the rack; system of platen shifting on the carriage-plus-rack block), and which is in contact with the said actuating-stop from the beginning of these periods; and a member whose position is adjustable along a piece integral with the other of these parts of the relative-slidings system and constantly in engagement with the justifying lever.

Numerous typewriters fitted with such a justifier may be constructed within the bounds of the present invention. These typewriters may present, for example, at least one of the following characteristics:

a. The justifying lever swivelling around a mobile axle may be brought back by elastic means into contact with a stop mounted on that part of the relative-slidings system which carries it, determining the position of the said lever outside the periods of justification and until the beginning of these periods, called the rest-position;

b. This same justifying lever may be fitted with a rectilinear guide for the longitudinal guiding of a pin, the axis of symmetry of this said guide passing through the center of swivelling of the lever;

c. The rest-position of the swivelling lever may be approximately symmetrical to that taken by the said lever at the completion of the typing of terminal segments not requiring justification, in relation to an axis passing through the center of swivelling of the said lever and perpendicular to the direction of displacement of this center;

d. The end of the justifying lever working in the vicinity of the stop of the frame (actuating-stop) may comprise a rectilinear cutting whose line when produced passes through the center of swivelling of the said lever, the said cutting being attacked by the actuating-stop from the very beginning of the justifications;

e. The justifying lever may turn on contact with one of the faces of its support on the part of the relative-slidings system which carries it;

f. The piece along which the member of adjustable position shifts is a rod of fixed direction, this direction being parallel to that of the justifying lever in the rest-position;

g. The member of adjustable position may be a slider surrounding, at least partially, the rod along which it shifts, and fitted with a pin which moves in the rectilinear guiding element carried by the justifying lever;

h. The member of adjustable position may consist of a cylinder with a flat median ring inserted between two straight U-shaped and flanged channels forming, on the one hand, the piece along which the said member shifts for its adjustments, and, on the other hand, the justifying lever, the tips of the cylinder moving in the U of the channels and the faces of the median ring in contact with their flanges;

i. The member of adjustable position may be a slider with a pin, this slider moving in a rectilinear guiding element machined in the supporting piece of the said slider parallel to the rest-position of the justifying lever, and the pin moving in the rectilinear guiding element of the justifying lever;

j. The small bar mounted on the member of adjustable position to control its displacements may be elastic, to allow the locking of the said member in each of its positions on the piece which supports it;

k. The control bar of the member of adjustable position may be hinged on the said member and recalled by elastic means, to assure the locking of the said member in each of its positions on the piece which supports it.

In a typewriter with justifying lever swivelling round a mobile axle, again, the end-of-line justifier may comprise a combination of the characteristics above defined under a to k with the justifying lever designed according to one of the ways above defined under a to d and mounted according to any one of the arrangements defined under e, the member of adjustable position and its support being designed and mounted according to any one of the arrangements defined under f—g, h, i and the locking of the member of adjustable position being designed according to any one of the arrangements defined under j to k.

A justifying typewriter of such a type may embody one of the following characteristics:

a. The axle of articulation of the justifying lever is integral with one of the two parts: rack, carriage-plus-platen block of the relative-slidings system formed on the typewriter, and the piece carrying the member of adjustable position engaged with the said lever is integral with the other of these parts, in order to control the relative shiftings of the carriage-plus-platen block on the rack; or, b. The axle of articulation of the justifying lever is integral with one of the two parts: platen, carriage-plus-rack block of the relative-slidings system formed on the typewriter, and the piece carrying the member of adjustable position engaged with the said lever is integral with the other of these parts, in order to control the relative shiftings of the platen on the carriage-plus-rack block.

III. In the justifying typewriters of the system of the platen shifting on the carriage-plus-rack block, as in the justifying typewriters of the system of carriage-plus-platen block shifting on the rack, of the third type previously alluded to, the adjustable end-of-line justifier comprises:

a. A justifying lever swivelling, during the justification-periods only, around an axle of fixed position on the frame for a given piece of work;

b. A back support stop for the justifying lever mounted on one of the two parts of the relative-slidings system formed on the typewriter (system of carriage-plus-platen block shifting on the rack; system of platen shifting on the carriage-plus-rack block), and in contact with the said lever during the periods of justification only from the very beginning of these periods;

c. A locking-device of the two parts of the relative-slidings system, locking the said parts together during the period of normal typing;

d. A member of adjustable position integral with a piece mounted on that one of the two parts of the relative-slidings system which does not carry the back support stop in contact with the justifying lever during the justification-periods only, from the very beginning of these periods.

Numerous typewriters provided with such a justifier may again be constructed within the bounds of the present invention. Such typewriters may comprise, for example, at least one of the following characteristics:

a. The piece carrying the axle of the justifying lever comprises, on the one hand, a stop, and on the other hand, an elastic means for bringing the said lever back into contact with this stop, the said stop determining the position of the justifying lever outside the justification-periods and until the beginning of these periods, this position being called the rest-position;

b. The elastic means for bringing the justifying-lever back into the rest-position is attached to the piece carrying the said lever, at a point situated on the prolongation of the rest-position of the said lever, this arrangement avoiding the use of a rest-stop;

c. In the case of a typewriter presenting one of the above characteristics a or b:

1. When at rest, the justifying lever is in a position approximately symmetrical to that which it occupies at the time of the completion of terminal segments not requiring justification, in respect to the axis drawn through the center of swivelling of the said lever perpendicularly to the direction of displacement of its back support-stop.

2. The working-end of the justifying-lever comprises two lateral cuttings which are diagonally opposite and one above the other, the left cutting for the actuating-stop and the right for the member of adjustable position, the inner-walls of the cuttings being in a vertical median plane passing through the center of pivoting of the lever;

3. The justifying-lever has laterally a hollow between its axle of articulation and its working-end, to avoid any contact with the end of the piece carrying the member of adjustable position;

4. The back support-stop of the justifying-lever and the locking-device of the two parts of the relative-slidings system formed on the typewriter (system of carriage-plus-platen block shifting on the rack; system of platen shifting on the carriage-plus-rack block) are fastened together so that this stop may be sunk by the locking-operation and, inversely, brought back into place by the unlocking-operation;

5. The locking-device of the two parts of the relative-slidings system formed on the typewriter is controlled by the setting displacements of the member of adjustable position, the said parts being locked for one position only of the said member;

6. The locking-device alluded to under 4 and 5 comprises a pivot pin with walls forming an unlocking-ramp;

7. The member of adjustable position is a touching-device integral with a controlling-system (adjustment-system of the justification) which displaces its axis on the part of the relative-shiftings system which carries it;

8. The axis of the justifying adjustment-stem is parallel to the direction of the justifying-lever in the rest-position;

9. The lower face of the justifying-adjustment-stem comprises a single lock-housing for the locking-pin.

10. The justifying adjustment-stem comprises, in the vicinity of its lock-housing, lateral bosses whose lower faces are in the plane of its own lower face, these bosses keeping the locking-device lowered for all positions of the said stem other than its locking-position;

11. The justifying adjustment-stem and the part of the relative-slidings system on which this stem shifts at the time of adjustment are provided with means of locking the said stem on the said part in each of its positions corresponding to the various cases of justification;

d. In the case of a justifying typewriter conforming to one of those lately defined under a to c, the back support-stop of the justifying lever is integral with one of the two parts: rack, carriage-plus-platen block, of the relative-slidings system formed on the typewriter and the piece carrying the member of adjustable position in contact with the said lever, integral with the other of these two parts, to control the relative shiftings of the carriage-plus-platen block on the rack; and the back support stop of the justifying lever is integral with one of the parts: platen, carriage-plus-rack block of the relative-slidings system formed on the typewriter, and the piece carrying the member of adjustable position in contact with the said lever, integral with the other of these parts, to control the relative shiftings of the platen on the carriage-plus-rack block.

Lastly, in the various justifying typewriters above described which comprise a piece of fixed position on the frame for a given work carrying a member in engagement during the justification-periods only with the part of the justifier mounted on the mobile elements of the typewriter: rack, carriage, platen, the said piece may be provided with means of lengthwise shiftings for the initial adjustment of the right-hand margin characterising the given work.

Then, similarly, following the present invention, in these typewriters, the standard stop limiting the movements of the carriage to the left, utilized in the end-of-line justification to stop the carriage at the end of the normal typing-periods, is preferably mounted on the piece of fixed position for a given work above alluded to.

As has been said, the typewritten texts justified according to the basic process of the present invention, whether by means of typewriters presenting at least one of the above-described characteristics or by means of any other typewriter constructed for the application of this process, constitute new products within the scope of the present invention.

In the drawings appended hereto which are given as examples and which in no way limit the range of the present invention, Figs. 1 and 2 give the diagrams of the two main categories of justifying typewriters which are the subject of the present invention, namely:

Fig. 1, in cross-section through the ensemble rack-carriage-platen, the diagram of a typewriter in which the carriage forms with the rack a block on which the platen is mounted in sliding fashion;

Fig. 2, in cross-section similar to Fig. 1, the diagram of another typewriter in which the carriage forms with the platen a block mounted in sliding relation to the rack;

Fig. 3 is an elevational view of a platen sliding in respect to the carriage-plus-rack block;

Fig. 4 is a cross-section taken along line IV—IV of Fig. 3;

Fig. 5 is a view, partly elevational, partly in longitudinal axial section of a platen equipped with feed and pressure rollers of the typewritten copies, these rollers accompanying the said platen when it shifts in respect to the carriage-plus-rack block;

Fig. 6 is an end elevation view of the arrangement of Fig. 5;

Figure 7:
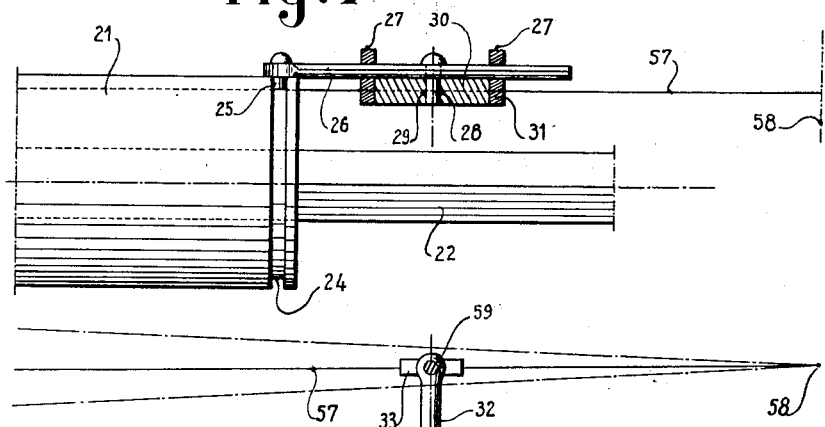
Figure 8:
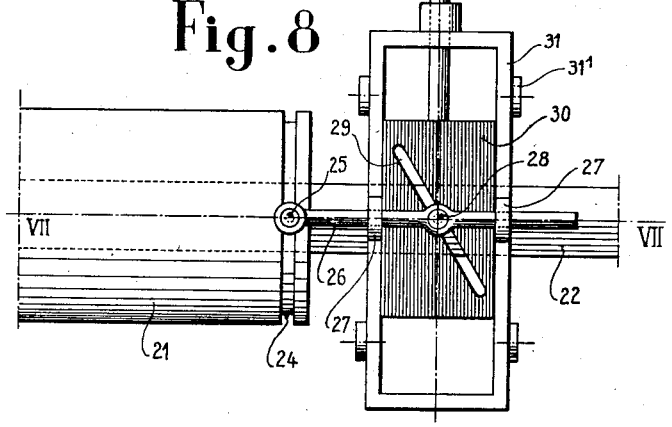
Figure 9:
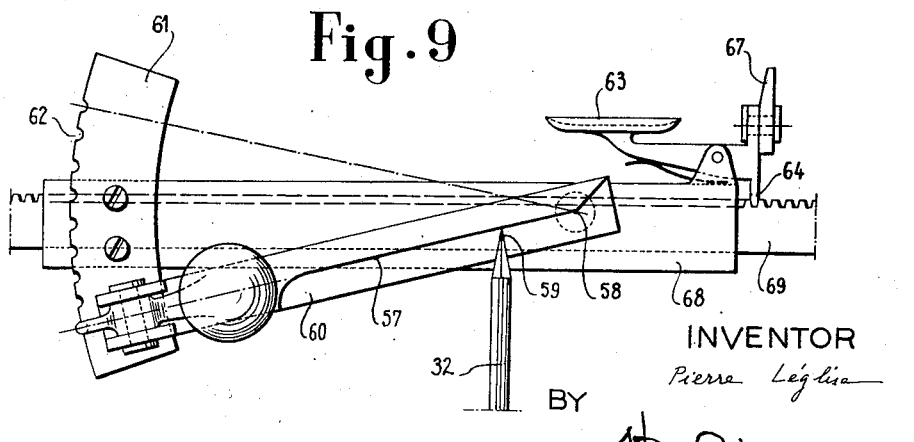

Figs. 7 to 41 deal with examples of justifying typewriters whose end-of-line justifier comprises a rectilinear guide and a touching-rod in contact with this guide during the entire justification-period; in these figures:

Figs. 7 and 8 show an end-of-line justifier with platen shifting on the carriage-plus-rack block and with rectilinear guide of adjustable inclination in respect to the touching-rod; Fig. 7 showing this device partly in vertical section, partly in elevation and Fig. 8 in plan-view;

Fig. 9 shows, in plan, the mounting on the typewriter-frame of a rectilinear guide of variable inclination constituted by a ramp;

Fig. 10 represents a mechanism for transmitting the movements of the touching-rod to a sliding part, this mechanism comprising a pair of gear-wheels whose transmission-ratio is equal to one;

Fig. 11 shows a mechanism similar to the preceding one, giving a constant transmission-ratio greater than one;

Fig. 12 shows another mechanism similar to that of Fig. 10 giving a constant transmission-ratio smaller than one;

Fig. 13 shows another system of transmission by bell-crank with a transmission-ratio equal to one;

Fig. 14 represents a mechanism similar to that of Fig. 13 and giving a constant transmission-ratio greater than one;

Fig. 15 is related to another mechanism of transmission similar to that of Fig. 13 and giving a constant transmission-ratio smaller than one;

Fig. 16 is a modified form of the bell-crank device of Figs. 13 to 16 giving a variable transmission-ratio;

Fig. 17 shows a transmission mechanism comprising a lever whose lever-arm lengths are in constant ratio one to the other;

Figs. 18a, 18b, 18c, show mechanisms similar to Fig. 17 and provided with means of adjusting the lever-arm lengths;

Fig. 19 shows a transmission mechanism by a socket with helicoidal thread giving a constant transmission-ratio;

Figs. 20 and 21 are respectively longitudinal elevation and plan diagrams of a rectilinear guide of variable inclination constituted by a groove;

Fig. 22 is a diagrammatic general plan-view of a justifying typewriter with platen shifting on the carriage-plus-rack block comprising a rectilinear guide formed by a groove of variable inclination of the type of Figs. 20 and 21, and the transmission-mechanisms of Figs. 7 and 8 comprising a slider with a slot of fixed direction.

Figure 25:
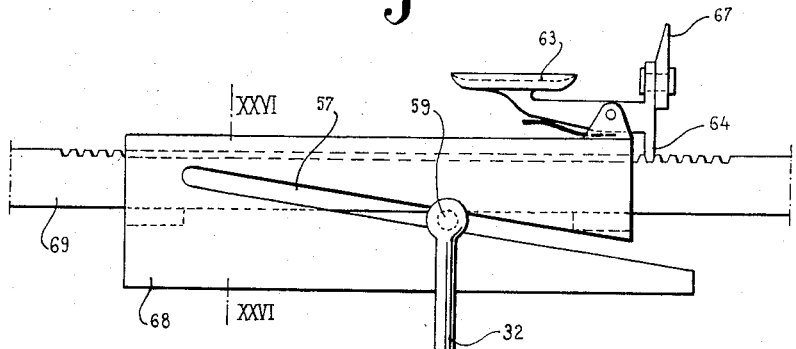
Figure 26:
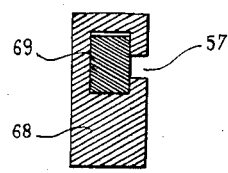
Figure 27:
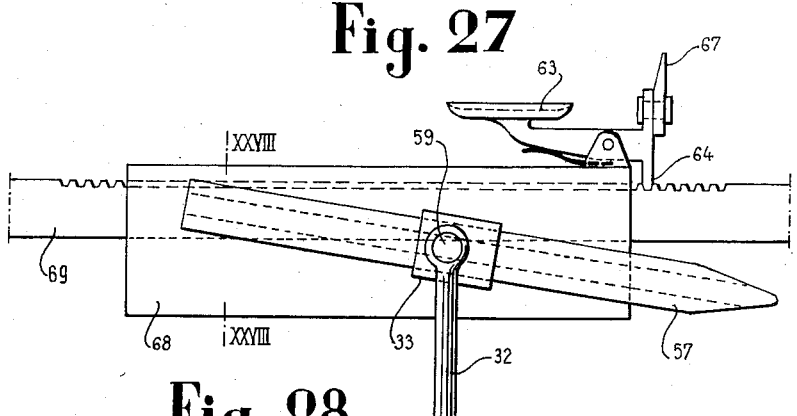
Figure 28:
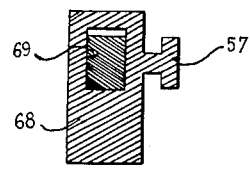
Figure 33:
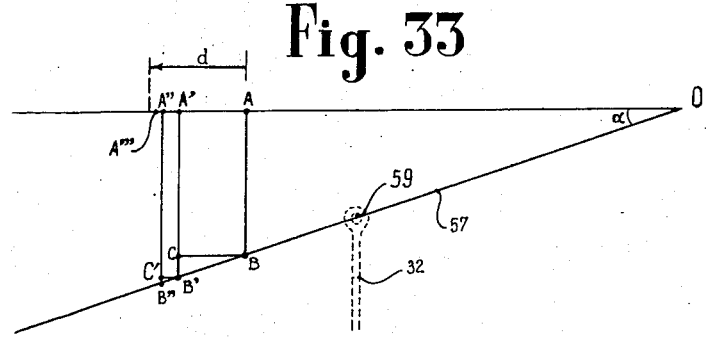
Figure 34:
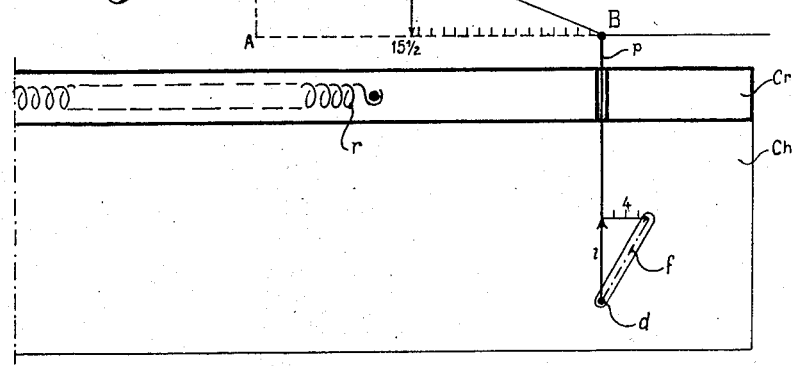
Figure 35:
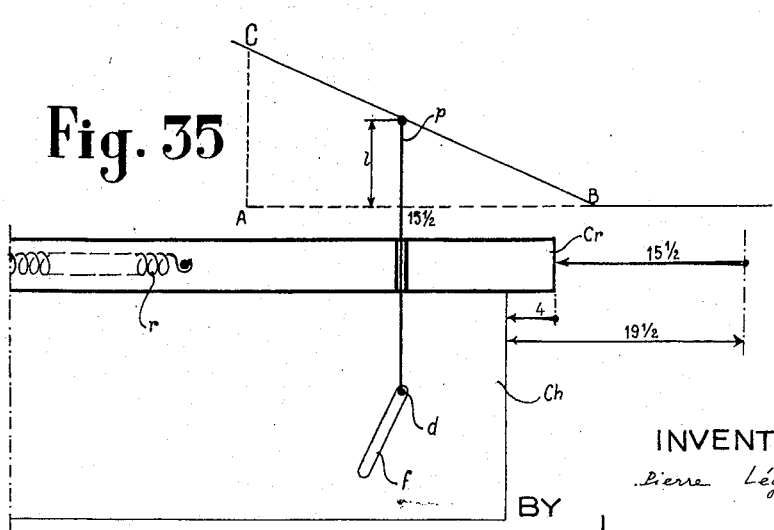
Figure 36:
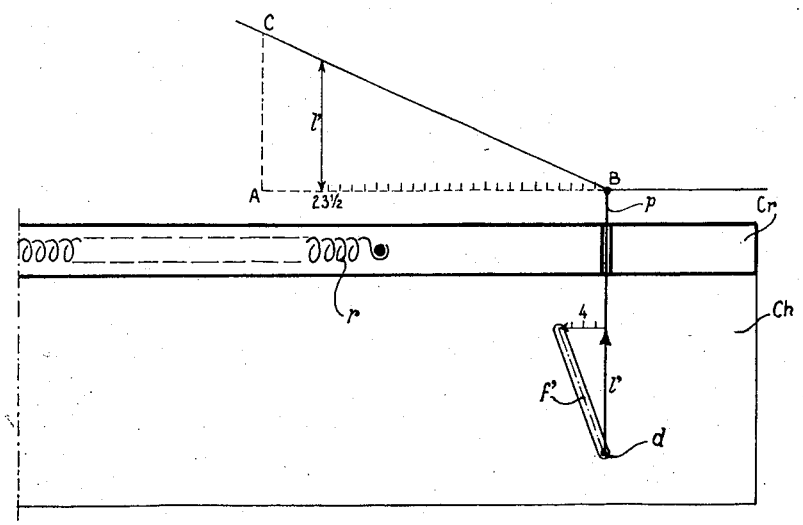
Figure 38:
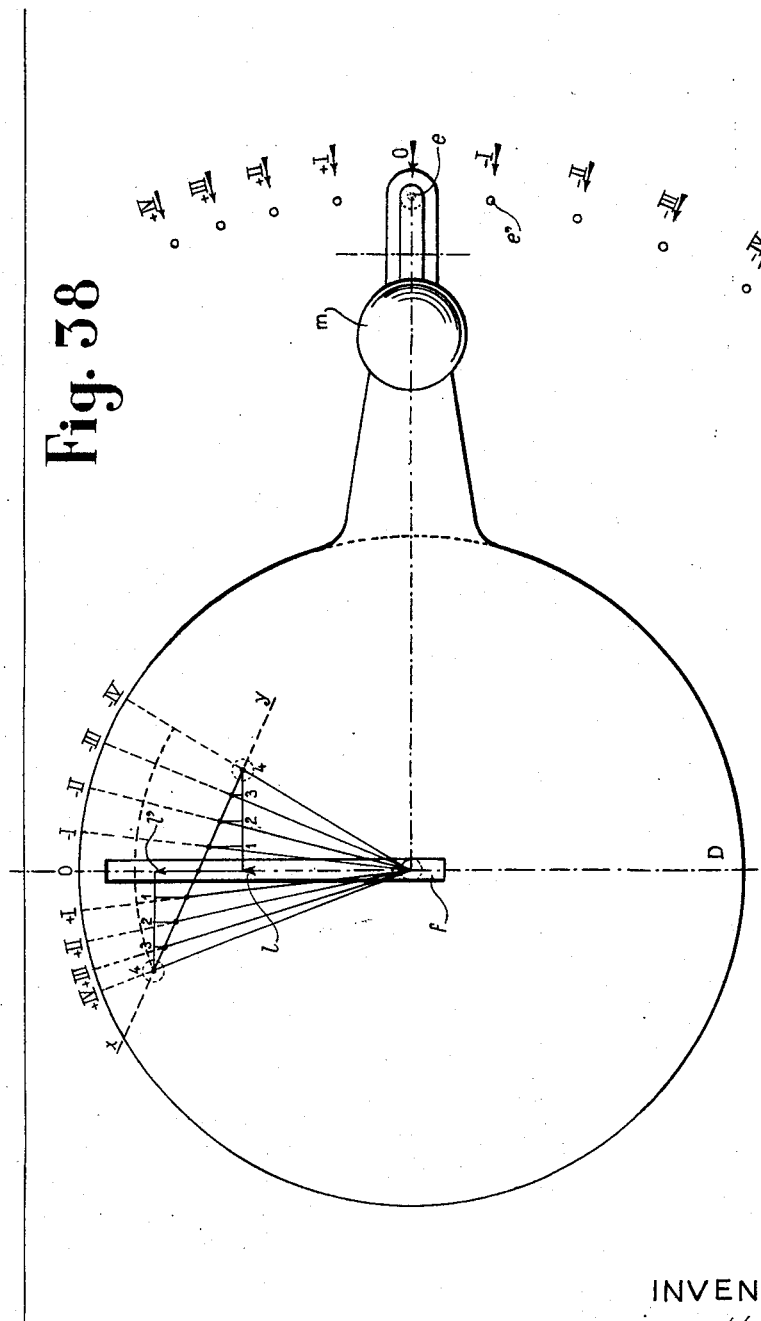
Figure 41:
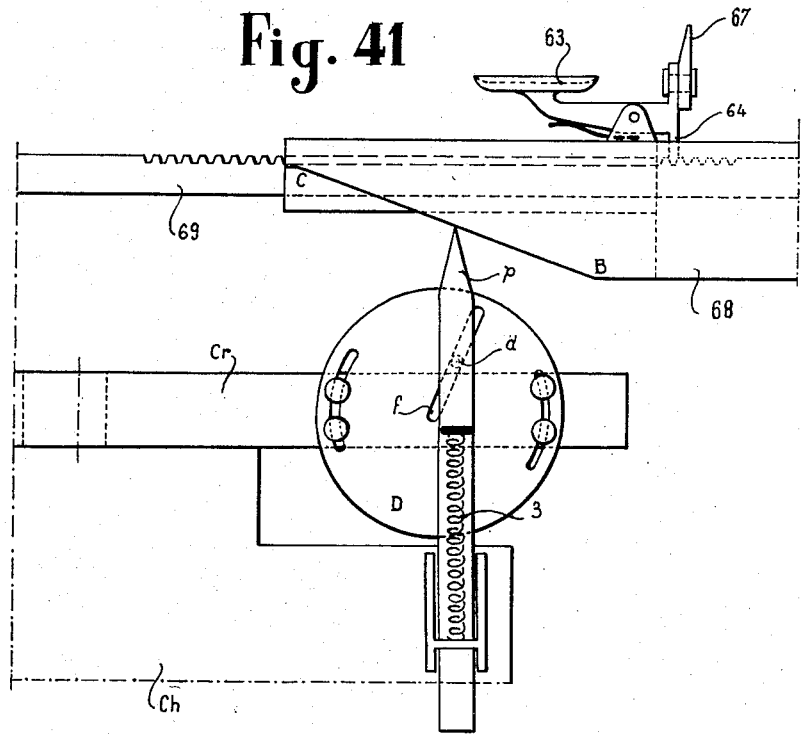
Figure 42:
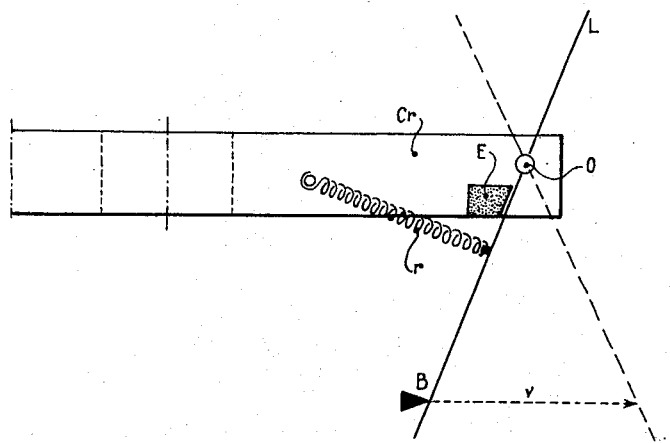
Figure 43:
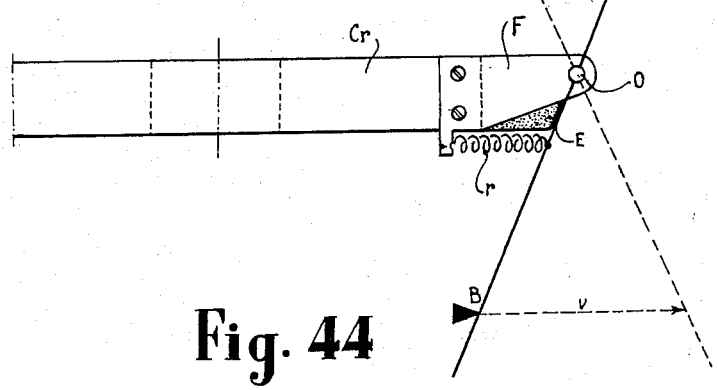
Figure 44:
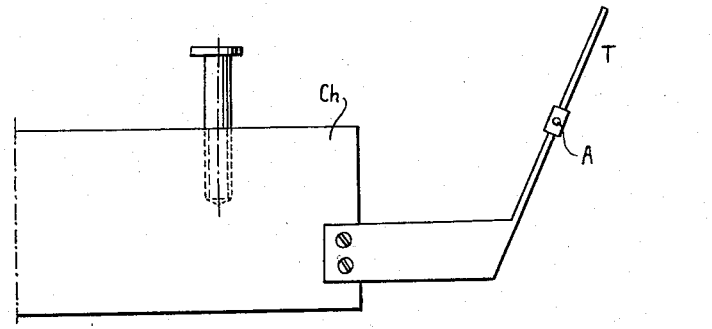
Figure 45:
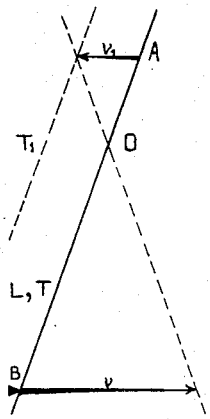
Figure 46:
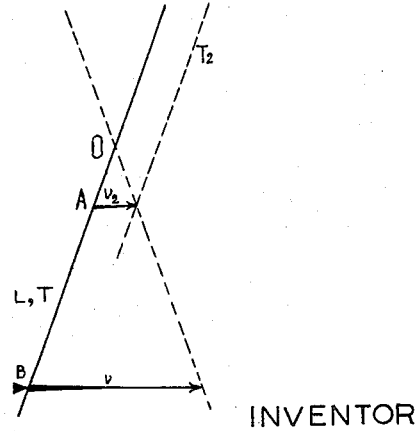
Figure 47:
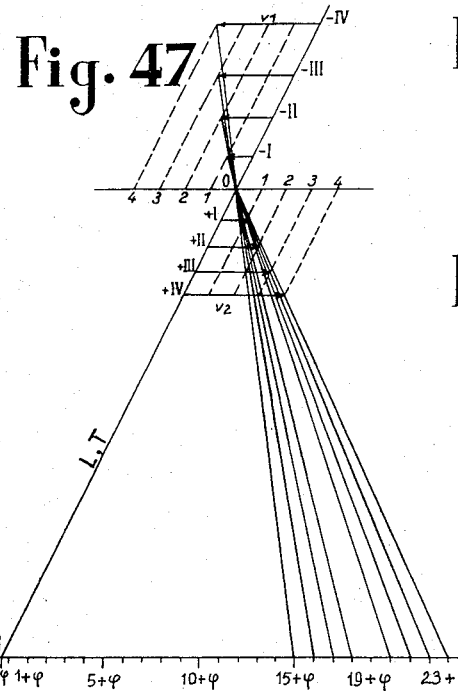
Figure 49:
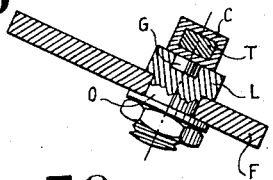
Figure 50:
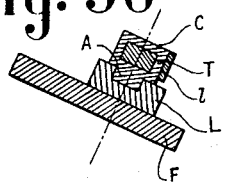
Figure 48:
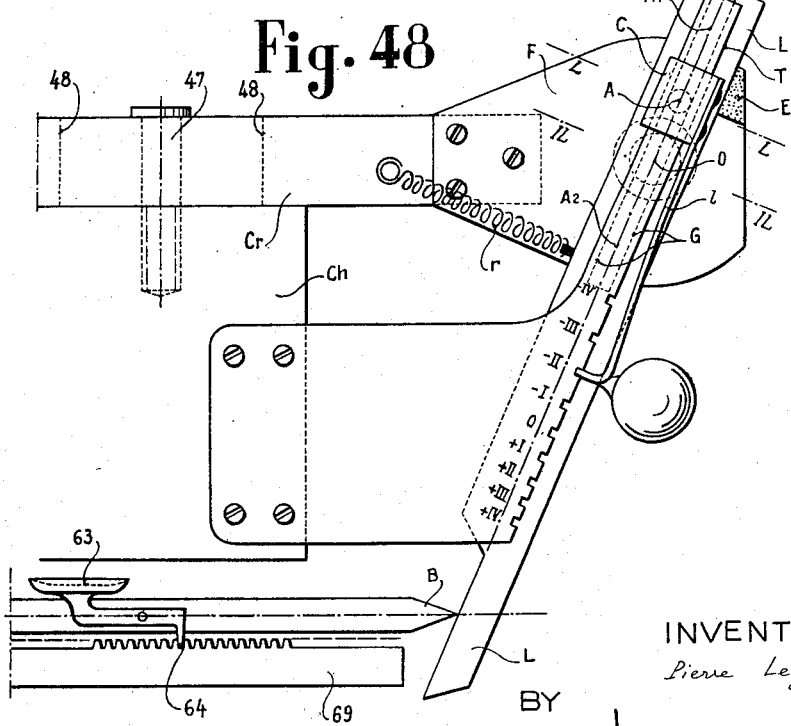
Figure 51:
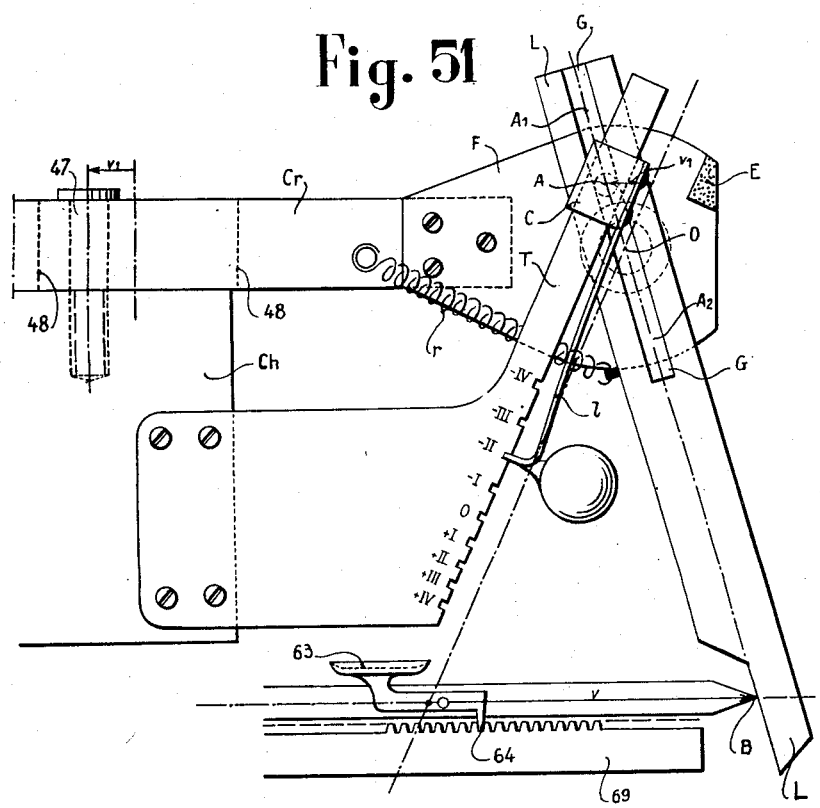
Figure 52:
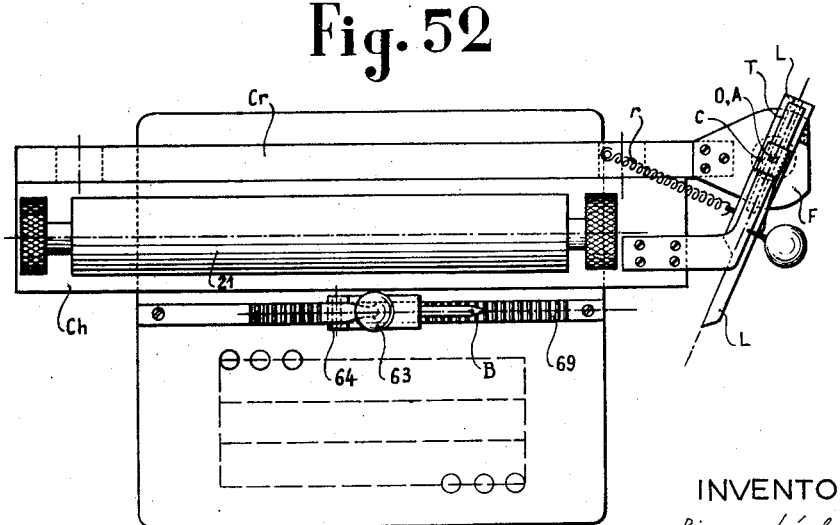
Figure 61:
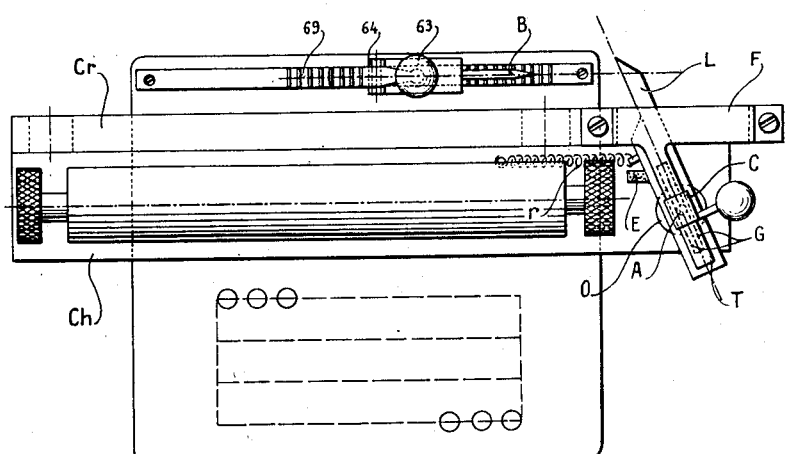
Figure 75:
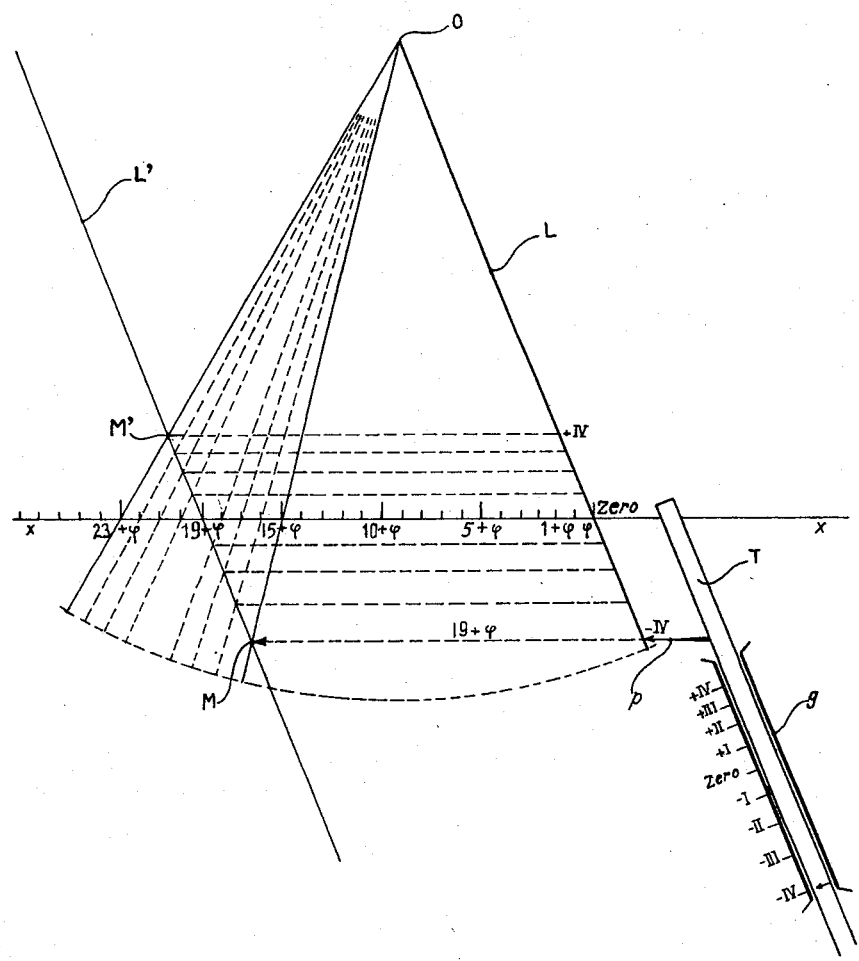
Figure 79:
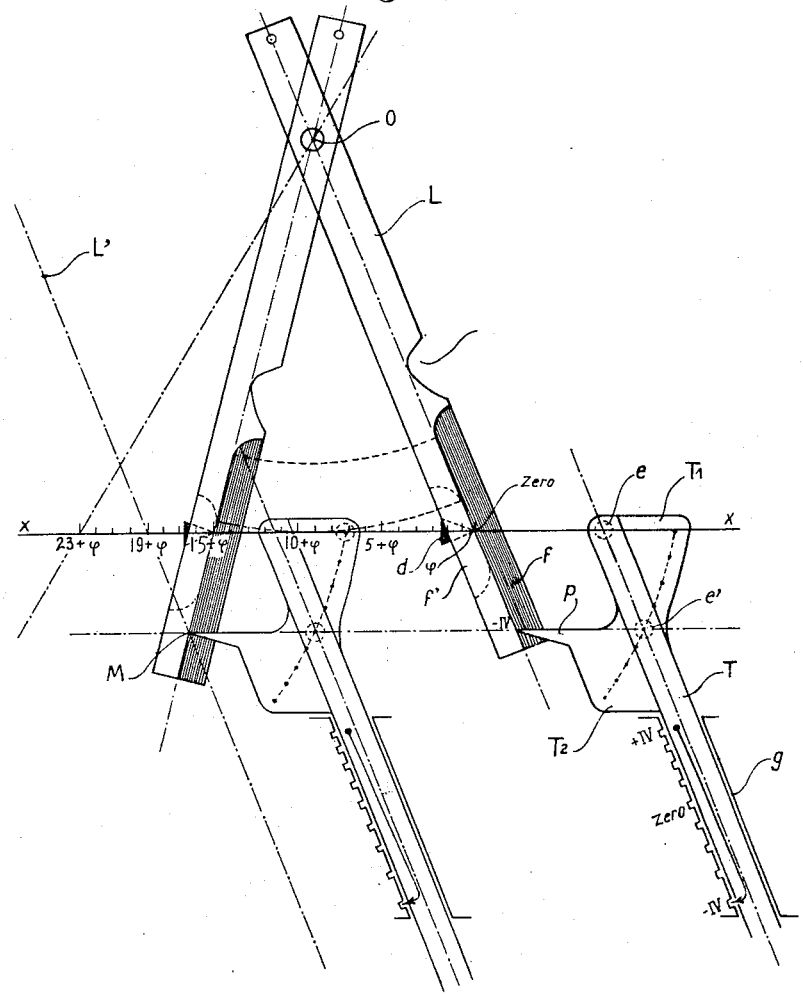
Figure 80:
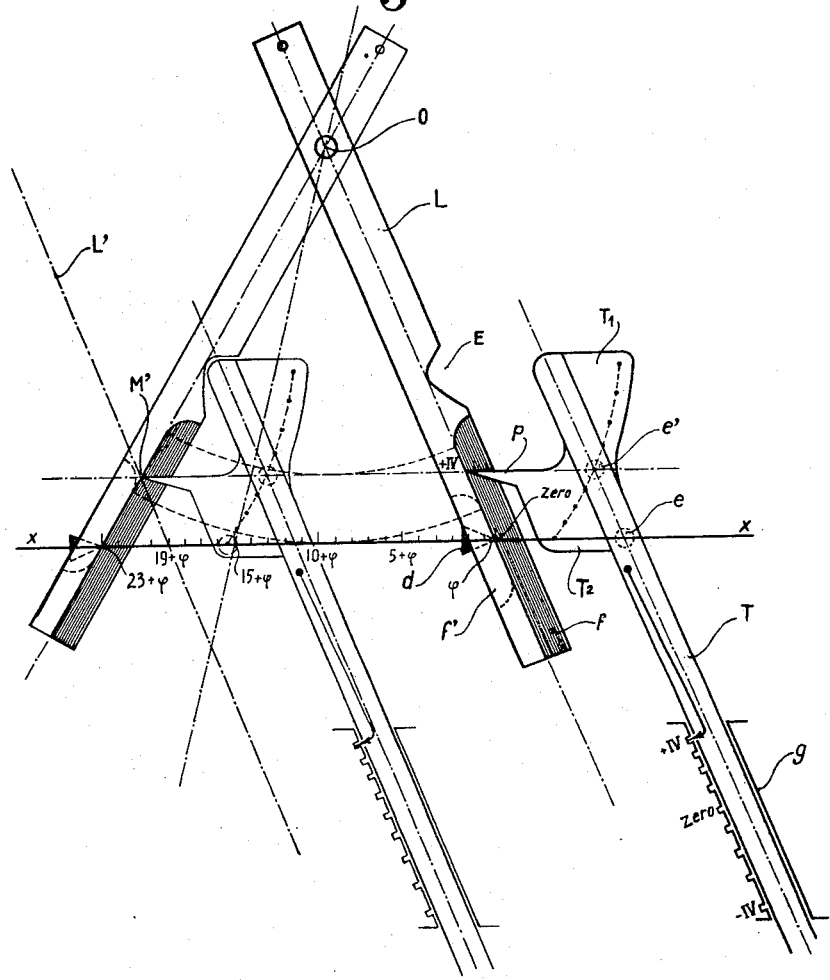

Fig. 23 is a working-drawing for the adjustment of typewriters with end-of-line justifier comprising a rectilinear guide of variable inclination, applied to the case of a typewriter of the type platen shifting on the carriage-plus-rack block;

Fig. 24 is a diagrammatic plan-view of an end-of-line justifier for justifying typewriters with platen shifting on the carriage-plus-rack block, comprising a rectilinear guide with a groove of fixed inclination and transmission-mechanisms of variable transmission-ratio comprising a slot of direction made adjustable by the rotation of a disc carried by a slider;

Fig. 25 shows, in plan, a rectilinear guide of fixed inclination constituted by a slot;

Fig. 26 is a section taken along line XXVI—XXVI of Fig. 25;

Fig. 27 shows, in plan, a rectilinear guide of fixed inclination constituted by a rail;

Fig. 28 is a section taken along line XXVIII—XXVIII of Fig. 27;

Fig. 29 shows, in plan on a justifying typewriter with platen shifting on the carriage-plus-rack block, an end-of-line justifier comprising a rectilinear guide constituted by a groove of fixed inclination and transmission-mechanism of variable cinematic transmission-ratio comprising a slot of direction made adjustable by the rotation of an arm;

Fig. 30 is the general plan-view of a justifying typewriter with platen sliding on the carriage-plus-rack block equipped with the end-of-line justifier of Fig. 29;

Fig. 31 is a plan of an end-of-line justifier comprising: a rectilinear guide of variable inclination and transmission-mechanisms of constant cinematic transmission-ratio, consisting of a bell-crank mounted on the reference-part of the relative-slidings system formed on the typewriter (in this particular case, supposing the typewriter to be of the type carriage-plus-platen block sliding on the rack, the bell-crank is mounted on the rack);

Fig. 32 shows, in plan, an end-of-line justifier comprising: a rectilinear guide of variable inclination and transmission-mechanisms of constant cinematic transmission-ratio, consisting of a bell-crank mounted on the relatively mobile part of the relative-slidings system formed on the typewriter (in this particular case, supposing the typewriter again to be of the type carriage-plus-platen block sliding on the rack, the bell-crank is mounted on the said carriage-plus-platen block);

Fig. 33 is a working-drawing relative to the interactions of the displacements of the touching-rod on the rectilinear guide and the displacements of the part which carries it, when this latter is the relatively mobile part of the relative-slidings system;

Figs. 34 to 37 are diagrams, in plan, of the working of an end-of-line justifier comprising a rectilinear guide of fixed inclination, a touching-device carried by the rack and transmission-mechanisms with a slot of adjustable direction carried by the carriage representing the carriage-plus-platen block. In these diagrams:

Fig. 34 shows the position of the component-parts at the beginning of the justification of a terminal segment of 16 characters; Fig. 35 gives the position of the component-parts at the end of the justification of such a terminal segment of 16 characters; Fig. 36 represents the position of the component-parts at the beginning of the justification of a terminal segment of 24 characters; and Fig. 37 indicates the position of the component-parts at the end of the justification of such a terminal segment of 24 characters;

Fig. 38 is a working-drawing of the adjustment applicable in the case of an end-of-line justifier whose transmission-mechanisms comprise a slot of adjustable direction;

Figs. 39 and 40 are diagrams showing, in plan, the mounting and working of a justifying typewriter with an end-of-line justifier conforming to that of Figs. 34 to 38; Fig. 39 shows the position of the component-parts at the beginning of the justification of a terminal segment of 16 characters and Fig. 40 indicates the position of the component-parts at the end of the justification of such a segment;

Fig. 41 shows, in plan, the diagram of an end-of-line justifier of constitution similar to that of Figs. 34 to 40, that is: a rectilinear guide of fixed inclination, a touching-member and transmission-mechanisms with cinematic transmission-ratio made variable by the use of a slot of adjustable direction, the mounting-places of the last two elements of the justifier being nevertheless permuted in relation to those shown in the figures quoted, that is to say that the touching-member is carried by the carriage-plus-platen block instead of being carried by the rack, and that the transmission-mechanisms are mounted on the rack instead of being mounted on the carriage-plus-platen block;

Figs. 42 to 61 refer to examples of justifying typewriters whose end-of-line justifier comprises a lever pivoting round a mobile axle. In these figures:

Fig. 42 is a diagram representing, in plan, the direct mounting of the justifying lever on the part of the relative-slidings system formed on the typewriter, with which the axle of this lever must be integral;

Fig. 43 is a diagram, in plan view, representing the mounting of the justifying lever on a fitting mounted on the part of the relative-slidings system formed on the typewriter, with which the axle of this lever must be integral;

Fig. 44 shows in plan, the piece along which the member of adjustable position shifts;

Figs. 45 and 46 are cinematic diagrams applying to end-of-line justifiers comprising a justifying lever whose axle is integral with one of the two parts of the relative-slidings system formed on the typewriter; Fig. 45 refers to the justification of too short a terminal segment; Fig. 46 to the justification of too long a terminal segment;

Fig. 47 is a working-drawing of the adjustment applicable to justifying typewriters in which the axle of the justifying lever is carried by one of the two parts of the relative-slidings system formed in the typewriter (in this particular case: axle mounted on the rack);

Fig. 48 shows in plan, at the beginning of the justification of a segment of 18 characters, an end-of-line justifier in which the axle of the justifying lever is integral with one of the two parts of the relative-slidings system formed on the typewriter (in this particular case: axle mounted on the rack), the member of adjustable position being integral with the other part of this system (in this particular case: the carriage, in its capacity as element of the carriage-plus-platen block);

Figs. 49 and 50 are sections on lines IL—IL and L—L of Fig. 48;

Fig. 51 is a plan-view of the positions taken by the pieces of the end-of-line justifier of Fig. 48 in the course of the justification of a terminal segment of 18 characters;

Fig. 52 is the general plan-view of a justifying typewriter with carriage-plus-platen block sliding on the rack, fitted with an end-of-line justifier conforming to that of Fig. 48;

Fig. 53 is a diagrammatic section of a slider surrounding at least partially the rod along which it shifts;

Figs. 54 to 60 show modified forms with respect to structure, mounting, and locking system of end-of-line justifiers derived from the end-of-line justifier of Fig. 48;

Fig. 61 is the general plan-view of a justifying typewriter with carriage-plus-platen block shifting on the rack, in which the end-of-line justifier presents an arrangement contrary to that of Fig. 52;

Figs. 62 to 81 refer to examples of justifying typewriters in which the end-of-line justifier comprises a lever swivelling round an axle of position fixed for a given piece of work;

Figs. 62 and 63 are cinematic diagrams applicable to these typewriters; Fig. 62 is relative to the justification of a terminal segment which is too long and Fig. 63 to that of a terminal segment which is too short;

Fig. 64 shows, in plan, on its fixed support, a justifying lever with drawback spring and rest-stop;

Fig. 65 represents in plan, a justifying-lever with drawback-spring only;

Fig. 66 is a plan showing the mounting of the member of adjustable position on the part of the relative-slidings system formed on the typewriter with which the said member is integral (in this particular case: mounting on the carriage, in its capacity as element of the carriage-plus-platen block shifting on the rack);

Fig. 67 is an elevational view of the combined device which locks together the two parts of the relative-slidings system formed on the typewriter and against which the justifying lever rests during the course of justification;

Fig. 68 is a plan-view of the device of Fig. 67;

Fig. 69 shows a conical locking-pin whose tip is rounded;

Fig. 70 represents another locking-pin whose end takes the form of a truncated cone;

Figs. 71 to 74 deal with the working of an end-of-line justifier for justifying typewriters of the system of two parts mounted to shift relatively: system of carriage-plus-platen block shifting on the rack and system of platen shifting on the carriage-plus-rack block (in this particular case the former), with a justifying lever swivelling round an axle of position fixed for a given piece of work (the member of adjustable position being integral, in this particular case, with the carriage in its capacity as element of the carriage-plus-platen block); these figures show respectively:

Fig. 71, the position of the component-parts in the course of the normal typing-periods preceding the justifications;

Fig. 72, the position of the component-parts at the beginning of a justification, the member of adjustable position being set for the justification of too short a terminal segment;

Fig. 73, the position of the component-parts in the course of justification;

Fig. 74, the position of the component-parts at the end of justification, the member of adjustable position having been replaced in the position corresponding to the locking together of the two parts of the relative-slidings system;

Fig. 75 is a working-drawing of the adjustment applicable to an end-of-line justifier with justifying lever swivelling round an axle of position fixed for a given piece of work, as illustrated by the diagrams of Figs. 71 to 74;

Fig. 76 is a working-drawing for the plan-design of the lateral cuttings made in the working end of the lever of the end-of-line justifier of Figs. 71 to 74;

Fig. 77 is a section on line LXXVII—LXXVII of the justifying lever of Fig. 76;

Fig. 78 is another working-drawing, in plan, determining the shape of the flat lateral bosses of the piece carrying the member of adjustable position in the end-of-line justifier of Figs. 71 to 74;

Figs. 79 and 80 are working-drawings determining, in plan, the shape of the notches eventually to be made in the justifying lever of Figs. 71 to 74;

Fig. 79 gives the initial and final positions of the component-parts in the case of the justification of a terminal segment of 16 characters;

Fig. 80 gives the initial and final positions of the same component-parts in the case of the justification of a terminal segment of 24 characters;

Fig. 81 is a plan-view of a justifying typewriter with carriage-plus-platen block sliding on the rack, fitted with the end-of-line justifier of Figs. 62 to 80.

In the ultradiagrammatic Figs. 1 and 2 showing the two great categories of justifying typewriters for the application of the process of justification included in the present invention, only the group of the three elements: platen T$a$, carriage C$h$ and rack C$r$ is represented. In Fig. 1, the platen T$a$ is longitudinally movable in relation to carriage-plus-rack C$h$—C$r$, this mobility being indicated by the line X—X separating these two parts. In Fig. 2, the carriage-plus-platen block C$h$—T$a$ is longitudinally movable in relation to rack C$r$.

I. Typewriters with platen sliding in relation to the carriage-plus-rack block For convenience, in this category of typewriters, the following elements are to be distinguished: (a) the mounting-elements of the platen on the carriage; (b) the elements immediately connected to the platen to determine in the last instance the relative shiftings of this latter on the carriage, covered by the expression "transmission-gear"; (c) the elements provoking the movement of the above transmission-gear, covered by the expression "driving-mechanism"; (d) the elements of adjustment.

While the elements (a) are practically the same in the various typewriters of the category under consideration, the elements (b) and (c) are liable to modifications as far as their construction and mounting are concerned, and to the transposition of their respective functions, and the elements (d) likely to vary in construction; so that the totality of the possible combinations of these variations and transpositions result in a large number of typewriters differing in their outward appearance although they embody the same principle. This is why first of all a description will be given of a typewriter corresponding to a given combination of certain modes of design of these elements, to specify later on certain modified forms which may be designed in the category in question of typewriters with platen shifting on the carriage-plus-rack block, the said block constituting the reference-part of the relative-slidings system formed on the typewriter.

In these typewriters with shifting platen, the platen is longitudinally disintegralised from the shaft which supports it on the carriage, but remains rotatively integral with this shaft whose section is other than a circular section, a square section, for example. In Figs. 3 and 4, the platen is represented in 21 and the square shaft of the carriage in 22. Knobs 23 (Fig. 3) clamped to this shaft and a pawl (not shown) assure the rotary drive of the platen in the ordinary way.

The mounting of the platen on the carriage in a sliding fashion is in itself simple to effect; but the following remark should be taken into consideration: To keep the paper around the platen, the standard constructions provide under this latter two (and in typewriters with large carriages, more than two) pairs of feed and pressure rollers turning round axles parallel to the shaft of the platen and driven by this latter by friction. In the typewriters with shifting platen conforming to this invention, these rollers must be able to move along their axes so as to accompany the platen in its lengthwise movements, without which the transmission to the rollers of translation-strain, relying on the single sheet of paper or the pile of copies, would cause either the sheet to crumple in its plane, or its surface to be scratched, or the copies and sheets of carbon paper to slip in relation to one another. To this effect, following the present invention, in the typewriters with shifting platen, a positive drive is set up between the platen and the feed and pressure rollers.

Figs. 5 and 6 represent respectively an elevational view and an end view of the type of mounting which may be used. Fig. 5 being symmetrical in relation to the plan AA, the references are only indicated on one side.

Two side-plates 80 are mounted rotatively on both sides of the platen 21 on two washer-bearings 22$^1$ integral with the platen. In order that the side-plates remain vertical when the platen and its square shaft turn on themselves, the ends 80$^1$ of these side-plates slide in a guide 87 of the carriage; the feed and pressure rollers such as 83 turn on an axle 81 carried by the side-plates. The sockets 88 maintain these rollers at convenient spaces apart between them and in relation to the side-plates (conforming to current practice, each roller 83 represents, in fact, a pair of rollers forming a unit swinging round the axle 81). The ends of the axle 81 shift in two vertical slots 82 of the side-plates to allow the insertion between the platen and the rollers of sheets of paper corresponding in number and in quality to the typewritten work required. The pressure of the rollers 83 against the platen 21 is assured by springs symbolically represented in 89 and attached, for instance, on the one hand, to pins 90 carried by the side-plates 80 and, on the other hand, to the ends of the axle 81. A rod 84 fitted with flanges 85, and whose ends each carry a lock nut 86, forms a cross-bar between the two side-plates 80.

The platen 21 (Figs. 7 and 8) comprises at its right end, a circular groove 24 constituting the catch for the transmission-gear. This may consist, for instance, in a slotted slider, a pair of gear-wheels, a cranked lever, that is to say a bell-crank, a straight lever, a socket with helicoidal thread, etc.

When the device transmitting the movement comprises a slotted slider (Figs. 7 and 8), this device may be set up in the following way: A catch-pin 25, mounted at one of the ends of an arm 26, is engaged in the groove 24 of the platen. The arm 26 is mobile in a parallel direction to the shaft 22 of the platen in the slideways 27 of a rectangular frame 31 integral with the carriage (mounting elements such as 31$^1$); it is further provided with a pin 28 engaged in an oblique slot 29 set in a slider 30, mobile in the frame 31 perpendicularly to the shaft of the platen. This slider is provided with a touching-rod 32 whose displacements are caused by the driving-mechanism.

The movements of the pieces are as follows: The platen 21 shifts along its shaft 22 and turns with it as already indicated. The arm 26 can only shift in a direction parallel to that of the shaft 22. The slider 30 can only shift perpendicularly to the shaft 22. When the slider 30 moves in the frame 31, one of the edges of the slot 29 attacks the pin 28 and this results in the progression or retrogression of the platen along the shaft 22.

The obliquity of the slot 29 is such that it cannot involve jammings or resistances in the transmission, and its length is such that the total course of the pin 28 following the shaft of the platen represents a longitudinal displacement of the platen in relation to the carriage equal to the maximum value of the justifications to be made whether by contraction or extension, for example, a longitudinal displacement corresponding to eight characters, thus: four characters too many or four characters too few in reference to the position of Fig. 8.

Figs. 10 to 12 deal with transmission-gears comprising a pair of gear wheels. In Fig. 10 the linking between the rod 32 and the sliding arm 26 is brought about by two gear-wheels of the same diameter integral with an axle 34; one of these gears, 35, is meshed with a rack 36 cut in the rod 32, and the other, 37, with a rack 38 cut in the arm 26. This axle 34 and the slideways (not represented) in which the rod 32 and the arm 26 slide are carried by the carriage. The gear-wheels 35 and 37 may also be of different diameters as shown in Figs. 11 and 12, to allow the gearing up or gearing down at will of the displacements of the arm 26 in relation to those of the rod 32 as is shown by the respective lengths of the arrows $f^1$ and $f^2$ on this rod and this arm in Figs. 11 and 12.

In Figs. 13, 14 and 15 the transmission-gear between the rod 32 and the sliding arm 26 comprises a bell-crank. This bell-crank is formed by a lever 39—40 swivelling on an axle 41 mounted on the carriage. The judicious choice of the lever-arm lengths 39 and 40 allows the gearing up or gearing down at will of the displacements of the arm 26 in relation to those of the rod 32, as is again indicated by the respective lengths of the arrows $f^1$ and $f^2$ on this rod and this arm in the different figures. The arm 26 and the rod 32 are attached to the arms 39 and 40 of the bell-crank by teats 42 and 43 engaged in the elongated openings 44 and 45 cut in these arms 39 and 40.

Fig. 17 shows a straight lever which may be used for the transmission of the displacements of a point A to a point B; the technique of such a lever is too simple to need explanation.

Fig. 19 shows another mechanism for the transmission of movements of the rod 32 of a touching-member to the driving arm 26 of the platen; the rod 32 carries a teat $32^1$ engaged in the helicoidal ramp $50^1$ of a socket 50 whose rotation causes, in turn, the displacement of the arm 26 by means of a pinion $50^2$ integral with the socket 50 and a rack $26^1$ integral with the arm 26.

It is obvious that the transmission-gear may work in any plane whatever. For example, the plane of the slider of Figs. 7 and 8, the plane of the gear-wheels of Figs. 10 to 12 or of the bell-cranks of Figs. 13 to 15 may be vertical or oblique instead of horizontal.

The driving-mechanism of the touching-member will now be described. The displacements of the rod 32 of the touching-member 33 (Fig. 8), hinged on the said rod in 59, are provoked by the contact of this touching-member 33 itself with a rectilinear guide 57 of inclination made variable by rotation round an axle 58 integral with the frame, an inclination to be adjusted for each line needing justification.

The rectilinear guide 57 may take the form, for example, of a ramp, a groove, a slot, and a rail.

In Fig. 9, the rectilinear guide 57 is formed by a ramp set on a bar 60 hinged in 58 on a piece 68 carried by the frame. The free end of this bar is locked along an arc 61 of the piece 68 coaxial to the pivot 58, and comprising the nine notches, such as 62, corresponding to the nine cases of justification likely to occur in a typewriter of the type previously indicated. The end of the rod 32 of the touching-member takes the form of a dihedron 59.

In Figs. 20 and 21, this same rectilinear guide 57 is formed by a groove cut in the bar 60. Generally speaking, the references given on these Figs. 20 and 21 designate the same parts as in Fig. 9. The touching-part mounted at the end of the rod 32 takes the form of a pin 59. In each case, the touching-end of the rod 32 presents a form corresponding to the particular mode of structure of the rectilinear guide; mere edge of contact 59 as indicated (Fig. 9) in the case of the ramp, the rod 32 having, of course, to be brought back, in this case, by a spring, into contact with the ramp; one of the elements-pin 59 (Figs. 20 and 21), slider 33 (Fig. 8) in the case of the groove and the slot; or a shoe partially surrounding the rail.

Fig. 22 shows diagrammatically the general appearance of a justifying typewriter with platen shifting in relation to the carriage-plus-rack block, fitted with an end-of-line justifier with a driving-mechanism like that illustrated by Fig. 21 and transmission-gear such as illustrated by Fig. 8.

Outside the justification-periods, the transmission-gear should remain in the neutral position corresponding to the normal typing, so that the touching-end of the rod 32 presents itself automatically at engagement-height on the rectilinear guide 57 when the justifications are about to begin. To this effect, there is provided at any convenient point of the justifier;

In the case where the rectilinear guide 57 is formed by a ramp, a locking-system which is unlocked at the moment the touching-member contacts the ramp, by an appropriate fixed boss, possibly in combination with a neutral rest-channel for the touching-member, placed immediately before the ramp and of short length;

In the case where the rectilinear guide 57 is formed by a groove, a slot, a rail, either a device similar to that above described, or a soft-action locking-system such that the positive action of the rectilinear guide on the touching-member necessarily provokes the unlocking (for example, a ball, forced by a spring into a hemispheric recess of the same curvature, or a plate-spring whose end engages itself in a notch of appropriate profile), or a device such as will be described further on, in particular in connection with Figs. 24 and 29.

In one or the other of the cases above, the locking-device may be replaced by a rectilinear guide of no inclination preceding the rectilinear guide 57 of variable inclination, and in contact with which the touching-member (pin 59, edge 59, slider 33) moves constantly when it is not engaged with the said guide. An arrangement with rectilinear guide of variable inclination and touching-rod functions as follows:

When the inclination of the rectilinear guide 57 in respect to the shaft of the platen 21 is nil, the translations of the platen 21 are those same which the keys control: in other words, the platen follows exactly the carriage-plus-rack block. But if the guide is inclined, translations of the rod 32 in its own direction result, and therefore translations of the platen on its shaft in respect to the carriage-plus-rack block also result. At each striking of a key, the platen thus shifts in an absolute value of the same quantity as the carriage-plus-rack block, more or less a small quantity contingent upon the compensation required for each terminal segment (contraction or extension in view of the justification); in the course of typing of too short a terminal segment, the platen constantly goes forwards on the carriage-plus-rack block, while it goes constantly backwards in the course of too long a terminal segment.

The present invention likewise embraces the building of justifying typewriters functioning according to the above described process and permitting: (1) the justification of columns of text on any width whatsoever; and (2) the typist to be warned at the time the normal typing is completed, and, consequently, the justification should begin, so that she may proceed to count the characters of the terminal segment and to adjust the justifier correspondingly. To this effect, following the present invention, the piece carrying the axle of articulation 58 of the rectilinear guide, the position of which axle determines the right section of the platen where the justification will commence, is provided with adjustment-means of its own position, and automatic stopping-means of the carriage at the point where the justifications must begin.

Figs. 9, 20 and 21 show arrangements thus set out. In these figures, the axle 58 and the adjustment-sector 61 of the rectilinear guide 57 are mounted on a slider 68, movable and lockable on a horizontal bar 69 toothed character by character (locking-tooth 64 and push-button 63). This slider 68 is fitted with a retractable stop, symbolically represented in 67, designed to stop the carriage. Of course, the stop 67 might also be fixed on the slider 68; then the corresponding stop of the carriage would be retractable. The horizontal bar 69 is normally that on which the standard left- and right-hand margin stops of the carriage shift, the stop of this latter in its leftwards movements being the retractable stop 67.

By the means which have just been described, in displacing the slider 68 on the horizontal toothed bar 69, the vertical of the page where the justifications will begin is determined. The right-hand margin follows immediately from the fact that each segment of line typewritten beyond this vertical will have a length of 20 normal characters. As to the lengths of the segments of lines at the left of this vertical, it results from the position given to the standard carriage-stop used for stopping the carriage in its rightwards movements. Thus, not only columns of text of any width above and including 20 normal characters may be achieved, but in addition these columns may be placed in any desired part of the page.

The adjustments for the column-width and for the layout of the column on the page are therefore achieved once and for all for a given piece of work by mere displacements of stops. At present it is not a question of these adjustments, but of the adjustment of the inclination of the rectilinear guide 57 with a view to justifying on a width of 20 normal characters terminal segments of between 16 and 24 characters, these numbers inclusive.

Before explaining the method of the aforementioned adjustment, it is necessary to examine in detail the process of advance of the rack character by character. In most typewriters the holding-pinion of the rack is integral with a ratchet-wheel or escape gear, which can only turn one tooth at a time at each striking of the keys. As the carriage is constantly submitted to the pull of its return-spring, the rack, integral with the carriage, constantly exercises a tangential pull on the pinion and this tends in turn to drive the ratchet-wheel. The rotation by one tooth of the ratchet-wheel, transformed into translation of the rack by the holding-pinion of this element, is equal to one normal character. In other words, when the ratchet-wheel advances by one tooth, the rack may move forward and does in fact move forward by one character under the action of the carriage return-spring.

In most typewriters, the rotation of the ratchet-wheel is controlled by a pair of pawls operated by the movement of key-bars. An instant before the printing of the character, the first pawl, which was holding a given tooth of the wheel, retracts to allow this wheel to rotate; but the freed tooth almost immediately abuts the second pawl and the ratchet-wheel is again stopped. During the time of the upwards-stroke of the type-bar, the wheel (and therefore the holding-pinion of the rack) can thus only turn a fraction ø of one character: the fraction necessary for the definite positioning of the platen for the printing of the character under consideration, for instance ø=⅖ character to give a specific example. The printing effected and the type-bar returning to its rest-position, the second pawl retracts in turn; the wheel and the holding-pinion may thus continue their rotation. But as the first pawl has simultaneously been replaced in its former position, it blocks almost immediately the following tooth of the wheel (and therefore the holding-pinion of the rack) as soon as these have turned the angle corresponding to the complementary fraction of character (here ⅗) which the rack must still shift forwards to advance, finally, by one character at each striking of a key.

The fact that the rack advances in two-stroke fashion at the occasion of each striking of the keys must be taken into consideration in the questions of justification because the displacements of the parts of the relative-slidings system which immediately follow the printing of the last character of the terminal segments to be justified do not matter. In fact, from these final displacements there would simply result the beginning of the positioning of these parts for the printing of a further character which, by assumption, will not take place.

The process of two-stroke advance is that characterising the great majority of ordinary typewriters, called typewriters of type (a). There exist, however, ordinary typewriters in which the rack, and, consequently, the rack-carriage-platen ensemble advances by one character in a single stroke at the time of each striking of the keys, this advance being effected: (b) sometimes an instant before the precise moment of the printing, so that the positioning of the platen is completed practically at the instant when the printing takes place, and (c) sometimes after the printing, so that the platen is brought into place for the following printing.

Supposing that the terminal segment to be justified on a length of 20 normal characters comprises 17 characters only; in the ordinary typewriters of types a, b, c, the travel of the rack-carriage-platen ensemble during the typing of a normal terminal segment until the precise moment of the printing of its 20th character would be 19+ø, 20 or 19 normal characters respectively; and in typewriters of the same types but rendered capable of justification, the travel of the carriage-plus-rack block during the typing of the terminal segment and until the precise moment of printing of its 17th character would be 16+ø, 17 or 16 normal characters respectively, when that of the platen should remain equal to the above 19+ø, 20 or 19 normal characters. The result of this is, whatever the advance-process of the rack may be, that the relative shifting of the platen on the carriage-plus-rack block should be of 3 normal characters, to be effected, according to the advance-process of the rack, during a travel of 16+ø, 17 or 16 normal characters of this element.

Finally, whatever may be the type of ordinary typewriter from which a justifying typewriter following the invention is derived, on condition that it is agreed that the fraction ø may vary from 0 to 1 normal character, limits included (0≤ø≤1): the travel of the rack-carriage-platen ensemble during the typing of a normal terminal segment of 20 characters, and up to the precise moment of the printing of the 20th character is of 19+ø normal characters; the travel of the carriage-plus-rack block during the typing of a terminal segment of N characters (16≤N≤24) is of N−1+ø normal characters; and the relative shifting—positive or negative—of the platen on the carriage-plus-rack block to be obtained from the justifying mechanisms during the travel N−1+ø of this block is of 20−N normal characters. The dividing-up of the locking-notches 62 on the circumference of the arc 61 results immediately from the above considerations; it is determined by a working-drawing.

It will be first of all assumed for simplicity's sake, that the displacements of rod 32 are transmitted to the platen without either increase or reduction, and that an advance of the rod towards the top of the page provokes an advance of the platen on the carriage-plus-rack block (it is the opposite in Fig. 8, considering the direction of the inclination given to the slot 29).

In Fig. 23, the reference 58, axle of articulation of the rectilinear guide 57, represents the origin o of the displacements of the carriage-plus-rack block during the justification-period, these displacements being effected along the horizontal axis ox and towards the left. Ox is graduated in normal characters from 1 to 23.

The typewriter being characterised by a given fraction ø (fraction of character included between 0 and 1 by which the rack, that is to say the carriage-plus-rack block in this particular case, advances a moment before the precise moment of printing), vectors respectively equal to +4, +3 . . . −3, −4 normal characters are brought to the vertical of the graduations 15+ø, 16+ø . . . 23+ø. The ends of these vectors plot a straight line ab which intersects the axis ox at the graduation 19+ø. Then, the position of each of the locking-notches is obtained by joining each of the said ends to the origin o and by producing the lines thus drawn, which show the various inclinations of the rectilinear guide 57, up to their intersection with the circular of piece 61.

In fact, for the point 15+ø for instance, corresponding to a terminal segment of 16 characters to be stretched out to a length of 20 characters, during the typing of the 16 characters and up to the precise moment of the printing of the 16th character, the carriage-plus-rack block has advanced by 15+ø normal characters while the platen was advancing simultaneously on the carriage by 4 normal characters. The platen has therefore displaced itself in an absolute value of 19+ø normal characters, a displacement which would have been its own at the completion of the typing of a terminal segment of 20 characters up to the precise moment of printing of the 20th character, in consequence of which the 16th widened character is brought to the position of a 20th normal character. The notch corresponding to the graduation 15+ø is marked −IV because there are 4 characters too few in the terminal segment. The notch 0 obviously corresponds to the normal typing, the inclination of the rectilinear guide 57 being then nil.

The angle of the slot 29 in respect to the rod 32 should hardly exceed about thirty degrees in order to ease the sliding of the teat 28 in the slot. An angle of 45° for instance, from which would result the equality of the displacements of the rod 32 along its axis and of the platen on the carriage, as assumed in the working-drawing of Fig. 23, would not be advisable. Under these conditions, transmission-gears comprising a slider should therefore reduce the movement of the rod 32. If the gearing-down factor is 2, for instance, to provoke a relative shifting of one character of the platen on the carriage-plus-rack block, the rod 32 should displace itself by 2 characters. It suffices, to compensate this gearing-down, to double the vertical vectors of the working-drawing, so that at graduation 15+ø, for instance, the rod 32 has been displaced by 8 characters and not by 4, at the graduation 16+ø by 6 characters and not by 3, etc.

The other types of transmission-gears, a pair of gear-wheels, bell-crank, lever, socket with helicoidal thread integral with a pinion, on the contrary, adapt themselves just as well to enlargements as to reductions of the displacements of the rod 32. The way of using this device is as follows (Figs. 21 and 22):

1. Set the rectilinear guide 57 in neutral position (notch 0 of the arc 61) so that the pin 59 can engage with it at the right moment, and adjust the standard left-hand margin stop, generally situated on the right of the horizontal toothed bar (margin bar) 69, in relation to the width of margin desired.

2. Push the slider 68 completely to the left on the margin bar 69, and place the rack-carriage-platen ensemble, integral for the moment as far as translations are concerned, so that the right-hand margin shows itself on the sheet of paper, in respect to the position where the characters are printed, as it should be achieved. Then depress twenty times the back-spacing key in order to bring the rack-carriage-platen ensemble into the position where justifications should begin: it is this position which should be reference-marked. To this effect, bring back the slider 68 towards the right until the retractable stop 67 contacts the corresponding pin of the carriage (or a fixed pin 67 mounted on the slider 68 in place of the retractable stop contacts the corresponding retractable stop of the carriage). By means of the push-button 63, engage the tooth 64 in the teeth of the margin bar 69 which blocks the slider 68. This adjustment is effected once and for all for a given piece of work.

3. Displace the rack-carriage-platen ensemble towards the right until in contact with the left-hand margin stop and begin typing. This continues normally until the stop 67 halts the ensemble in question. At this moment, precisely that when the justification should begin, the pin 59 enters into contact with the rectilinear guide 57.

4. Count the characters, spaces between words, and syllable-end dashes if any, which will form the terminal segment and adjust the inclination of the rectilinear guide 57 in consequence. For a segment 3 characters too short, adjust to —III; for a segment 2 characters too long, adjust to +II.

5. Clear the stop 67, proceed to the typing of the terminal segment which emerges justified, reset the rectilinear guide 57 in neutral position, and push back the rack-carriage-platen ensemble towards the right for the typing of the next line.

The operation described under 4 calls for two important remarks:

(a) Aesthetic considerations obviously demand the formation of terminal segments comprising a number of key-strikings as close as possible to the number of key-strikings characterising the normal terminal segment of the typewriter under consideration. They demand likewise the avoidance, in every possible measure, of the closeness of terminal segments corresponding, the one to the maximum of contraction, the other to the maximum of extension, allowed by the typewriter. For instance, in a typewriter in which the normal terminal segment would correspond to 25 key-strikings and the play to ±4 characters, if the last terminal segment typed entailed 29 key-strikings, the typist will take precise care not to choose for the next terminal segment a number of key-strikings equal to 21.

(b) The effective reckoning of the characters of the terminal segment is replaced to advantage by a fictitious typing of this segment on the space-bar, the lacking and subsequently the surplus characters in respect to the fixed right-hand margin, which then come into the typist's view, indicating the adjustment to be given to the rectilinear guide.

Under these conditions it is convenient to mark the position of the beginning of the justifications not only by means of the standard carriage-stop, as already indicated under 2, but also by the tabulator. At the end of the fictitious typing, the typist takes mental note of the adjustment, sends back the rack-carriage-platen ensemble (still integral in translation) towards the right by just sufficient a quantity for the last character printed to come a few characters to the right of the place where the printings are effected, and automatically replaces this ensemble in the position it holds at the beginning of justifications, by tabulator action. At this moment only the typist sets the rectilinear guide for the mentally-noted number, clears the standard carriage-stop and the tabulator-stop, and types the terminal segment.

The adjustment of the rectilinear guide could also be effected at the end of the fictitious typing. The first process is preferable, however, for the following reasons: To facilitate the engagement of the end of the rod 32 with the rectilinear guide, it is advisable to slightly prolong this guide in front of its axle of articulation 58, and to give to its lengthening a form appropriate to the goal aimed at, for instance: a slight curvature in the case of the ramp, a splaying-out in the case of the groove, and a shrinking in the case of the rail. At the time of adjustment, the lengthening necessarily takes the same general inclination as the guide and consequently constitutes, in front of the axle of articulation of the latter, an inclined obstacle. If the typist then sends back the mobile elements: rack, carriage, platen too briskly to the right, the end of the rod 32 risks leaving this guide; and, if such is the case, the said end will certainly come into contact with the aforesaid obstacle at the time the said elements are brought back to the tabulator-stop. It is therefore advisable not to set the inclination of the rectilinear guide prematurely, when the process of the fictitious typing of the terminal segments is substituted for that of the effective reckoning of the number of their characters.

The two Tables A and B underneath, given for indication only, permit one to realize the great variety of justifying typewriters with sliding platen whose construction is possible according to the invention. Table A groups, for a general view of the question, previously described types of transmission-gears with constant cinematic transmission-ratio.

TABLE A (Transmission-gears)

(a) Sliders with rectilinear slots of fixed direction (Figs. 7 and 8); (b) Pairs of gear-wheels of constant gear-ratio (Figs. 10 to 12); (c) Bell-cranks whose lever-arm lengths are in invariable ratio one to the other (Figs. 13 to 14); (d) Streight levers whose lever-arm lengths are in variable ratio one to the other (Fig. 17); (e) Sockets with helicoidal thread (Fig. 19). In the types of justifying typewriters with relatively mobile platen of which Fig. 22 illustrates diagrammatically the general arrangement of a mode of construction, these elements are mounted on the carriage-plus-rack block to impose upon the platen the relative shiftings desired on the said block.

Table B assembles the types of adjustable mechanisms (rectilinear guides) covered by the general expression "driving-mechanism" which may be used for attacking the transmission-gears of Table A:

TABLE B (Driving-mechanisms)

(f) Rectilinear ramps (Fig. 9), (g) Rectilinear slots, grooves (Figs. 20–21), (h) Rectilinear rails, the inclination of these various guides being variable in relation to the axis of the rod which works in connection with them.

In the aforementioned types of justifying typewriters of which Fig. 22 illustrates the general arrangement of a mode of construction, these mechanisms are mounted on the frame. The various two-by-two combinations of the five types of transmission-gears in Table A to the three types of driving-mechanisms in Table B allow the building of fifteen versions of justifying typewriters differing appreciably in their details of construction although all emerging from the same general mode of action, namely: making the platen (relatively mobile part of the relative-slidings system formed on these typewriters with a view to the continuous extension or contraction of terminal segments) slide on the carriage-plus-rack-block (reference-part of this system). The typewriter illustrated by Fig. 22, for instance, corresponds to the combination ag.

It has just been specified once again that, in the justifying typewriters corresponding to these fifteen combinations: af, ag, ah . . . ef, eg, eh, the adjustable member (rectilinear guide) in Table B is mounted on the frame. It is in consequence perfectly clear that the adjustment function has, until now, been reserved for a member whose axle remains fixed.

It is possible, however, to transfer this function to certain types of transmission-gears, that is to say, to members essentially mobile, not only in respect to the elements which support them, but in addition mobile as a whole in respect to the frame, by making adjustable, in these members, the pieces which were until then invariable, with a view to being able to modify at will the cinematic transmission-ratio of the said members. Simultaneously, the driving-mechanism (rectilinear guide) of Table B is set at fixed inclination on the slider of the frame which supports it (Fig. 24 for the groove; Figs. 25–26 for the slots; Figs. 27–28 for the rail). Thus other types of justifying typewriters are obtained in the series of typewriters with relatively mobile platen.

For example, supposing the justifying typewriter to work according the combination ag (Fig. 22), it is possible to make variable the direction of the slider's slot (transformation of an element of the mechanism a) and, simultaneously, to make fixed the inclination of the small grooved bar (transformation of the mechanism g). These modifications will be soon the subject of a detailed description in reference to Fig. 24.

To give another example, in a justifying typewriter which would work according to the combination cf, it is possible to make adjustable the length of one of the lever-arms of the bell-crank (Fig. 16) (transformation of an element of the mechanism c) and, simultaneously, to make use of a ramp of fixed inclination (transformation of the mechanism f).

As another example, a mechanism of the type b could be conceived in the form of a change-speed gear, the adjustment consisting, in such a case, of choosing the convenient gear-ratio of the gear-train thus formed, etc.

The transformation of certain types of transmission-gears of constant cinematic transmission-ratio, figuring in Table A, into transmission-gears of variable cinematic transmission-ratio will now be examined. First, the possibility of making adjustable the inclination of a rectilinear element such as a slot, a groove, a ramp, a rail on the piece which carries them is plainly obvious (Figs. 24, 29, 39–40 and 41). A pair of gear-wheels of constant gear-ratio may be replaced by a gear-train of variable gear-ratio. The diagram of a bell-crank of variable cinematic transmission-ratio is given in Fig. 16. The arms 39, 40, form a standard bell-crank of constant cinematic transmission-ratio, turning round the pivot 41. The driving-element of the transmission attacks, for instance, the arm 40 in 45. On the arm 39 slides a small bar $39^1$ to which the driven-element may be attached in 44. The cinematic transmission-ratio of such a bell-crank is adjustable in size and in sign by modifying the distance between points 44 and 41.

The straight lever with adjustable ratio of its lever-arm lengths is represented by Figs. 18a to 18c. Although of an elementary design, such a lever calls for a few comments, for it constitutes, under the name of "justifying lever," the typical element of a high number of modified forms of typewriters described further on. A straight lever comprises three characteristic points placed in one single line: the fulcrum around which it swivels (axis of articulation O), point A where the power is exerted, and point B which transmits the power to the resistance. The conditions of the functioning of such a lever depend on the respective positions of points O, A and B. If O is placed between points A and B (Fig. 18a), the displacements of the point B are reversed in relation to those of point A. If points A and B are placed on the same side in respect to point O (Figs. 18b and 18c), the displacements of point B are in the same direction as those of point A. In either case, the relation of the displacements of point B to the displacements of point A depend on the value of the quotient of the lever-arm lengths OB and OA, and it is the possibility of adjusting this value which is utilized in the typewriters with justifying levers.

Without anticipating the working-drawings of the adjustment applicable to these typewriters, it is convenient to specify here the mechanical means permitting the modification of the size and sign of the relation OA/OB. Although the axis of articulation O may be displaced to this effect on the lever in relation to fixed points A and B, it is preferable, to simplify the construction, to keep point O fixed and to displace points A and B. Under these conditions, there is machined on the lever a rectilinear guide: slot, groove, rail or ramp passing through O and along which A and B will move, A and B taking the form of one of the elements: slider, pin, shoe or touching-member. Figs. 18a to 18c show pins displaceable in a slot of the lever.

To give an example of the possibilities above alluded to of the transference to the transmission-gears of the adjustment function, a justifying typewriter for terminal segments derived from the combination ag will now be described in detail. The changes incorporated in this modified form consist, as above mentioned, in the making adjustable of the element (slider's slot) whose direction was fixed in the combination ag, and, inversely, in the fixing of the element (rectilinear guide) whose inclination was adjustable in the said combination ag.

In this modification (Fig. 24), the arm 26 for the longitudinal driving of the platen 21 on the carriage still comprises a pin 25 engaging itself in a circular groove 24 of the platen. This arm, guided by the slideway 27 of a rectilinear frame 31 mounted on the carriage-plus-rack block by screws such as $31^1$, is integral with the slider 30 displacing itself in the frame 31 in parallel direction to the platen-shaft, so that the displacements of the platen and those of the slider are now equipollent.

Rod 32 guided by the slideways $27^1$ of the frame 31 still comprises a pin 59 circulating in the rectilinear guide (groove) 57, here of invariable inclination, of a piece 68. To facilitate the engagement of the pin in the groove at the point 58 where the justifications will begin, the lower wall of this latter (the upper wall if the groove sinks instead of rises) protrudes slightly towards the right in relation to point 58. Rod 32 comprises a second pin 28 which attacks the slot 29 radially formed in a disc 37 mounted rotatively on the slider 30. The center of the half-circumference forming the bottom of the slot 29 coincides with the center of disc 37. The direction of the slot 29 corresponding to a given case of justification is adjusted by the rotation of this disc upon itself. As for the locking of the disc in the desired position, this is obtained by any means, in itself without interest from the invention's point of view, for instance by means of notches 62 of the slider 30 concentric to the disc. When the slot 29 is placed in a parallel direction to the rod 32, the displacements of the pin 28 in the said slot, consecutive upon those of the rod 32 along its axis, do not provoke any movement of the slider 30 in the frame 31; the slider even becomes locked in the frame.

In contrast, when the slot 29 is placed in the area of angular direction as represented by the figure, any advance of the rod 32 along its axis, towards the top of page, following the leftwards displacement of the pin 59 in the groove 57 in correspondence with the movements of the carriage-plus-rack block during the typing, causes a recession of the slider 30 in the frame 31 in proportion to the said advance of the rod 32, therefore an identical recession of the platen on the carriage-plus-rack block. And if there is given to the slot 29 a direction which is opposite, in relation to the rod 32, to that shown by the figure, any advance of the rod 32 along its axis will correspond, on the contrary, to a proportional advance of the slider in its frame, therefore an identical advance of the platen in relation to the carriage-plus-rack block.

The proportionality of the displacements of the slider in its frame to the displacements of the rod 32 along its axis, as well as the direction of these displacements, which proportionality and direction control the degree of contraction or extension of the terminal segment, thus depend on the angle formed by the slot 29 with the rod 32 as they were dependent upon that of the ramp 57 with this same rod in the typewriter conforming to the ag combination. To prevent the rod 32 displacing itself along its axis outside the justification-periods, a spring $32^1$ tends constantly to pull the pin 28 back to the bottom of slot 29. It is in no wise necessary that this spring should be powerful, because it does not intervene in any way in the justification. In fact, when the pin 59 ascends the groove 57 towards the left, it is the lower wall of this latter which compels the rod 32 to advance along its axis towards the top of the page (the spring $32^1$ compressing itself, of course, on this occasion); and at the time of return, when the pin 59 descends it, it is essentially its upper wall which compels the rod 32 to retreat along its axis.

At the very instant when the action of this last wall ceases, the pin 28 has reached the bottom of the slot 29 and, as the spring $32^1$ will keep it there, it is sure that the said pin will present itself again at a convenient height (position 58) to engage the groove 57 at the time of the next justification. Naturally, the piece 68 carrying the rectilinear guide 57 is a slider which is displaceable and lockable as before on a toothed horizontal bar 69 of the frame, with a view to permit the beginning of the justifications at any desired point 58, and thus to fashion the right-hand margin to any desired width as has already been indicated.

Finally, to dispose of typewriters with a sliding platen, it is convenient to notice that the diagram of Fig. 24 may be transformed into the extremely simple one of Fig. 29. The disc 37 is replaced by a small bar 37, hinged to the end of the arm 26 opposite to the pin 25, the direction of which small bar in respect to rod 32 is adjustable by the engagement of its tip in the notches 62 of the sector 61 integral with the arm 26. The pin 28 of rod 32 works in the slot 29 of the small bar 37. The slideways 27 and $27^1$ for the arm 26 and the rod 32 are integral with the carriage-plus-rack block as before, being, for instance, machined on a same fitting 31 mounted on the carriage by screws $31^1$. The presentation of the pin 59 at correct engagement-height in the groove 57 at the point 58 where the justifications should begin is assured by the spring $32^1$. This drawback spring, which works between the pin 59 and a teat $31^2$ of the fitting 31, tends to pull back the pin 28 constantly into the bottom of the slot 29.

Fig. 30 shows diagrammatically the general aspect of a justifying typewriter with platen shifting on the carriage-plus-rack block, fitted with a type of end-of-line justifier as illustrated in Fig. 29.

II. *Typewriters with carriage-plus-platen block shifting in relation to the rack*

The arrangements above described all refer to typewriters with platen shifting in relation to the carriage-plus-rack block. As has been said, numerous other justifying typewriters presenting this same characteristic could likewise be designed without exceeding the limits of the present application. Now, in the exposé to follow, for the purpose of example only, typewriters of the second great category which is the subject of the present invention, that is to say typewriters with carriage-plus-platen block shifting in relation to the rack (reference-part of the relative-slidings systems formed on these typewriters) will be described. In the said typewriters, all mountings permitting the shifting of two elements one on the other may be utilized: teats of the carriage sliding in slideways of the rack, or the reverse, travel of the rack in a groove milled longitudinally in the carriage, or between two guides of the carriage which maintain it, etc. The driving-mechanisms of the carriage-plus-platen block on the rack may be extremely varied. The transmission-gears already described for the driving of a platen on a carriage-plus-rack block in the typewriters with sliding platen may likewise be utilized for the driving of a carriage-plus-platen block on a rack.

Figs. 31 and 32 show by way of example, in top plan view, the transformation of the displacements, along its axis, of the rod 32 of a touching-member, conforming to one of those previously described, into relative-slidings of the carriage-plus-platen block on the rack, by the use of a bell-crank. The return-spring 64 of the rack-carriage-platen ensemble, normally fastened to the carriage, is now fixed on the rack.

In Fig. 31, rack Cr is provided with a fitting 50 which carries the axle of articulation 51 of the bell-crank 52—53, as well as the slideway 54 of the rod 32 of the touching-member. The lever-arm 52 of the bell-crank attacks a teat 55 integral with the carriage-plus-platen block represented by the carriage Ch. The figure shows also the slideways 48 of the rack in which the teats 47 of the carriage circulate. The carriage retreats by the segment $d$ in relation to the rack when the rod 32 is pushed in the direction of the arrow. It would advance on the contrary in relation to the rack if the rod 32 were drawn towards the top of the figure.

In Fig. 32, a modification of Fig. 31, fitting 50 is mounted on the carriage-plus-platen block, again represented by the single carriage Ch, the axle of articulation 51 of the bell-crank 52—53 being integral with the carriage, while the teat 55 is fixed on the rack. When rod 32 lowers itself in the direction of the arrow, the bell-crank 52—53 attempts to take the position indicated by the right angle in dashed lines; in consequence, the teat 55 should shift towards the right, pulling the rack at the same time. But as the rack is held by the return-spring 64, the teat 55 becomes a fixed point around which the arm 52 turns until it has reached the position prescribed to it by the lowering of rod 32 (bell-crank's position indicated by the right angle in dotted lines). In so doing, it compels the articulation 51, and thus the fitting 50 and the carriage, to advance in relation to the rack (arrow $f$).

If the displacements of the carriage-plus-platen block in relation to the rack take place effectively in the direction of the arrow $f$, it must not be concluded, however, that these displacements have the length of the vector $f$. In fact, the rod 32 being carried by the carriage-plus-platen block, every relative-shifting of this block provokes a certain travel of the pin 59 in the rectilinear guide 57; but this travel results in a supplementary relative-shifting of said block, which shifting provokes in turn a supplementary travel of the pin in its guide, and so on. Fig. 33 goes to show that this series of interactions has a limit.

In Fig. 33, the displacements of the rod 32 along its axis are normally provoked by the contact of its touching-tip 59 with the rectilinear guide 57 of adjustable inclination $\alpha$. In this Fig. 33, O corresponds to the origin of the terminal segments to be justified. When the touching-tip 59 reaches this point O, the two parts of the relative-slidings system formed on the typewriter: rack on the one hand, carriage-plus-platen block represented by the carriage on the other, split up for the needs of the justification. Admitting that the rack has travelled over, from this origin O, a segment OA at the end of which it stops, the rod 32 has lowered by $AB = OA.tg\alpha$. If $k$ is the cinematic transmission-ratio of the bell-crank (quotient of displacements that it transmits—relative-slidings of the carriage on the rack—by the displacements AB which it receives from the rod 32), the carriage, which has advanced by OA with the rack, has moreover advanced in relation to it by:

$$AA' = k.AB = k.tg\alpha.OA$$

This relative advance AA′ has provoked a supplementary travel BB′ of the touching-tip 59 on the rectilinear guide 57, therefore a supplementary lowering CB′ of the rod 32 along its axis from which has resulted an additional advance A′A″ of the carriage on the rack. This additional advance A′A″ has caused in turn a further lowering C′B″ of the rod 32 from which has resulted a further additional advance A″A‴ of the carriage on the rack, and so on, to infinity, the phenomenon superposing indefinitely on itself.

So as $$AA' = k.tg\alpha.OA$$
$$A'A'' = k.tg\alpha.AA'$$
$$A''A''' = k.tg\alpha.A'A'', \text{ etc.}$$

So that the total relative advance $d$ of the carriage on the rack is the sum of the terms of a geometric progression whose first term is $k.tg\alpha.OA$, and ratio $k.tg\alpha$ $$d = \frac{k.tg\alpha.OA(1 - k^n.tg^n\alpha)}{1 - k.tg\alpha}$$

which expression has no meaning unless $k.tg\alpha < 1$, a condition which the construction must obviously fulfil. First of all, $\alpha$ is necessarily smaller than 45°, without which the raising of the touching-tip 59 by the rectilinear guide 57 would prove too difficult. Even if $k$ slightly exceed 1, $tg\alpha$ being substantially smaller than 1, $$d = \frac{k.tg\alpha.OA}{1 - k.tg\alpha}$$

If, for instance, the carriage-plus-platen block must advance by 4 characters relatively to the rack during an advance of $15 + \phi$ characters of the latter (justification on 20 characters of a terminal segment of 16 characters, $\phi$ being liable to vary, according to the type of escape-gear, from 0 to 1 character, as has already been explained), $$d = \frac{k.tg\alpha(15 + \phi)}{1 - k.tg\alpha}$$

$$k.tg\alpha = \frac{4}{19 + \phi}$$

If the bell-crank arms are equal in length ($k=1$), the value of $tg\alpha$ is about one-fifth. Similarly, for a terminal segment of 17 characters to be justified to 20, the inclination of the rectilinear guide would be defined by:

$$tg\alpha = \frac{3}{19 + \phi}, \text{ etc.}$$

This digression has incidentally explained the theory of the inclination-adjustment of the rectilinear guide 57 in an end-of-line justifier for typewriters with carriage-plus-platen block mobile on the rack, utilizing a bell-crank as transmission-gear and a ramp, slot, groove or rail of variable inclination as driving-mechanism, in the case when the touching-member is carried by the carriage (Fig. 32). More generally, this theory is applicable to justifiers in which the touching-member actuated by a rectilinear guide of variable inclination is carried by the sliding-part of the relative-slidings system formed on the typewriter.

When the touching-member is carried by the rack, that is to say the reference-part of the relative-slidings system (Fig. 31), the theory of adjustment is much simpler. If the bell-crank still has arms of equal length, the rectilinear guide 57 must be inclined by $$tg\alpha = \frac{4}{15 + \phi}$$

for a terminal segment of 16 characters, $$tg\alpha = \frac{3}{16 + \phi}$$

for a terminal segment of 17 characters etc., as indicated in Fig. 23 in which the touching-member was likewise carried by the reference-part of the system, which was then the carriage in its capacity as element of the carriage-plus-rack block.

When the rod 32 of Fig. 32 rises instead of sinks, the bell-crank 53—52 must turn in clockwise direction and the teat 55 should move toward the left. As the rack is locked in this direction by its holding-pinion, the teat 55 forms once again a fixed point around which the arm 52 of the bell-crank turns, this time provoking the recession of the pivot 51, therefore that of the fitting 50 and finally of the carriage-plus-platen block with respect to the rack.

All that has been said about the adjustment of the width of the column and the lay-out of the column, as well as about the driving-mechanisms, in typewriters with platen sliding on the carriage-plus-rack block is valid for the typewriters with carriage-plus-platen block sliding on the rack. It is likewise convenient in these latter typewriters that outside the justification-periods the transmission-gears remain in the neutral position corresponding to the normal typing, so that the tip of the touching-rod may engage automatically with the rectilinear guide 57 when the justifications are about to begin. Here, too, the above-mentioned devices may be applied. The justification-adjustment does not differ in principle from the adjustment in typewriters with sliding platen, since it is still a question of displacing by $n$ characters the relatively mobile part (here the carriage-plus-platen block) of a relative-slidings system, in relation to the reference-part of this system (here the rack), during a travel of $N-1+\phi$ characters of this last part, N representing the number of characters of the terminal segment to be justified.

The adjustment working-drawing, on the contrary, varies according to whether the transmission-gear is carried by the reference-part or by the relatively mobile part. In the first case, that is to say that in which the transmission-gear is carried by the rack, it is a working-drawing of the type of Fig. 23 (where this gear was integral with the carriage-plus-rack block to actuate a sliding platen) which is applicable. In the second case, that is to say that in which the transmission-gear is carried by the carriage-plus-platen block, the theory of adjustment has just been dealt with in detail. As another example of adjustment will be given later, on the occasion of describing another typewriter with sliding carriage-plus-platen block, there is no need to stress this point further.

It has already been said that the typewriters with sliding platen allow extremely varied forms of execution to be designed; these forms result, on the one hand, from every possible two-by-two combination of the various modes of design of their component-parts as listed in Table A for the transmission-gears and Table B for the driving-mechanisms and, on the other hand, from the possible transference to the transmission-gear, when practicable, of the adjustment function devoted in a given arrangement to the driving-mechanism (this, as already stated, by making adjustable in the said transmission-gear a certain member which was invariable and by simultaneously fixing the adjustable member of the actual driving-mechanism).

The modified forms of typewriters with sliding carriage-plus-platen block are more numerous still. First of all, these typewriters may utilize the same two-by-two combinations of transmission-gears and driving mechanisms, and the same possible transference of the adjustment-function to the said transmission-gears as the typewriters with sliding platen. Further, the said transmission-gears may be set up indifferently on the sliding part, or on the reference-part, whereas a similar permutation of the mounting-positions of these same gears would involve certain intricacies in the typewriters with sliding platen.

The preceding developments have dealt with the method of end-of-line justification in typewriters comprising a system of two parts sliding relatively, the mode of action of various justifying mechanisms involved, and finally the multiple combinations of the nature, mounting-positions and role of these mechanisms which may be used for end-of-line justification. Two typical examples of these combinations, together with some modifications, have been provided for each of the two great categories of typewriters with end-of-line justifiers: those with platen sliding on the carriage-plus-rack block on the one hand, and those with carriage-plus-platen block sliding on the rack on the other.

Now, to give new examples of these combinations, three other types of typewriters with end-of-line justifiers and certain of their modifications will be described in detail. These examples all deal with the great category of typewriters with carriage-plus-platen block sliding on the rack. It must be understood, however, that the particular combinations of justifying mechanisms which they illustrate are equally applicable to the great category of typewriters with platen sliding on the carriage-plus-rack block.

While the first type of typewriter in this new series of examples is fairly similar, as far as its appearance is concerned, to one of the typewriters already described, the other two types differ appreciably from it by original constructions of the rectilinear guide, this latter being set on a lever (called "justifying lever") whose fulcrum will sometimes be integral with one of the two parts of the relative sliding system formed on the typewriter, sometimes with the frame, and which will sometimes work as a lever of the first kind, sometimes as a lever of the second kind. The first of these typewriters comprises for driving-mechanism, a ramp of fixed inclination integral with the frame; for transmission-gear, a rectilinear slot of adjustable direction carried by the carriage, the connection between the ramp and the slot being performed by a rod carried by the rack.

Figs. 34 to 37 represent in plan the basic diagram of the typewriter for different cases of working. Fig. 38, a schematic working-drawing, explains the adjustment of the justifier for the various cases of justification. Figs. 39 and 40 represent a mode of design of the justifier in question. This typewriter works as follows: Let a ramp BC (Fig. 34) of any inclination—included for example between 20° and 30° in relation to the horizontal—but invariable, be the hypothenuse of a right-angled triangle ABC. This ramp is fastened to the left routine margin-stop intended, in this particular case, to stop the carriage at that point in its travel towards the left where justification should begin, that is to say, in the position where the first character of the terminal segment will be typed; the said stop is retractable.

During the course of the justifying typing, the rack Cr (shown in heavy lines) moves from right to left in a parallel direction to BA and character by character, under the action of the return-spring $r$. The ramp BC is operated by a touching-member $p$ sliding on and perpendicularly to the rack, under the impulse of a drawback-spring (this spring, not represented in order to simplify the diagram, appears, however, in Figs. 39 and 40). When the justification is about to begin, the tip of the touching-member is, by construction, in B. The carriage-plus-platen block, represented by the single carriage Ch, is indicated by the rectangle in thin lines placed along the rack Cr and it is understood that Ch may slide on Cr. As the movements of the rack towards the left are stopped character by character by the ratchet-wheel, and those towards the right opposed by the return-spring $r$, the rack obviously constitutes the reference-part of the relative-slidings system formed on the typewriter.

To reason about a concrete example (Fig. 34), it will be assumed that: (1st) The fraction of character $\phi$ which the ratchet-wheel allows the rack to advance an instant before the precise moment of impression of each character is equal to ½ character; (2nd) The terminal segment of line on which the justifications are systematically performed has, in the typewriter under consideration, a length of 20 normal characters; (3rd) The terminal segment to be justified only comprises 16 characters. When justification is about to begin, that is to say an instant before the metal type which will print the first of these 16 characters is put into action, the tip of the touching-member is, as has been said, in B by construction.

With respect to the purposes of the justification, the ½ normal character displacement of the rack, as well as the resulting displacement of the carriage, which will immediately follow the impression of the last character of the terminal segment to be justified (here the 16th) will not count. In fact, from these latter displacements there would simply result the beginning of the positioning of the carriage for the typing of a further character (here the 17th), a typing which, by hypothesis, is not contemplated. What counts is the displacement of the rack (the resulting displacement of the carriage being temporarily neglected) between the instant of the action on the key which has determined the impression of the first character of the terminal segment and the precise instant at which the 16th and last character of this segment is printed. This displacement is of 15½ characters in relation to point B, and not of 16.

Similarly, the displacement by ½ character of the rack and the equipollent displacement of the carriage occurring immediately after the impression of the last character of a terminal segment which would comprise exactly 20 normal characters and would thus come justified of itself do not count, the right-hand margin being determined not by these displacements, subsequent to the impression of the said last character, but by the right-hand edge of this latter, which fixes at 19½ characters from the point B, and not at 20, the carriage's travel to be considered from the point of view of the justification.

If the carriage formed a block with the rack, it would only advance by 15½ characters during the typing of the terminal segment. However, the 16th character of this segment must come into line with a 20th normal character. As this 20th normal character would correspond, as has been shown, to a course of 19½ normal characters of the carriage beyond the point B, it is convenient to make the carriage advance gradually in relation to the rack by 19½−15½=4 normal characters.

On the side BA of the right-angled triangle (Fig. 35) the point 15½ marks the position which the touching-member $p$ has reached at the precise instant of impression of the 16th character of the terminal segment to be justified. The tip of the touching-member $p$, starting from B, has then advanced by $l$ along the axis of said touching-member. The back end of the touching-member $p$ being provided with a vertical finger $d$ engaged in a rectilinear slot $f$ of the carriage, the inclination to be given to this slot for the carriage to advance 4 normal characters in relation to the rack while the touching-member advances $l$ along its axis is that (Fig. 34) of the hypothenuse of a right-angled triangle which has as the sides of its right-angles: on the one hand, a segment $l$ carried along the touching-member from $d$ onwards, and, on the other hand, a segment of 4 normal characters. Thus, the rack having advanced, from point B onwards and until the precise moment of impression of the 16th character of the terminal segment to be justified, by 15½ normal characters (Fig. 35), and the carriage having simultaneously gone forward in absolute value of 15½+4=19½ normal characters, the 16th and last enlarged character of the terminal segment to be justified will fall in the position which a 20th normal character would have occupied in the course of a normal typing.

An opposite case of justification will now be examined, that in which the terminal segment to be justified would comprise, for instance, 24 characters which it is again necessary to bring to a length of line corresponding to 20 normal characters, that is to say, to print in the course of a displacement of 19½ normal characters only of the carriage from point B onwards (Fig. 36). The carriage must be in place for the typing of this 24th contracted character, in the position of a 20th normal character, after a travel of 23½ normal characters of the rack from point B onwards. A progressive and concomitant withdrawal of 4 characters must therefore be imposed on the said carriage in relation to the rack.

Figure 37:
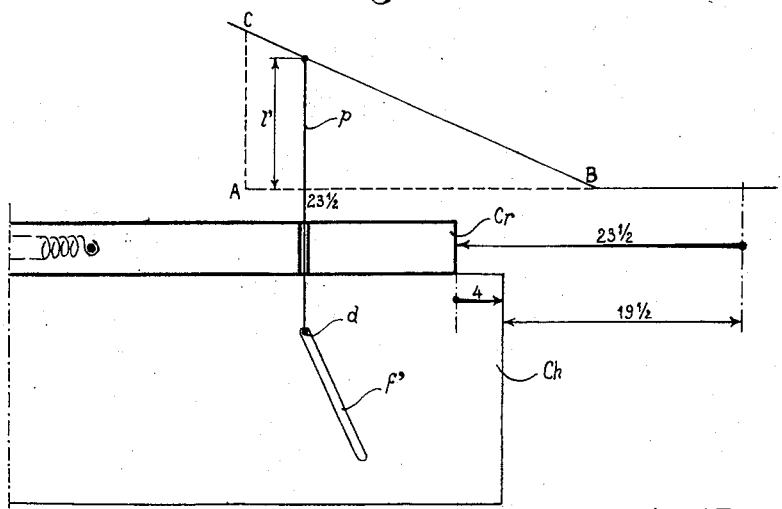

At the precise instant of impression of the 24th character, the touching-member has reached the graduation 23½ of BA (Fig. 37). Pushed against the ramp by its unrepresented spring, it has advanced by $l'$ along its axis. The inclination to be given to the slot to obtain the desired gradual retrogression of the carriage is that, $f'$, indicated by Fig. 36, producing the hypothenuse of a right-angled triangle whose right-angled sides are respectively equal to $l'$ and to 4 normal characters, and which is constructed this time on the left of the touching-member since a relative retrogression of the carriage must be provoked. Thus, up to the precise instant of impression of the 24th contracted character, the rack will have advanced by 23½ normal characters (Fig. 37) and the carriage, in absolute value, by 23½−4=19½ normal characters only, so that the 24th and last contracted character of the terminal segment to be justified will still occupy the position of a 20th normal character. Of course, in the practical embodiment of Figs. 34 to 37 to typewriters, $f$ and $f'$ will not constitute two slots, but one single slot capable of taking various inclinations, the said slot being possibly cut out in a piece turning around an axle carried by the carriage: lever, sector, disc, etc.

Fig. 38 represents this last arrangement diagrammatically and shows, on a bigger scale than would have been possible in Figs. 34 to 37, the working-drawing relating to the adjustments of the inclination of the slot applicable to this kind of typewriters. The displacements $l \ldots l'$ of the touching-member along its axis being proportional to the corresponding displacements 15½ ... 23½ of the rack which carries it, the locus of the finger $d$ on the disc D at the end of the justifications, for the various cases of justification, is a segment of straight line $xy$, parallel to BC, on which the different final positions of $d$ are necessarily equidistant. It follows that the angular settings of the slot corresponding to the successive cases of justification—from 4 characters too few to 4 characters too many—are not, for their part, equidistant. (A similar fact has already been observed in Fig. 23.) The rotation of the disc D being operated by a handle $m$ provided with a locking-pin $e$, the notches, such as $e'$, in which $e$ should be engaged to lock D before every justifying operation, are therefore correctly represented as being unequally spread out.

Figs. 39 and 40 represent schematically a form of construction of an end-of-line justifier embodying the basic diagrams of Figs. 34 to 37, and illustrate the case in which the terminal segment to be justified comprises 16 characters. Fig. 39 shows the pieces in the same positions as in Fig. 34, that is to say at the beginning of the justification-period, before the adjustable element of the transmission-gear (disc D) has been adjusted with respect to such a justification, and Fig. 40 shows them in the same positions as Fig. 35, that is to say at the end of this period. The letters in these figures designate the same elements as in Figs. 34 and 35. The quantities 4, 15½ and 23½, indicating in numbers of normal characters the values of certain displacements, are placed in brackets to distinguish them from the numbers serving as supplementary references in the detailed description which follows. As 1 and 1′ also refer to displacements, these letters have likewise been put in brackets so that the notations are identical. The rack Cr and the carriage Ch are mounted in sliding fashion one upon the other by means of teats such as 1 screwed to the carriage Ch and circulating in slots such as 2 hollowed out in the rack Cr. The carriage Ch can be displaced by 4 characters in either direction in relation to the rack Cr.

In Fig. 39, the tip of the touching-member $p$ is in B. Its terminal finger $d$, constantly pulled forwards by the spring 3 (which was not shown in basic diagrams of Figs. 34 to 37 but whose existence has nevertheless been mentioned), coincides with the center of disc D. The tip of the touching-member being stopped in B it is, in consequence, possible to make D turn by means of the handle $m$ without causing the least sliding of the carriage on the rack. The escape-gear of the rack is diagrammatically represented on the left of the figure. The piece 5 is the supporting-plate of the device, integral with the frame; 6, the ratchet-wheel, controlled by the double pawl 7 swivelling in synchronism with the key-bars (the two pawls are naturally spaced apart one in relation to the other by a fraction of tooth of the ratchet-wheel); and 8 is the holding-pinion of the rack, keyed to the shaft of the ratchet-wheel.

In ordinary typewriters, the return-spring $r$ of the rack-carriage-platen ensemble is hooked onto the carriage Ch. In typewriters equipped with the described justifier, on the contrary, this spring $r$ is hooked onto the rack Cr, as already shown in Figs. 34 to 37, so as to leave the carriage complete freedom to slide in relation to the rack Cr. The recalling element being in fact, in most cases, a spiral spring concealed inside the frame, the reference $r$ is here coupled to the inextensible ribbon or cable which links the rack Cr to the said spiral spring. The hook-and-pin attachment of the ribbon on the rack Cr is not visible because it fails in the break of continuity of Fig. 40, after the rack has travelled 15½ characters towards the left.

The mounting-position of the attachment-pin shown in Fig. 40 is purely diagrammatic. In practice, this pin may be laterally mounted on the right end of the rack, the inextensible cable $r$ then passing beneath the escape-device 6, 7, 8. The fixed slot 12, hollowed out in the fitting 10 integral with the rack by means of screws 11, serves as a guide for the back end of the touching-member, through the engagement of the finger $d$ in the said slot. Any tendency of the touching-member to bending is thus counteracted.

To operate the justification the adjustment is done in the following manner: The typist, knowing that there are 4 missing characters in the terminal segment to be justified, makes the disc D turn by means of the handle $m$ until the pin $e$ whose rising is controlled by pressure exerted on $m$, engages the notch —IV. The slot then sets itself along the mixed line $f$, the direction of which appears also in Fig. 40. As, during this operation, the finger $d$ does not leave the center of the disc D, the carriage $Ch$ has not moved in relation to the rack $Cr$ and the pieces remain in the positions indicated in Fig. 39. It is during the course of the typing which follows the adjustment that the finger $d$, circulating in the slot $f$ under the action of the spring 3, progressively shifts the carriage forwards in relation to the rack $Cr$.

At the end of the justification (Fig. 40), that is to say at the precise instant of the impression of the 16th and last extended character of the terminal segment to be justified, the rack $Cr$ and the touching-member $p$ have shifted 15½ normal characters in relation to point B; $p$ has moreover advanced by 1 along its axis. The finger $d$ of $p$, in advancing by 1, has provoked, by its circulation in the slot $f$ set to —IV, a relative advance of 4 normal characters of the carriage $Ch$ in relation to the rack $Cr$; Fig. 40 shows that the teats 1 are now in contact with the left end of their slideways 2. The carriage $Ch$ has therefore advanced in absolute value by 19½ normal characters, which ensures justification on a length of 20 normal characters. Similarly, by setting the slot $f$ to —III to justify a terminal segment of 17 characters, the carriage $Ch$ will advance in relation to the rack $Cr$ by 3 normal characters only until the precise moment of impression of the 17th extended character. As the rack $Cr$ will have advanced by 16½ normal characters until this instant, the carriage $Ch$ will still have gone forward, in absolute value, by 19½ normal characters, which will again ensure justification on a length of 20 normal characters. And so on.

When the handle $m$ is in neutral position (pin $e$ engaged in notch O) (Fig. 39) the slot $f$ is parallel to the touching-member; the finger $d$ may therefore run along it without imparting any sliding to $Ch$ on $Cr$. This position corresponds to the normal typing. In order to use the typewriter in the normal way, it consequently suffices to put $m$ in neutral position; in addition, to avoid the henceforward useless contact of the touching-member against the slant ramp BC and its preceding horizontal element, it is enough to lock $p$ in backward position by any component-part of an elementary design (for instance, a lock or a hook, carried by the fitting 10, which would clamp at will the protruding end of the finger $d$). The plane in which the ramp BC is cut, that in which the touching-member $p$ displaces itself, and that in which the slot $f$ turns are necessarily parallel, but not necessarily horizontal as in Figs. 34 to 40. It is possible to make these planes tilt by any angle around a parallel to the axis of translation common to the carriage and to the rack and, in particular, to arrange them vertically.

The mode of use is as follows: (1st) The justifier being set at zero, bring the rack-carriage-platen ensemble to the position where the right-hand edge of the future column of text comes in line with that place of the frame where the impressions are performed (guiding notch for the metal types). (2nd) Depress the back-space key twenty times. The rack-carriage-platen ensemble then comes into the position where all the justifications will begin. Mark this position by displacing the left routine margin-stop (retractable stop, adjustable on the left part of the margin-bar, and attached, as has been said, to the ramp) until the said stop contacts the corresponding stop-pin of the ensemble in question, generally mounted on the carriage. The point B then coincides with the tip of the touching-member. This adjustment is made once and for all for a given piece of work. (3rd) Begin the typing at the chosen left-hand margin and continue until halting at the retractable stop. (4th) Count the characters (spaces between words and syllable-end hyphen included) of the terminal segment to be justified on the length of 20 normal characters it remains to cover to reach the right-hand margin, and set the justifier according to the number of surplus or lacking characters. Again, the effective reckoning may be advantageously replaced by a fictitious typing of the terminal segment on the space-bar. (5th) Clear the stop, perform the end-of-line typing and reset the justifier at zero.

Fig. 41 represents the diagram of a modification of the preceding typewriter, a modification obtained by the permutation of the mounting-positions of the touching-member and the pivoting disc, the former being carried by the carriage-plus-platen block instead of by the rack, and the latter mounted on the rack instead of on the carriage-plus-platen block. The rack $Cr$ carries with it the touching-rod $p$—and, in consequence, the carriage $Ch$ on which this rod is mounted—by the intermediary of slot $f$ of disc D, in which slot the finger $d$ of $p$ circulates. During the course of the lengthwise displacements which the rack imposes upon it, the touching-rod $p$, pressed against the ramp BC by the compression-spring $r$, moves forwards or backwards along its axis contingent upon the direction of the inclination of slot $f$, thus provoking the desired relative shiftings of the carriage $Ch$ on the rack $Cr$.

In the second type of typewriters with carriage-plus-platen block sliding on the rack which will be described as a new example of the design of end-of-line justifying typewriters comprising a system of two parts sliding relatively; the rectilinear guide, a characteristic of the driving-mechanism, is machined on a lever (called "justifying-lever") swivelling, under the action of a stop on the frame and during the justification-periods only, around an axle carried by one of the parts of the relative-slidings system, therefore around a mobile axle, the transmission-gears, carried by the other part, comprising a member of initially adjustable position on the rectilinear guide and afterwards shifting with and upon this guide.

The working and the adjustment of this typewriter are as follows: The axle O around which the justifying-lever L swivels is mounted on the end of the rack, either directly (Fig. 42) or by means of a fitting F (Fig. 43). In the periods of normal typing the lever L automatically takes the oblique position indicated in heavy line (called "rest-position"), by means of a stop E and a drawback-spring $r$, and it retains this position until the beginning of the justification. At this moment, the lever L comes into contact with a stop B of the frame (called "actuating-stop") and, the rack continuing its leftwards travel for the justification of the terminal segment, L pivots around O while pulling the spring $r$. Everything takes place as if, the rack $Cr$ being supposed fixed, the lever L were pushed rightwards by a vector $v$ level with B, $v$ representing, except with the respect to direction, the travel of the rack during justification of the terminal segment.

The carriage $Ch$ (Fig. 44), representing the carriage-plus-platen block mounted in a sliding fashion on the rack, is fitted with a fixed rod T whose inclination reproduces that of the lever L in the rest-position. Lever L and rod T are linked by a pin A, displaceable along the rod T and capable, once fixed on this latter, of sliding along the lever L (without which the system would be locked, the pin A, in its capacity as point of lever L, having to describe an arc of a circle around the pivot O, whilst it should, in its capacity as point belonging to rod T, describe a horizontal).

Under these conditions, if the linking-pin A and the actuating-stop B are placed on either side of pivot O (Fig. 45), the carriage advances in relation to the rack by a vector $v_1$, the rod T taking the position $T_1$, and if pin A and stop B are placed on the same side of this pivot O (Fig. 46), the carriage will regress relatively to the rack by a vector $v_2$, the rod T coming to $T_2$. Such a mounting thus permits the achievement at will, in an extremely simple way, of the continuous contraction or extension of a terminal segment. The adjustment of the position of the linking-pin A along the rod T results from the properties of similar triangles (Fig. 47).

The axis B$v$ represents the vectors $v$, that is to say the travels of the justifying-lever L level with the actuating-stop B during the justifications, travels graduated character by character up to $23+\phi$. For a terminal segment of 24 characters, printed during a rack's travel equal to $23+\phi$ characters, the carriage must go back 4 characters in relation to the rack (vector $v_2$); the corresponding position of the linking pin A on the rod T is marked $+IV$ because the terminal segment comprises 4 characters too many. For a terminal segment of 16 characters, printed during $15+\phi$ characters of the rack's travel, the carriage must advance 4 characters in relation to the rack (vector $v_1$): the corresponding position of the linking-pin A on the rod T is marked $-IV$. The inclination of rod T, and consequently of the justifying-lever L in the rest-position, may be any whatsoever. It is best, however, to choose it so that the swivellings of the lever L during the justifications may be approximately symmetrical in respect to the perpendicular to $Bv$ passing through O.

Figs. 48 to 51 refer to an end-of-line justifier based on the above-described principle. In these Figs. 48 to 51 the reference letters already used in Figs. 42 to 44 designate the same elements as in these figures. Fig. 48 shows, in plan, the positions which the pieces assume at the beginning of a justification, the justifying-lever L having just come into contact with the actuating-stop B and the mechanism being adjusted at $-II$ for the justification of a terminal segment of 18 characters. Fig. 51 represents the mechanism during the course of justification.

First of all, the carriage $Ch$ slides on the rack $Cr$ by teats such as 47 moving in slideways such as 48 of this rack $Cr$. On the rod of fixed inclination T (Fig. 48), mounted on the carriage, there circulates a slider C carrying the pin A. The locking of this slider C on the rod T is ensured by a plate-spring $l$ integral with the said slider C and whose curved end engages with the notches $-IV$ to $+IV$, corresponding to the graduations of the adjustment working-drawing. The justifying-lever L swivels around O on the fitting F mounted at the end of the rack, and is constantly recalled into its rest-position, against the stop E of the fitting F, by the spring $r$; its lower face turning in contact with F is smooth, while its upper face carries the rectilinear guide G in which the linking-pin A circulates, this guide here taking the form of a longitudinal groove whose plane of symmetry passes through O. The inclinations of the lever L and of the rod T being identical at the origin of the justification, the linking-pin A may circulate in the rectilinear guide without causing any shifting of the carriage on the rack. When the justifier is set at $+IV$, A comes to $A_2$; when it is set at $-IV$, to $A_1$. To keep justifying-lever L in its plane of rotation, even though no strain exercised upon it displays any tendency to make it move away, the fitting F widens out at the end, thus forming a substantial support for the lower face of L which rests upon it.

Fig. 48 corresponding to Fig. 45 (points A and B in opposed directions with respect to O), Fig. 51 shows that when lever L has been pushed back by the actuating-stop B, on a level with this latter, by a vector $v$, the rack will have advanced by $v$ on the frame, and the carriage simultaneously by $v_1$ on the rack. The absolute advance of the carriage is therefore $v+v_1$. At the instant when $v$ will take the value of $17+\phi$ characters, the impression of the 18th character will take place, and by virtue of the adjustment, $v_1$ will be equal to 2 characters. The carriage will have thus advanced in an absolute value by $19+\phi$ characters and the 18th lengthened character will fall in the place which a 20th normal character would have occupied.

The position, on the page, of the vertical where the justifications will begin is adjusted, and datum-marked, by means of the routine margin-stop intended to stop the rack-carriage-platen ensemble in its leftward movements. At the time this ensemble is stopped by the said routine margin-stop, the lever L should come into contact with the actuating-stop B. To this end, actuating-stop B is adjustable. The typist shifts it on the toothed bar 69 until this contact is provided, then she locks it in this position by the pawl 64 (Figs. 46 and 51). This operation, which constitutes the second adjustment-phase of the right-hand margin is likewise done once and for all for a given piece of work.

The return-spring of the rack-carriage-platen ensemble being fastened to the carriage, when the linking-pin A is on the opposite side of the actuating-stop B in respect to the pivot O (Figs. 45, 48 and 51), the pull of the said return-spring tends, as soon as the ensemble in question is transformed into a system of two sliding parts, to make the justifying-lever L turn in an anti-clockwise direction, and therefore to upset the contact of this lever L with the stop B. The spring $r$ opposes this tendency, and must consequently be strong enough to overcome it, unless the return-spring of the aforesaid ensemble be fastened to the rack. The ensemble Fig. 52 shows diagrammatically the general arrangement of an end-of-line justifying typewriter with carriage-plus-platen block shifting on the rack, embodying mechanisms such as those illustrated by Figs. 48 to 51.

The justifier of Figs. 48 to 52 is capable of numerous modifications. First of all, as has been specified, it is applicable to typewriters with sliding platen: in this case, it is installed between the carriage and the platen. Further: (a) The inclination of the plane in which its parts work may be any whatsoever; (b) The justifying-lever L, instead of turning on the upper face of the fitting F, may turn beneath its lower face, the rod T then having to be mounted beneath L instead of above it; (c) The rod T may be integral with the rack instead of with the carriage, and the justifying-lever hinged on the carriage instead of on the rack, as is shown, moreover, in Fig. 61; (d) The linking-pin A may be carried by the justifying-lever L instead of by the rod T. To compensate the fact that A describes, under these conditions, arcs of circle around O and no longer horizontal vectors proportional to the vector $v$, it is enough to replace the actuating-stop B by a ramp parallel to the rest-position of the justifying-lever L, and, at the same time, to provide L either with a vertical finger—cylindrical in form, or alternatively, in the form of a dihedron—or with a roller, both finger and roller intended to retain contact with the ramp from the beginning of justifications onwards; (e) The respective positions of the rest-stop E and of the drawback-spring $r$ of the justifying-lever L may be reversed; (f) The coil-spring $r$ working in tension may be replaced by a spring of the same nature working in compression, or by a plate-spring, or by a spiral-spring rolled round the axle O, projecting to this effect under the fitting F by the necessary length, and resting its free end against a rim of L; (g) The actuating-stop B may be combined with the routine margin-stop used to stop the carriage in its leftward movements; (h) The common inclination of the rod T and the justifying-lever L in the rest-position may be any whatsoever; (i) The locking of the slider C along the rod T is practicable in many ways; (j) The arrangement of the sliding and circulating parts lends itself also, to very varied designs.

While remaining within the general framework of the device illustrated by Figs. 48 to 52, that is to say, of a justifying-lever L hinged on the rack and a rod T integral with the carriage, the modifications being the object of Figs. 53, 54, 55, 56–57, 58–59 and 60 may be realized.

In Fig. 53, the slider C only partially surrounds the rod T.

In Fig. 54, the member of adjustable position along the rod T displaces itself in a slot $f$ of T instead of circulating in contact with the walls of the rod. This member may then be reduced to a linking-pin A welded or riveted to the end of a flat bar R which is guided in its displacements along the rod T: on the one hand, longitudinally, by the linking-pin A itself, and on the other hand, in height and laterally within certain limits, by a bridge $c$ fixed on the rod T. The side-clearance worked between the flat bar R and the inside lateral walls of the bridge $c$ allows this bar R to swivel around the linking-pin A (more exactly, to swivel with the pin A while pin A turns on itself), a swivelling through the agency of which the locking of the linking-pin A at the desired point on the rod T may be operated. To this effect, the flat bar R is constantly recalled towards the right, for example, by a plate-spring 1, and comprises on its right edge notches such as $e$ intended to engage a cog K of T. The adjustment of the position of the pin A is done as follows: shift towards the left, against the spring 1, the button $b$ forming the end of the flat bar R, pull or push this bar R the required quantity, and let the spring 1 bring back the bar R towards the right so that the cog K of the rod T engages in the chosen notch $e$.

In Fig. 55 (derived from Fig. 54, whose lower part it retains unmodified, the part in question being omitted for this reason), the linking-pin A is carried by a slider C circulating in the slot $f$ of T. If the linking-pin A must turn in the slider C, it is welded or riveted to the end of the flat bar R, as in Fig. 54. Alternatively, the linking-pin A may be solid with the slider C, the bar R being then necessarily hinged onto the said linking-pin A. In either case, the locking of this pin in the desired position on the rod T is achieved through the swivelling of the flat bar R as has been anticipated in Fig. 54.

In Figs. 56 and 57 the justifier is again drawn in its entirety, except the lower part of the lever L, which, being unmodified in respect to Figs. 48 and 51, is not represented. Fig. 57 represents the cross-section obtained by cutting Fig. 56 by a plane perpendicular to rod T and passing through the axis O, after the justifying-lever L has been brought to the rest-position underneath this rod T and the axis of linking-pin A put into coincidence with the axis O. The groove G of the lever L is replaced by a slot $f'$ with milled edges such as $f'_1$; the linking-pin A is provided with a flat head $t$, circulating in the countersunk channels $f'_1$ and designed to prevent the pin escaping upwards from the slot $f$ of T. In the cross-section of Fig. 57, F designates the fitting of Figs. 48 and 51 supporting the pivot O. (The same reference O is used for both the pivot and its axis of symmetry.) This pivot has here a diameter equal to the width of the justifying-lever L and is secured to this lever L by four screws such as V; it turns in the fitting F and is extended underneath this by a threaded part (mounting by means of the washer $w$, nut $m$, and a lock nut not shown). The position of the linking-pin A along the rod T may be controlled as before, or by means of a flat flexible bar R, which is slightly raised in respect to A to engage one of its locking-holes such as $e$ on a fixed stub K of the rod T.

In Figs. 58 and 59, the justifier is again re-drawn, but only for its relatively complex part located in the vicinity of the pivot O, the elimination of the end of the justifying-lever L attacked by the actuating-stop B, for instance, as well as that of the locking-system already fully commented, not impairing the understanding of the new arrangement.

Fig. 58 represents in perspective the component-parts of the justifier dismantled. The axis of the linking-pin A, and that, O of the disc-shaped pivot D, form the same vertical, which would correspond to the locking-together of the two parts of the relative-slidings system formed on the typewriter, the rack carrying the disc D on the one hand, the carriage-plus-platen block carrying the pin A on the other. Under these conditions, the justifying-lever L should appear beneath the rod T, that is to say in the rest-position involving the same inclination as the rod T. Yet it has been represented as having a different inclination, in order to re-emphasize the variability of this inclination in relation to that of the rod T during the course of the justifications.

Fig. 59 represents a vertical cross-section of the component-parts of Fig. 58 executed under the following conditions: the axis of linking-pin A and axis O are in coincidence as in Fig. 58; the justifying-lever L is in its rest-position under rod T; and the cross-section is made through the axis O, perpendicularly to the then common direction of the justifying-lever L and of the rod T.

The justifying-lever L is in essence a stamped U-shaped channel whose flanged edges form base-strips $s$. The piece called "axle O or pivot O" in previous descriptions, comprises a disc D, secured to the U by any suitable means: rivets, screws, welding, with the interposition between the lower face of the flanges $s$ and the disc D of thickness-props $u$ strengthening the assembly; this disc turns in the corresponding bearing D' of the fitting F integral with the rack Cr. Under the disc D and machined with it, a smooth shoulder serves as the centering of the washer $w$, and the threaded extended part $h$ receives the maiden-nut and lock-nut $m$ and $m'$ of the mounting. It is understood that the disc D cannot leave its bearing D', being kept in position level with the lower face of fitting F, by the washer $w$, and level with the upper face of F by the parts of the bottom of the lever L which protrude beyond disc D and turn in contact with this face. Rod T presents the same U-shaped cross-section as the lever L and its flanges $s'$ are turned downwards.

The linking-pin A is a small cylinder with a flat median ring $a$ whose faces serve as friction planes in connection with their base-flanges $s$ and $s'$, and which maintains at the same time the verticalness of A. In this pin is screwed the adjustment-rod T', with the strength of a bicycle-spoke, circulating inside rod T. For locking, the rod T' may be stamped so as to mark the adjustment-graduations (—IV to +IV, not represented) by bosses which the typist snaps in a spring-grip mounted on the rod T for this purpose.

Figure 60:
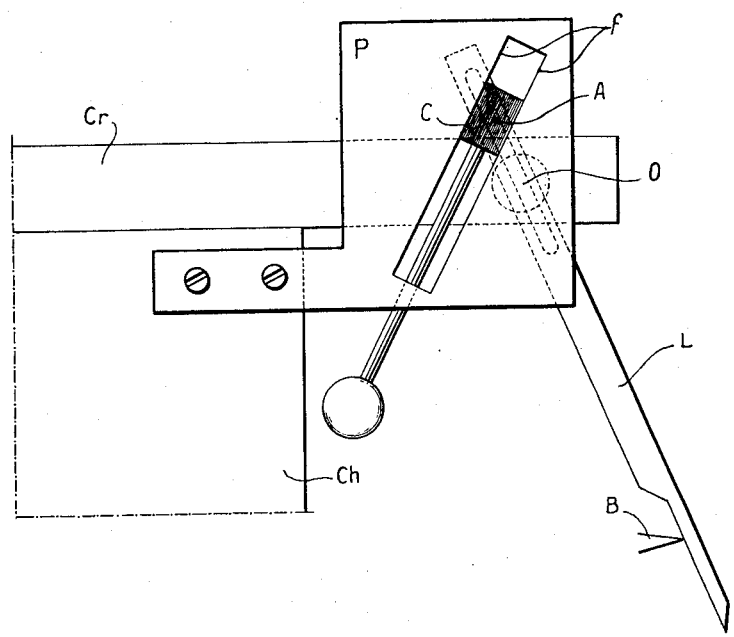

In Fig. 60, rod T, integral with the carriage-plus-platen block represented by the single carriage Ch, is replaced by a small plate P. The slot $f$ in which the member of adjustable position moves (in this particular case, the slider C carrying the linking-pin A engaged with the rectilinear guide of the justifying-lever L, hinged in O on Cr) is cut out in this small plate. Of course, a groove or rail may be substituted for $f$.

While still remaining within the broad lines of the arrangement of which Figs. 48 to 52 illustrate a mode of design and Figs. 53 to 60 modifications of the said mode, within the scope of end-of-line justifiers with justifying-lever L hinged on one of the two parts of the relative-slidings system formed on the typewriter, but while reversing, in this arrangement, the respective mounting-positionings of the lever L and the rod T, another mode of design is obtained of end-of-line justifying typewriters with justifying-lever swivelling around a mobile axle. Fig. 61 shows diagrammatically the broad arrangement of a typewriter of this kind, whose comparison with that of Fig. 52 will be of some interest.

The justifying-lever L now swivels (around the axle O) on the carriage Ch instead of swivelling on the rack as in Figs. 48 to 60. Its rest-position is always defined by a stop E and a drawback-spring $r$. Rod T, along which shifts the slider C carrying the linking-pin A engaged with the rectilinear guide G of the justifying-lever L, is now integral with the rack instead of with the carriage as in Figs. 48 to 60 mentioned above. In practice, this rod is cut in a fitting F fixed by screws onto the rack and forming a bridge beneath which the justifying-lever swivels.

In Fig. 61, as in Fig. 52, the justifier is in the neutral position, and the two parts of the typewriter longitudinally mobile on the frame: carriage-plus-platen block Ch on the one hand, rack Cr on the other hand, locked together by the justifier itself, are in the normal-typing zone. In fact, the justifying-lever L has not yet come into contact with the actuating-stop B of the frame which will make it swivel at the beginning of the justifications.

In a third kind of typewriters, with carriage-plus-platen block shifting on the rack, which will be described as last example of design of end-of-line justifying typewriters comprising a system of two parts sliding relatively, the rectilinear guide, characteristic of the driving-mechanism, is set on a justifying-lever swivelling, during the justification-period only, under the action of a member of adjustable position carried by one of the parts of the relative-slidings system, the said lever being backed, on the other hand, by a stop integral with the other part of this system; the transmission-gears being reduced, under these conditions, to the above mentioned member of adjustable position and to the stem with which it shifts for the adjustment. The essential difference of the kind of typewriter in question with typewriters also having a swivelling justifying-lever as just described above, lies in the fact that the pivot O of the justifying-lever L is now fixed on the frame whilst it was previously mobile.

In the preceding typewriters, the points A and B of the basic diagrams of Figs. 45 and 46 were now on opposite sides of the lever L in respect to the fulcrum O, now on the same side. In the typewriters of the present type, the points A and B are always on the same side of the lever L in respect to the fulcrum O, and besides, the point A is made movable either side of point B (Figs. 62 and 63) while it used to be on either side of fulcrum O. If A is placed between B and O (Fig. 62), the absolute travel of A will be lower than that of B; if B is the rack and A the carriage, the carriage will go backwards in respect to the rack, and inversely if B is the carriage and A the rack, the carriage will go forward in relation to the rack. If A is placed beyond B in respect to O (Fig. 63), the absolute travel of A will be higher than that of B with inverse conclusions. This mounting with justifying-lever swivelling around a fixed pivot therefore permits, just as the preceding one and relevant modifications, the achievement at will of the continuous extension or contraction of a terminal segment.

Now, descriptions will be successively given of the diagrammatic structure, working, adjustment, and, finally, certain constructional features, of an end-of-line justifying typewriter with justifying-lever so arranged, in which the sliding part of the relative-slidings system of two parts will be the carriage-plus-platen block. The following developments relative to such a typewriter will likewise be valid for typewriters with platen sliding on the carriage-plus-rack block. In this typewriter, the carriage-plus-platen block, represented in the various diagrams by the single carriage $Ch$, is mounted in a sliding fashion on the rack, for instance by pins and slots, the standard return-spring of the rack-carriage-platen ensemble remaining hooked to the carriage. The pivot O (Figs. 64 and 65) around which the justifying-lever L turns during the justification-periods, is mounted on a slider C displaceable and lockable along a horizontal rod $t$ of the frame (adjustment of the right-hand margin, achieved once and for all for a given piece of work).

As previously, justifying-lever L is recalled during the normal typing-periods into an oblique rest-position, here determined by a rest-stop $b'$ and a spring $r$ mounted on the slider C (Fig. 64), or by the single spring $r$ (Fig. 65) acting then in the direction of the rest-position, determined by its hooking point and the pivot O. The inclination of the justifying-lever L in the rest-position may be any whatever. There is an advantage in choosing it so that the sector swept by L in the course of the justifications be approximately symmetrical in respect to the perpendicular drawn to the rack through O. Preferably, the routine margin-stop used to stop the carriage in its leftwards movements, intended in end-of-line justifying typewriters to stop the rack-carriage-platen ensemble at the point where the justifications begin (a stop of the retractable type) is mounted in $b$ on the slider C. If such a mounting is not practicable, it will be necessary at the time of adjustment of the right-hand margin, to shift the slider C in strict correspondence with the said routine stop. As the slider C does not intervene in the justifications, it is not represented in the following diagrams.

The rotations of the justifying-lever L are controlled by a touching-member $p$ (Fig. 66) carried by an adjustment-stem T; this touching-member $p$, which is the member of adjustable position of the justifier, plays the part of point A in the ultra-diagrammatic Figs. 62 and 63. Stem T, whose inclination is fixed and reproduces the inclination of the lever L in the rest-position, shifts in a slideway $g$ of the carriage $Ch$. The T–$g$ ensemble carries the index and adjustment-graduations —IV to +IV, as well as an unrepresented locking-device of the stem T in the slideway $g$. Finally the lower face of the stem T comprises a locking-recess $e'$, in which a pin $e$ (mounted on the rack) penetrates when the stem T is set for normal typing.

The touching-member $p$ having to lean on the justifying-lever L in the course of the justifications, this lever L should not be allowed to yield towards the left. To this effect, a stop $d$ (Fig. 67 and 68)—equivalent to an actuating-stop if the lever L were swivelling round a fixed pivot, as in the previous case—is mounted on the rack in an intermittently protruding fashion, so as to form, during the justification-periods, the back-support needed by the lever L itself; this stop, which takes, here, the shape of a retractable finger, plays the role of point B of the ultra-diagrammatic Figs. 62 and 63. The back support-finger $d$ and locking-pin $e$ constitute the two ends of a rocking bar pivoted on the rack, on its outward wall for instance, and whose mounting is such that when the locking-pin $e$ sinks in respect to the upper face of the rack, the back support-finger $d$ protrudes, and vice versa; a drawback-spring $l$ tends to constantly make the locking-pin $e$ emerge and the back support-finger $d$ recede simultaneously.

The working of a justifier thus designed is illustrated by Figs. 71 to 74. In these figures, pin $e$ and finger $d$ are represented by their outlines: circular for the pin and triangular for the finger. When the inside of an outline is blackened the organ is up. Fig. 71 indicates the position of the component-parts during the normal typing-periods preceding the justifications. The justifying-lever L is in the rest-position. The rack $Cr$ and the carriage $Ch$ are locked together by the pin $e$, then engaged in the lock-recess $e'$ which is provided for it on the stem T. The system of two relatively-sliding parts: rack $Cr$ on the one hand, carriage-plus-platen block (represented by the single carriage $Ch$) on the other, thus moves leftwards as a block character by character under the action of the return-spring R, fastened on the carriage $Ch$ as usual.

Fig. 72 shows the positions of the component-parts at the instant when the justification of too short a terminal segment will begin, the adjustment-stem T having just been displaced to this effect, towards the bottom, by the typist. The pin $e$ has left its lock-recess $e'$ beneath stem T (carriage and rack are thus parted) and is kept lowered by the lower face of stem T. Consequently the back support-finger $d$ has propped the justifying-lever L from behind, so that this lever constitutes henceforward a firm support for the touching-member $p$ which has come into contact with it. As the stem T is parallel to the rest-position of the lever L, the displacements of the touching-member $p$ along the lever L involved by the adjustment did not result in any shift of the carriage $Ch$ with respect to the rack $Cr$.

Fig. 73 shows the positions taken by the component-parts in the course of justification. The pull exercised on the carriage $Ch$ by the return-spring R forces the touching-member $p$ to lean constantly on the justifying-lever L. Lever L leans in turn on its back support-finger $d$ and, $d$ being integral with the rack, the system is locked by the escape-gear of this latter. Under these conditions, every time the escape-gear allows the rack to advance one character, it advances by one character in consequence of the pressure exercised by lever L on its back support-finger $d$. Lever L follows the movement under the pressure of the touching member $p$ and $p$ advances more than one character. The figure shows the locking-pin $e$ uncovered. In fact, the pin $e$ continues to be kept lowered by plane lateral bosses of the stem T, as is explained further on.

Fig. 74 shows the positions of the component-parts at the end of the justification, the typist having replaced adjustment-stem T in the neutral position before sending the rack-carriage-platen ensemble towards the right. Stem T having advanced in the slideway $g$, the touching-member $p$ has mounted along the justifying-lever L (the carriage going back simultaneously on the rack), until the pin $e$ retrieved its lock-recess $e'$ under the stem T and occupied it; at this moment, the back support-finger $d$ was retracting. At the time of the return of the rack-carriage-platen ensemble towards the right, the lever L, recalled by spring $r$, will accompany the touching-member $p$ until it will reach its rest-position and will come to a stand-still.

The adjustment working-drawing (Fig. 75) of this device is extremely simple. On the axle $xx$ are marked the displacements of the rack in numbers of normal characters from the beginning of the justifications (point zero). Through the graduation $19+\phi$ is drawn a line L' parallel to the common direction OL of the adjustment-stem T and the justifying-lever L in its rest-position inclination. This parallel L' obviously constitutes the locus of the touching-member $p$ at the end of all justifications. The intersection M of L' with the spoke O—$15+\phi$ corresponds to the case —IV. If stem T is set in the slideway $g$ so as to bring the touching-member $p$ into the position corresponding to —IV, while the rack will advance $15+\phi$ characters along $xx$, the touching-member $p$, finally the carriage, will advance parallelly by $19+\phi$ characters. Similarly, the point M' of intersection of L' with the spoke O—$23+\phi$ corresponds to the case +IV.

For the practical construction of such a justifier, it is preferable to take the following points of detail into account:

(a) Seen in plane, the end of the touching-member $p$, the edge of the back support-finger $d$ and the axis of articulation O must be aligned. This condition is impossible to fulfil if the justifying-lever L is a simple flat bar; but it is satisfied, on the contrary, by grooving out in the working end of L two lateral channels (milled parts $f$ and $f'$) which are vertically opposite, and one above the other, as shown in Figs. 76 and 77. The vertical wall of $f'$ leans on the edge of $d$, which is recovered by L. The end of $p$ leans on the vertical wall of $f$. The vertical walls of both channels, of which Fig. 76 determines the working-lengths ($f$ necessarily longer than $f'$), are in the same vertical plane YY passing through O, in practice, the plane of symmetry of the justifying-lever. The vertical wall of $f$ here constitutes the rectilinear guide to be found in any end-of-line justifier conforming to the invention.

(b) At the beginning of the justifications, the axis of stem T passes on the locking-pin $e$ (Fig. 72). Stem T constantly circulating above $e$ during the adjustment, locking and unlocking offer no difficulty. During the justifications, on the contrary, the axis of stem T necessarily leaves $e$ as is to be seen in Fig. 73. Thus if the bottom of the stem T in contact with the locking-pin $e$ (the role of which is to keep this pin lowered, the locking-position apart) had a constant width, there would follow, at a certain moment, the spring-out of the pin $e$ and the simultaneous lowering of the back support-finger $d$. The lever L, no longer backed by the finger $d$, would swing towards the left under the pressure of the touching-member $p$ transmitting the back-pull of the spring R, from which would result an instantaneous shift of the carriage in respect to the rack. For this reason, the outline in plan of that part of the bottom of adjustment-stem T in the vicinity of pin $e$ is such that it recovers the said pin $e$ for all the relative positins T–$e$ likely to occur in the course of the justifications.

To this effect, the end of the adjustment-stem T is provided with lateral bosses $T_1$, $T_2$ whose lower faces are in the plane of T's own lower face. Fig. 78 indicates how the outlines of these two bosses are determined. For the justification of a segment 4 characters too short, for instance, the touching-member $p$ has been brought, by shifting of the adjustment-stem T, to the IV position along the justifying-lever L; the locking-pin $e$, which was formerly in the recess $e'$ bored under T, is thus now lowered. At the end of the justification, the back support-finger $d$ has come to $d_1$ after a travel of $15+\phi$ of the rack, and the pin $e$ which follows this finger $d$, into the position $e_1$. The touching-member $p$ has come to M after a travel of $19+\phi$ of the carriage, and the point Q, intersection of the axis of stem T with $xx$, to $Q_1$ after the same travel $19+\phi$.

Thus:
$$QQ_1 = 19+\phi$$
$$ee_1 = 15+\phi$$
$$Q_1e_1 = 4 \text{ characters}$$

The boss $T_1$ must, therefore, extend by 4 characters to the right of Q. By repeating the construction for all the possible positions of the touching-member $p$ along the justifying-lever L, a curve $-4 +4$, passing through $e'$, is obtained; this curve constitutes the locus of the positions taken by the locking-pin $e$ beneath the bosses at the end of the justifications, for the different cases of justification. The outlines to be given to $T_1$ and $T_2$ result from this. When the boss $T_1$ is on the right of the stem T, the boss $T_2$ is naturally on the left.

As for the locking-pin $e$ itself, it is advantageously a shape of revolution: hemispherical cap (Figs. 67 and 68), right cone with rounded end (Fig. 69), frustum of a cone (Fig. 70), and its recess $e'$ beneath the stem T a corresponding shape. The walls of the pin $e$ and of its recess $e'$ thus form reciprocal unlocking-ramps at the time of the adjustment-displacements of stem T, and reciprocal locking-ramps at the time this stem T is replaced in the neutral position at the end of the justifications. In this last case, the translation-direction of stem T in relation to the rack (which is that of the gradual approach of $e'$ towards $e$) being any whatsoever, since confused with the inclination of the lever L at the end of the justifications, the locking would not be regularly achieved if the shape of the pin and its recess were not of revolution.

(c) In the course of the justifications, stem T must only touch the justifying-lever L by the tip of the touching-member $p$; now the stem T extends itself necessarily beyond the touching-member $p$, if only to ensure the unlocking of the pin $e$ at the time of the justification of terminal segments which are too short (Fig. 79). The risk of the tip of the stem T touching the lever L will be eliminated: on the one hand, by sufficiently advancing the touching-member $p$ in relation to this stem T, on the other hand, by possibly cutting out in the critical zone of the lever L a lateral hollow into which the said end would fit.

In Figs. 79 and 80, with the shapes and arrangement of the lateral bosses $T_1$, $T_2$ resulting from Fig. 78, the end of stem T might come into contact with the lever L at the time of the justification of surplus terminal segments (Fig. 80). To avoid this trouble, a notch E, cut out in the justifying-lever L, receives the said end in the cases of interference. The risk of defective running would likewise be eliminated by curving in its plane the part of the lever L concerned. Figs. 79 and 80 illustrate, in addition, with more details than the preceding diagrams, the working of the device. Fig. 79 concerns the justification of a terminal segment of 16 characters and Fig. 80 that of a terminal segment of 24 characters. Fig. 81 represents diagrammatically the general arrangement of a typewriter with carriage-plus-platen block shifting on the rack, fitted with the type of end-of-line justifier of Figs. 62 to 80. The two essential organs of the justifier: the justifying-lever L, then at rest (drawback-spring r, rest-stop $b'$), but free to swivel around the pivot O on the slider C of right-hand margin adjustment, and the justification adjustment-stem T with its lateral bosses $T_1$, $T_2$, there appear disconnected.

The stem T is in neutral position. The two parts of the typewriter longitudinally mobile on the frame: carriage-plus-platen Ch on the one hand, rack Cr on the other hand, locked together by the justifier itself (locking-pin $e$ then engaged in its recess $e'$) are in the normal-typing zone; the back support-finger $d$ is retracted. As soon as the tip of the touching-member comes into contact with the vertical wall of the hollow $f$ of the justifying-lever (without so much as making it swivel), the typist, by displacing the stem T in the slideway $g$ of the carriage, unlocks the pin $e$, since the concomitant penetration of the back support-finger $d$ into the hollow $f'$ wedging the lever L from behind.

Each of the parts of the relative-slidings system formed on the typewriter having regained its freedom at the time of unlocking, the justification by continuous contraction or extension of the terminal segment may be achieved. The various examples given in the above description are only simple examples of construction of typewriters designed for the application of the end-of-line justification process forming the basis of the present invention. Finally, typewritten texts with terminal segments of lines justified according to this same process constitute new material likewise entering within the scope and spirit of the present invention.

What I claim is:

1. A justifying typewriter construction comprising, an angular guide mounted on the typewriter frame, a carriage carrying a platen and a rack bar, the rack bar having a limited movement relative to the carriage, a feeler operative against the guide and having its movements controlled by the angularity of said guide, a slide mounted on the rack bar and connected to said feeler, and coupling means including between the slide and carriage, said coupling means including a cam engaging said slide and controlling movements of the carriage according to the angularity of said guide.

2. A justifying typewriter construction comprising, a longitudinally movable platen provided at one end with a circular groove, a member engaged with said groove and movable longitudinally with the platen, the platen being rotative relative to said member, a slide movable transversely to the longitudinal axis of the platen, said slide being provided with an inclined slot, a projection on the member engaged with said slot, the slide being provided with a projecting finger, a stop member for selective placement at various positions relative to the platen, an adjustable guide on said stop member, and means by which said guide may be positioned at various angular positions relative to the finger to thereby govern the extent of movement of the slide as the finger moves in engagement with the guide during movements of the platen during typing.

3. A justifying typewriter construction comprising, a longitudinally movable platen provided at one end with a circular groove, an arm having one end engaged with said groove, a pin at the other end of the arm, a slide movable transversely of the direction of longitudinal movement of the platen, cam means on said slide for causing longitudinal movement of the arm and the platen engaged thereby, a feeler member extending from the slide, and a stop for location at various selected positions with respect to the platen, said stop having an adjustable guide surface adapted to be selectively positioned at various angles with respect to the direction of longitudinal movement of the platen and arm connected thereto, the feeler member having an end adapted for engagement with said guide surface to thereby control the extent of movement of the slide and its movement of the arm connected thereto.

4. A justifying typewriter having two longitudinally stepwise movable elements capable of relative sliding motion, one of said elements including an escapement rack and the second element including a platen, a frame having a rail disposed parallel to the escapement rack and a member carried by said rail for adjustment therealong at the beginning of a given piece of work, and a control member carried by one of the movable elements and engageable with the frame member when a certain number of normally spaced characters, depending upon the column width required, have been printed, said control member being maintained in a rest position corresponding to the locking together in neutral position of the two stepwise movable elements to the moment of engagement with said frame member, and being thereafter moved from rest position under control of said frame member to cause the platen-carrying element to have a differential sliding movement of preselected amplitude and direction in relation to the escapement rack, thus causing justification to be effected only on the terminal segments of the lines, with all of the terminal segments being brought to a uniform ending.

5. A justifying typewriter, as set forth in claim 4, wherein the member on the frame is in the form of a rectilinear guide inclined with respect to the rail of the frame which carries it, the movable control member being a contact member carried by one of the two slidable elements, said contact member being capable of slidable movement along its axis by the said rectilinear guide, and a second rectilinear guide provided on one of the said slidable elements for transforming the shifting movements of the contact member into a differential sliding movement, the inclination of at least one of the inclined rectilinear guides being regulatable to thereby provide the required differential sliding movement of required amplitude and direction.

6. A justifying typewriter construction as provided for in claim 5, wherein the second rectilinear guide consists of a slot formed in a sliding member carried by the contact member, said slot actuating a sliding rod carried by one of the sliding elements, which latter element is that not provided with the contact member.

7. A justifying typewriter as provided for in claim 4, wherein the member on the frame is in the form of a rectilinear guide inclined with respect to the rail of the frame which carries it, the movable control member being a contact member carried by one of the two slidable elements, said contact member being capable of slidable movement along its axis by said rectilinear guide, a second rectilinear guide provided on one of the slidable elements for transforming the shifting movements of the contact member into a differential sliding movement, the inclination of at least one of the inclined rectilinear guides being regulatable to thereby provide the required differential sliding movement of required amplitude and direction, the second rectilinear guide consisting of a slot formed in the sliding element which is not provided with the contact member, the contact member being carried by the escapement rack and having a pin engaging in the slot of the second rectilinear guide to thereby give the platen-carrying element a differential sliding motion with respect to the escapement rack, and a spring for urging the contact member against the inclined rectilinear guide in the course of justification and maintaining the pin on said contact member against a part of the slot to thereby keep the contact member in its rest position when not justifying.

8. A justifying typewriter as provided for in claim 4, wherein the frame member is a rectilinear guide that is inclined with respect to the rail of the frame which supports it, and the movable control member is a contact member carried by one of the relatively slidable elements, said contact member being mounted for shifting movement along its axis by the inclined rectilinear guide, thereby actuating one arm of a bell crank pivoted on the element of the machine which carries the contact member, the bell-crank having a second arm for operating one of the sliding elements, the inclination of the rectilinear guide and the leverage of the bell-crank being adjustable to give the required differential sliding movement the amplitude and direction required.

9. A justifying typewriter as described in claim 4, in which the frame member is a stop and the movable control member is a pivoted lever rotating about a fixed pivot carried by one of the two sliding elements of the machine, the stop causing said lever to rotate about its pivot from a position of rest and to slide with respect to said stop as soon as the engagement occurs, and connecting means provided between the lever and the second of the two sliding elements for transforming the rotative movements of the lever into differential sliding motion, said connecting means being adjustable to vary the leverage of the lever and thus give the differential sliding motion the amplitude and direction required.

References Cited in the file of this patent

UNITED STATES PATENTS

| Number | Name | Date |
|---|---|---|
| 1,457,853 | O'Bryan et al. | June 5, 1923 |
| 2,111,410 | Stickney | Mar. 15, 1938 |
| 2,142,561 | Evans | Jan. 3, 1939 |
| 2,162,565 | Ritterholz | June 13, 1939 |
| 2,215,119 | Fomenko | Sept. 17, 1940 |
| 2,233,092 | Bernhard | Feb. 25, 1941 |
| 2,263,642 | Norton | Nov. 25, 1941 |
| 2,418,474 | Loughridge | Apr. 8, 1947 |